US012560400B2

(12) United States Patent
Feesl et al.

(10) Patent No.: US 12,560,400 B2
(45) Date of Patent: Feb. 24, 2026

(54) ACCESSORY FOR WORKING DEVICE

(71) Applicant: New Revo Brand Group, LLC, Plymouth, MN (US)

(72) Inventors: Mike Feesl, Inver Grove Heights, MN (US); Ryan Jacobson, Andover, MN (US)

(73) Assignee: NEW REVO BRAND GROUP, LLC, Maple Grove, MN (US)

( * ) Notice: Subject to any disclaimer, the term of this patent is extended or adjusted under 35 U.S.C. 154(b) by 37 days.

(21) Appl. No.: 18/536,476

(22) Filed: Dec. 12, 2023

(65) Prior Publication Data

US 2024/0102765 A1     Mar. 28, 2024

Related U.S. Application Data

(63) Continuation-in-part of application No. 29/917,566, filed on Nov. 21, 2023, and a continuation-in-part of
(Continued)

(51) Int. Cl.
*F41A 23/18* (2006.01)
*A47B 43/00* (2006.01)
(Continued)

(52) U.S. Cl.
CPC .............. *F41A 23/18* (2013.01); *A47B 43/00* (2013.01); *A47B 81/005* (2013.01); *A47F 7/0035* (2013.01); *B60R 7/14* (2013.01)

(58) Field of Classification Search
CPC ....... F41A 23/18; A47B 43/00; A47B 81/005; A47F 7/0035; B60R 7/14; B25B 1/2452; B25B 1/2484; B25B 1/103
See application file for complete search history.

(56) References Cited

U.S. PATENT DOCUMENTS 488,315 A     12/1892   Kane
1,071,289 A     8/1913   Bader
(Continued)

FOREIGN PATENT DOCUMENTS

CN     201192820     2/2009
CN     201510751     6/2010
(Continued)

OTHER PUBLICATIONS

2pcs Vise Jaws,5.5' Multi-Groove Magnetic Soft Bench Vise Vice Jaw Pad Accessories. Retrieved Jul. 2020. https://www.amazon.com/2pcs-Multi-Groove-Magnetic-Bench-Accessories.
(Continued)

*Primary Examiner* — Sunil K Singh
(74) *Attorney, Agent, or Firm* — GRUMBLES LAW PLLC; Brittany Haanan

(57)     ABSTRACT

An accessory for a working device can include a plug body, an extension portion, and a tool. The plug body can have a length along a first axis and can be comprised of a keyed connection piece on a first end. The extension portion can connect on one end to a second end of the plug body and on an opposite end to the tool. The plug body can be receivable by a plug receptacle on a receiving adapter or a working device. The accessory can further include a spring-loaded locking mechanism that can be structured and configured to transiently lock the plug body to a receiving adapter or a working device.

21 Claims, 48 Drawing Sheets

Related U.S. Application Data application No. 18/489,450, filed on Oct. 18, 2023, said application No. 29/917,566 is a continuation of application No. 18/152,247, filed on Jan. 10, 2023, now Pat. No. 11,933,569, said application No. 18/489,450 is a continuation of application No. 18/152,247, filed on Jan. 10, 2023, now Pat. No. 11,933,569, said application No. 29/917,566 is a continuation of application No. 29/869,240, filed on Dec. 27, 2022, now Pat. No. Des. 1,080,371, said application No. 18/489,450 is a continuation of application No. 17/751,101, filed on May 23, 2022, now Pat. No. 12,384,005, which is a continuation-in-part of application No. 17/455,034, filed on Nov. 16, 2021, now Pat. No. 12,097,593, which is a continuation-in-part of application No. 16/989,878, filed on Aug. 10, 2020, now Pat. No. 11,493,299, which is a continuation-in-part of application No. 16/545,779, filed on Aug. 20, 2019, now Pat. No. 10,739,101.

(60) Provisional application No. 62/724,279, filed on Aug. 29, 2018.

(51) Int. Cl.

| | |
|---|---|
| *A47B 81/00* | (2006.01) |
| *A47F 7/00* | (2006.01) |
| *B60R 7/14* | (2006.01) |

(56) References Cited

U.S. PATENT DOCUMENTS

| | | | | |
|---|---|---|---|---|
| 1,096,699 | A | | 5/1914 | Elkin |
| 1,205,149 | A | | 11/1916 | Bovee |
| 1,611,239 | A | * | 12/1926 | Sanford .................... F16N 5/02 |
| | | | | 141/347 |
| 2,168,988 | A | | 8/1939 | Hultquist |
| 2,258,686 | A | | 10/1941 | Olney |
| 2,290,545 | A | | 7/1942 | Doering |
| 2,519,107 | A | | 8/1950 | Brown |
| 2,774,563 | A | | 12/1956 | Pribis |
| 2,778,257 | A | | 1/1957 | Linskey et al. |
| 2,877,689 | A | | 3/1959 | Pribis |
| 2,907,238 | A | | 10/1959 | White |
| 2,948,172 | A | | 8/1960 | Gustav et al. |
| 3,322,423 | A | | 5/1967 | Anatoliy et al. |
| 3,463,479 | A | | 8/1969 | Hennessey |
| 3,718,327 | A | | 2/1973 | Nunez |
| 3,783,548 | A | | 1/1974 | Fisher |
| 3,984,092 | A | | 10/1976 | Fitzpatrick |
| 4,070,011 | A | | 1/1978 | Glesser |
| 4,184,667 | A | | 1/1980 | Alessio |
| 4,252,305 | A | | 2/1981 | Pasch |
| 4,333,132 | A | | 6/1982 | Paley |
| 4,333,385 | A | | 6/1982 | Culver |
| 4,437,654 | A | | 3/1984 | Chiappetti |
| 4,438,913 | A | | 3/1984 | Hylla |
| 4,548,392 | A | | 10/1985 | Rickling |
| 4,569,530 | A | | 2/1986 | Cross |
| 4,572,492 | A | | 2/1986 | Kawakita |
| 4,594,805 | A | | 6/1986 | McClelland |
| 4,807,381 | A | | 2/1989 | Southard |
| 4,807,861 | A | | 2/1989 | Kimball |
| 4,824,086 | A | | 4/1989 | Rickling et al. |
| 4,854,568 | A | | 8/1989 | Baeza et al. |
| 4,861,010 | A | | 8/1989 | Neil |
| 4,887,193 | A | | 12/1989 | Dieckmann |
| 4,893,850 | A | | 1/1990 | Mizusawa |
| 4,905,550 | A | | 3/1990 | Albrecht |
| 4,926,722 | A | | 5/1990 | Sorensen et al. |
| 4,971,301 | A | | 11/1990 | Yang |
| 4,985,962 | A | | 1/1991 | Weber |
| 5,025,584 | A | | 6/1991 | Butterwick |

| | | | |
|---|---|---|---|
| 5,058,302 | A | 10/1991 | Minneman |
| 5,070,636 | A | 12/1991 | Mueller |
| 5,092,572 | A | 3/1992 | Litwak |
| 5,094,131 | A | 3/1992 | Sorensen et al. |
| 5,210,906 | A | 5/1993 | Aihara et al. |
| 5,224,692 | A | 7/1993 | Anderson et al. |
| 5,236,183 | A | 8/1993 | Curtis |
| 5,243,883 | A | 9/1993 | Savage |
| D340,851 | S | 11/1993 | Sorensen |
| 5,419,540 | A | 5/1995 | Teafatiller |
| 5,497,575 | A | 3/1996 | Fried |
| 5,593,147 | A | 1/1997 | Read |
| 5,600,913 | A | 2/1997 | Minneman |
| 5,664,875 | A | 9/1997 | Hegedus |
| 5,690,416 | A | 11/1997 | Gennep |
| 5,697,180 | A | 12/1997 | Morizio |
| 5,797,670 | A | 8/1998 | Snoke et al. |
| 5,847,883 | A | 12/1998 | Rispoli |
| 5,853,168 | A | 12/1998 | Drake |
| 5,921,536 | A | 7/1999 | Bernstein |
| 5,988,616 | A | 11/1999 | Fuller et al. |
| 6,029,964 | A | 2/2000 | Bohl |
| 6,088,173 | A | 7/2000 | Mendelsohn et al. |
| 6,098,498 | A | 8/2000 | Ming et al. |
| 6,105,948 | A | 8/2000 | Young |
| 6,170,813 | B1 | 1/2001 | Bowers |
| 6,193,732 | B1 | 2/2001 | Frantzen et al. |
| D439,487 | S | 3/2001 | Renner |
| D440,739 | S | 4/2001 | Hsu |
| 6,293,041 | B2 | 9/2001 | Weaver |
| 6,305,117 | B1 | 10/2001 | Hales |
| 6,338,475 | B1 | 1/2002 | Ping |
| 6,347,791 | B1 | 2/2002 | Chervenak |
| 6,367,466 | B1 | 4/2002 | Nettles, Jr. |
| 6,367,787 | B1 | 4/2002 | Poole et al. |
| 6,382,608 | B1 | 5/2002 | Michell |
| 6,386,530 | B1 | 5/2002 | Marks |
| 6,412,767 | B1 | 7/2002 | Beckmann et al. |
| 6,427,376 | B1 | 8/2002 | Weber |
| 6,546,662 | B1 | 4/2003 | Chong |
| 6,616,295 | B2 | 9/2003 | Sako et al. |
| 6,640,666 | B2 | 11/2003 | Pliley |
| 6,648,315 | B1 | 11/2003 | Lee |
| 6,672,577 | B2 | 1/2004 | Murvine |
| 6,672,578 | B1 | 1/2004 | Martens |
| 6,676,120 | B1 | 1/2004 | Hallbeck et al. |
| 6,685,176 | B2 | 2/2004 | Wirth et al. |
| 6,761,278 | B2 | 7/2004 | Hyp et al. |
| 6,860,055 | B1 | 3/2005 | Walrath |
| 6,877,266 | B1 | 4/2005 | Brownlee |
| 6,896,248 | B1 | 5/2005 | Andulics |
| 6,929,253 | B2 | 8/2005 | Marks |
| 6,957,808 | B2 | 10/2005 | Varzino et al. |
| 6,971,643 | B1 | 12/2005 | Garrison |
| 7,004,365 | B2 | 2/2006 | Ingram |
| 7,017,898 | B2 | 3/2006 | Varzino et al. |
| 7,055,813 | B2 | 6/2006 | Hexamer, Jr. |
| 7,066,457 | B2 | 6/2006 | Gerritsen et al. |
| 7,101,058 | B2 | 9/2006 | Prell et al. |
| 7,111,836 | B1 | 9/2006 | West |
| 7,168,181 | B2 | 1/2007 | Walchak |
| 7,201,541 | B2 | 4/2007 | Barmann |
| D543,604 | S | 5/2007 | Minneman |
| 7,258,333 | B2 | 8/2007 | Hobday |
| 7,281,346 | B1 | 10/2007 | Cook et al. |
| 7,290,760 | B1 | 11/2007 | Lindsay |
| 7,356,960 | B1 | 4/2008 | Knitt |
| 7,367,451 | B2 | 5/2008 | Pendergraph et al. |
| 7,370,891 | B1 | 5/2008 | Schmitt et al. |
| 7,530,556 | B1 | 5/2009 | Zheng |
| 7,537,218 | B2 | 5/2009 | Wachtler et al. |
| 7,584,690 | B2 | 9/2009 | Cauley |
| 7,600,744 | B2 | 10/2009 | Liou |
| 7,641,183 | B2 | 1/2010 | Fuller et al. |
| 7,651,078 | B2 | 1/2010 | Geier et al. |
| 7,690,606 | B1 | 4/2010 | Batdorf |
| 7,699,297 | B2 | 4/2010 | Cicenas et al. |
| D615,856 | S | 5/2010 | Redding, Jr. |
| 7,726,478 | B2 | 6/2010 | Potterfield et al. |

(56) References Cited

U.S. PATENT DOCUMENTS

| | | | |
|---|---|---|---|
| 7,735,813 B2 | 6/2010 | Geier et al. |
| 7,774,972 B2 | 8/2010 | Potterfield et al. |
| 7,815,175 B2 | 10/2010 | Cicenas et al. |
| 7,886,474 B2 | 2/2011 | Werner |
| 7,896,322 B2 | 3/2011 | Geler et al. |
| 7,942,392 B2 | 5/2011 | Geier et al. |
| 7,946,071 B2 | 5/2011 | Cauley |
| 7,980,017 B2 | 7/2011 | Harman, III |
| 7,984,895 B2 | 7/2011 | Strauss et al. |
| 7,997,021 B2 | 8/2011 | Cauley et al. |
| 8,011,129 B2 | 9/2011 | Cauley et al. |
| 8,074,340 B2 | 12/2011 | Cicenas et al. |
| 8,167,292 B1 | 5/2012 | Mucciacciaro et al. |
| 8,240,647 B2 | 8/2012 | Geier et al. |
| 8,296,988 B2 | 10/2012 | Yale et al. |
| 8,297,605 B2 | 10/2012 | Lee et al. |
| 8,308,392 B2 | 11/2012 | Yu et al. |
| 8,316,571 B1 | 11/2012 | Holland |
| 8,322,068 B2 | 12/2012 | Wilson |
| 8,322,699 B2 | 12/2012 | Prell et al. |
| 8,342,495 B2 | 1/2013 | Weissenborn |
| 8,382,048 B2 | 2/2013 | Nesper et al. |
| 8,393,106 B2 | 3/2013 | Cauley et al. |
| 8,424,856 B2 | 4/2013 | Lombardi et al. |
| 8,430,383 B2 | 4/2013 | Strauss |
| 8,516,734 B2 | 8/2013 | Yale et al. |
| 8,544,202 B2 | 10/2013 | Bastian, Jr. |
| 8,578,645 B2 | 11/2013 | Cauley |
| 8,590,871 B2 | 11/2013 | Geier et al. |
| 8,621,773 B2 | 1/2014 | Morrow et al. |
| D698,888 S | 2/2014 | Hicks |
| 8,657,127 B2 | 2/2014 | Diaz, Jr. et al. |
| 8,702,076 B2 | 4/2014 | Cicenas et al. |
| 8,707,609 B2 | 4/2014 | Fisher |
| 8,905,391 B2 | 12/2014 | Weissenborn |
| 8,931,193 B1 | 1/2015 | Bogart et al. |
| 8,931,201 B2 | 1/2015 | Gianladis et al. |
| 8,955,544 B2 * | 2/2015 | Gurney ................. F16L 37/138 |
| | | 285/322 |
| 8,973,297 B2 | 3/2015 | Boggess et al. |
| 9,004,479 B2 | 4/2015 | Fisher |
| 9,121,423 B2 | 9/2015 | Sharpe et al. |
| 9,134,085 B2 | 9/2015 | Tucker et al. |
| 9,140,512 B2 | 9/2015 | Witchel |
| 9,151,561 B2 | 10/2015 | Morrow et al. |
| D742,211 S | 11/2015 | Whaley |
| 9,187,210 B2 | 11/2015 | Zhu et al. |
| 9,216,485 B2 | 12/2015 | Huang |
| 9,250,034 B2 | 2/2016 | Tucker et al. |
| 9,302,374 B1 | 4/2016 | Cusenza |
| 9,372,041 B1 | 6/2016 | Geissele |
| 9,421,672 B2 | 8/2016 | Rowlay et al. |
| D768,254 S | 10/2016 | Geissele |
| 9,506,711 B2 | 11/2016 | Gomez |
| 9,522,456 B2 | 12/2016 | Cicenas et al. |
| 9,583,083 B1 | 2/2017 | Berlinger |
| 9,616,552 B1 | 4/2017 | McClain |
| 9,618,291 B1 | 4/2017 | Henderson |
| 9,676,079 B2 | 6/2017 | Tropea |
| 9,702,653 B2 | 7/2017 | Cauley, Jr. et al. |
| 9,733,036 B2 | 8/2017 | Tucker et al. |
| 9,737,064 B2 | 8/2017 | Durrant |
| 9,816,546 B2 | 11/2017 | Gomez |
| 9,823,035 B2 | 11/2017 | Geissele et al. |
| 9,885,534 B2 | 2/2018 | Boggess et al. |
| 9,933,226 B2 | 4/2018 | Tucker et al. |
| 9,976,693 B1 | 5/2018 | Delikat et al. |
| 9,995,552 B2 | 6/2018 | Cuddeback |
| 10,011,005 B2 | 7/2018 | Shute et al. |
| 10,024,621 B2 | 7/2018 | Hutson |
| 10,040,172 B2 | 8/2018 | Weissenborn |
| 10,178,209 B1 | 1/2019 | Hesse |
| 10,209,023 B1 | 2/2019 | Stuart |
| D844,093 S | 3/2019 | Shelton et al. |
| 10,317,162 B2 | 6/2019 | Morrow et al. |
| 10,384,331 B2 | 8/2019 | Maggert |
| D870,840 S | 12/2019 | Cheng et al. |
| 10,514,225 B2 | 12/2019 | Cauley, Jr. et al. |
| 10,563,945 B2 | 2/2020 | Tucker et al. |
| 10,684,090 B2 | 6/2020 | Agnelli, Jr. |
| 10,782,085 B2 | 9/2020 | Cauley, Jr. et al. |
| 10,858,160 B2 | 12/2020 | Yang |
| 10,859,336 B2 | 12/2020 | Morrow et al. |
| 10,890,406 B1 | 1/2021 | Whang |
| 10,919,141 B2 | 2/2021 | Omry et al. |
| 11,009,306 B2 | 5/2021 | Cauley, Jr. et al. |
| 11,079,195 B2 | 8/2021 | Silver et al. |
| 11,274,903 B2 | 3/2022 | Kokoruda et al. |
| 11,472,005 B2 | 10/2022 | Wang |
| 11,493,299 B2 | 11/2022 | Jacobson et al. |
| 11,933,569 B1 | 3/2024 | Chernik et al. |
| 2002/0043752 A1 | 4/2002 | Reed et al. |
| 2002/0171191 A1 | 11/2002 | Hudson |
| 2003/0160373 A1 | 8/2003 | Yang |
| 2004/0195479 A1 | 10/2004 | Gulley |
| 2005/0111214 A1 | 5/2005 | Zeiler |
| 2005/0115137 A1 | 6/2005 | Minneman |
| 2005/0188578 A1 | 9/2005 | Engel |
| 2005/0230334 A1 | 10/2005 | MacDonald et al. |
| 2006/0226588 A1 | 10/2006 | Khachatoorian et al. |
| 2007/0294929 A1 | 12/2007 | Potterfield et al. |
| 2008/0018062 A1 | 1/2008 | Wachtler et al. |
| 2009/0193703 A1 | 8/2009 | Riley |
| 2009/0229160 A1 | 9/2009 | Elliott et al. |
| 2009/0273132 A1 | 11/2009 | Parks et al. |
| 2009/0278296 A1 | 11/2009 | Fulcher et al. |
| 2010/0089294 A1 | 4/2010 | Medina |
| 2010/0126055 A1 | 5/2010 | Potterfield |
| 2011/0192069 A1 | 8/2011 | Potterfield et al. |
| 2012/0227305 A1 | 9/2012 | Fontenot et al. |
| 2012/0255212 A1 | 10/2012 | Werner |
| 2012/0267890 A1 * | 10/2012 | Gurney ................... F16N 21/02 |
| | | 285/308 |
| 2013/0086835 A1 | 4/2013 | Minneman |
| 2013/0270758 A1 | 10/2013 | Wittliff, III et al. |
| 2014/0075817 A1 | 3/2014 | Gomez et al. |
| 2014/0246824 A1 | 9/2014 | Fiegener et al. |
| 2014/0319147 A1 | 10/2014 | Horovitz et al. |
| 2015/0014911 A1 | 1/2015 | Melanson |
| 2015/0115114 A1 | 4/2015 | White |
| 2015/0354913 A1 | 12/2015 | Morrow et al. |
| 2016/0202008 A1 | 7/2016 | Geissele |
| 2016/0339562 A1 | 11/2016 | Myers |
| 2017/0018303 A1 | 1/2017 | Yang et al. |
| 2017/0108303 A1 | 4/2017 | Gomez et al. |
| 2017/0216997 A1 | 8/2017 | Smith et al. |
| 2018/0117738 A1 | 5/2018 | Klumper |
| 2019/0162499 A1 | 5/2019 | Jacobson |
| 2020/0180115 A1 | 6/2020 | Yang |
| 2021/0170549 A1 | 6/2021 | Wang |
| 2022/0192673 A1 | 6/2022 | Akiyoshi et al. |
| 2022/0281076 A1 | 9/2022 | Morris et al. |
| 2024/0044602 A1 | 2/2024 | Morris et al. |

FOREIGN PATENT DOCUMENTS

| | | | |
|---|---|---|---|
| CN | 103056790 A | 4/2013 |
| CN | 104117938 A | 10/2014 |
| CN | 203956763 U | 11/2014 |
| CN | 104889768 A | 9/2015 |
| CN | 206316953 U | 7/2017 |
| CN | 111113099 A | 5/2020 |
| DE | 2131378 A1 | 12/1972 |
| DE | 8612639 U1 | 6/1987 |
| DE | 3700955 C2 | 10/1991 |
| DE | 102006018239 A1 | 10/2007 |
| DE | 102013004952 A1 | 3/2014 |
| DE | 202014006697 U1 | 10/2014 |
| DE | 102018005857 A1 | 1/2020 |
| EA | 027332 B1 | 7/2017 |
| EP | 0201817 A3 | 7/1988 |
| FR | 2523891 B1 | 1/1985 |
| FR | 3032784 A1 | 8/2016 |
| GB | 415518 A | 8/1934 |

(56) References Cited

FOREIGN PATENT DOCUMENTS

| GB | 662672 | A | 12/1951 |
| GB | 707546 | A | 4/1954 |
| GB | 2046655 | B | 4/1983 |
| GB | 2345656 | A | 7/2000 |
| GB | 2426948 | B | 5/2007 |
| JP | 3211200 | U | 6/2017 |
| TW | I417503 | B | 12/2013 |
| WO | 8601267 | A1 | 2/1986 |
| WO | 2017088030 | A1 | 6/2017 |
| WO | 2017184078 | A1 | 10/2017 |

OTHER PUBLICATIONS

3-Axis Precision Tilting Vise 3" Jaw Width. Retrieved Jul. 2020. https://www.wiltontools.com/us/en.

Alzo, Digital 12.5" Flexible Spring Steel Arm with 5/8" Aluminum Sockets, Up to 4 lbs Capacity, https://www.adorama.com/az1937. html, accessed Feb. 16, 2023.

Amazon, Gun Fit Jaws, Retrieved from: https://www.amazon.com/s?k=gun+fit+jaws&hvadid=634501801402&hvdev=c&hvlocphy=1018671 &hvnetw=g&hvqmt=e&hvrand=13330848230366123960 &hvtargid=kwd—(Year: 2023).

Berry's Bullets, VersaCradle Machine Vise System, https://www. berrysmfg.com/product/vc-vise, accessed May 5, 2022.

CB01 C-Clamp + High Weight Load Inner Ball Magic Grip. Retrieved Jul. 2020. https://www.digitalfoto.cn/cb01-c-clamp-high-weight-load-inner-ball-magic-grip.

Garrett Wade, Versa Vide: Ultimate Versatile Vise, https://www. garrettwade.com/ultimate-versatile-vise.html, accessed Jul. 9, 2020.

Global Industrial, Plano Molding 191900 110 Quart Mobile Storage Trunk, https://www.globalindustrial.com/p/plano-110-quart-mobile-storage-trunk-38-1-4-I-x-18-1-2-w-x-21-3-4-h-black?infoParam. campaignId=T9F&gclid=CjwKCAiAqt-dBhBcEiwATw-ggDCai7C njDTc1ING1mZwCRoSpctSC2fMgT9FtWurk6j6j6y8x1UA7BoC2 zMQAvD_BWE, accessed Jan. 6, 2023.

Howard's Total Vise, The Crossover Vise System, https://www. totalvise.com/?gclid=CjwKCAjw682TBhATEiwA9crl34dV7 . . . 8v9kBGWe6A1fjeVrnWaz7gn6LZB7uijtehys6HdN8hqRnNdxoCE w4QAvD_BWE, accessed May 5, 2022.

Husky, 20-Gal. Professional Duty Waterproof Storage Container with Hinged Lid in Red, https://www.homedepot.com/p/Husky-20-Gal-Professional-Duty-Waterproof-Storage-Container-with-Hinged-Lid-in-Red-246842/311485319, accessed Jan. 5, 2023.

Hyskore Cleaning & Sighting Vise. Retrieved Jan. 2020. https://www.amazon.com/HYSKORE-1003627-Hyskore-Cleaning-Sighting.

Hyskore Professional Shooting Accessories, #30278 Bench Top 360 Armorer's Vise, https://hyskore.com/products/30278-bench-top-360°-armorers-vise/, accessed May 5, 2022.

Kupo, D700912 Mini Flex Arm with Alligator Clip, https://www. markertek.com/product/kupo-d700912/kupo-d700912-mini-flex-arm-w-alligator-clip, accessed Feb. 16, 2023.

Kurt Workholding. Retrieved Jul. 2020. https://www.kurtworkholding. com/product/kurt-3-in-one-system-jaw-plates/.

Lyman Revolution Gun Vise. Retrieved Jan. 2020. https://www. midwayusa.com/product.

Lyman, Revolution Rotating Gun Vise, https://www.sportsmansguide. com/product/index/lyman-revolution-rotating-gun-vise?a=471500, accessed Jul. 28, 2020.

Master Gun Vise™ Gun-Fit™ (from Real Avid), Retrieved from: https://www.youtube.com/watch?v=Azx8037Vja8 (Year: 2022).

Mission Automotive Store, Vise Soft Jaws / Vice Jaw Pads—Magnetic—4.5 Inch Length, Multi-Groove Design, Durable TPU Rubber Covers—Fit Wide Array of Vises / Vices and Blocks (4 5 6 In)—By Mission Automotive, https://www.amazon.com/Vise-Soft-Jaws-Vice-Pads/dp/B01FT2QTDA, accessed Feb. 10, 2022.

Model:346NM Deluxe Non-Marking Neoprene Jaw Pads. Retrieved Jul. 2020. https://www.panavise.com/index.html.

Modul-System, Multi-Box—The 'Smart' Multi-Purpose Tool Box, https://www.modul-system.com/en/news/2019/april/multi-box-the-smart-multi-purpose-tool-box—1658, accessed Jan. 6, 2023.

Monsterballvise. Retrieved Jan. 2020. https://www.monsterballvise. com/index.htm.

MTM Case-Gard, GV30—Gun Vise for Gunsmithing work and Cleaning Kits, https://mtmcase-gard.com/products/gun-vise-for-gunsmithing-work-and-cleaning-kits, accessed Jan. 6, 2023.

MTM Case-Gard, RMBC-11—Shooting Range Box & Maintenance Center, https://mtmcase-gard.com/products/shooting-range-box-n-maintenance-center, accessed Jan. 6, 2023.

Multi-Angle Base Vise. Website. Retrieved Jan. 2020. https://www. stanleytools.com/products/hand-tools/manual-fastener-tools/spring-metal-angle/multiangle-base-vise/83-069m.

Notice of Allowance pertaining to corresponding U.S. Appl. No. 16/989,878, mailed Aug. 2, 2022.

NPL: https://gunmagwarehouse.com/blog/real-avid-new-ar-building-tools-shot-show-2018/ Jan. 29, 2018, pp. 9-12.

Office Action pertaining to corresponding U.S. Appl. No. 17/455,034, mailed Dec. 12, 2023.

Office Action pertaining to U.S. Appl. No. 16/989,878, mailed Feb. 2, 2022.

Otis Technology, Soft Vise Jaws, https://otistec.com/otis-soft-vise-jaws/, accessed Feb. 10, 2022.

Ozgkee, Helping Hands Soldering Station, Flexible Arms Angle Adjustable Hands Soldering Station with 3X Magnifier for Maintenance Electronic Repair Soldering Jewelry Crafts, https://www. amazon.com/Ozgkee-Soldering-Adjustable-Maintenance-Electronic/dp/B0BNL4B95T/ref=sr_1_4?crid=3RZWJKLIAY75L&keywords=Ozgkee+Helping+Hands+Soldering+Station+flexible+arms&qid=1676566534&s=hi&sprefix=ozgkee+helping+hands+soldering+station+flexible+arms%2Ctools%2C143&sr=1-4, accessed Feb. 16, 2023.

Panavise, Deluxe Jaw Pads; Found at: https://web.archive.org/web/20100322210148/https://www.panavise.com/index. html?pageI D= 1 &id 1 = 1 &startat= 1 &—woSECTIONSdatarq=1 &—SECTIONSword=ww (Year: 2010).

PanaVise-346-datasheet Catalogue (Year: 2023).

Plano Store UK, Camo Storage and Gun Cleaning Shooters Case, https://www.planostore.com/gun-cleaning-station-and-storage-system-shooters-case, accessed Nov. 14, 2022.

Stanley Maxsteel Multi Angle Vice. Website. Retrieved Jan. 2020. https://www.youtube.com/watch?v=jSE2gOqQIvE.

Tipton Gun Vise. Retrieved Jul. 2020. https://www.midwayusa.com/product/101491760.

Tipton, Compact Range Vise, https://www.tiptonclean.com/gun-vises/compact-range-vise/282282.html, accessed Nov. 14, 2022.

Tipton, Gun Vise, https://www.tiptonclean.com/gun-vises/gun-vise/782731.html, accessed Jan. 6, 2023.

United States Patent and Trademark Office, U.S. Appl. No. 13/562,651, p. 1-353, Mar. 17, 2017, United States.

VJ-6A060201MR-MACHINE Reversible Aluminium Vise Soft Jaws for A 6' Vise . . . Retrieved Jul. 2020. https://www.amazon.com/VJ-6A060201MR-MACHINE-REVERSIBLE-ALUMINIUM-VISE.

Wilton Junior 343 Pow-R-Arm. Retrieved Jan. 2020. https://www. northerntool.com/shop/tools/product_200711704_2007.

Wimberley, The Ground Plamp, https://www.bhphotovideo.com/c/product/1275647-REG/wimberley_pp_400_plamp_stake_pp400. html, accessed Feb. 16, 2023.

Final Rejection for corresponding U.S. Appl. No. 17/455,034, mailed Feb. 20, 2024.

Office Action pertaining to corresponding U.S. Appl. No. 17/455,034, mailed May 1, 2024.

Final Rejection pertaining to U.S. Appl. No. 17/455,034, mailed May 22, 2024.

Ultimate Versatile Vise. Retrieved Jul. 2020. https://www.garrettwade. com/ultimate-versatile-vise.html.

Office Action pertaining to U.S. Appl. No. 17/751,101, mailed Nov. 6, 2024.

Panavise, Precision Vise Combinations, www.panavise.com, pp. 1-13.

Kotto, Helping Hands soldering, Third Hand Soldering Tool PCB Holder Four Arms Helping Hands Crafts Jewelry Hobby Workshop

(56)         References Cited

OTHER PUBLICATIONS

Helping Station Non-Slip Steel Weighted Base, Amazon, accessed via https://www.amazon.com/Helping-Soldering-Workshop-Non-slip-Weighted/dp/B07MDKXNPC/ref=sr_1_1?crid=228BU3FMWP864&dib=eyJ2ljoiMSJ9.shETc1wxpEuXOgADOnZmOUBikOSNi9X_uDLqCo9R1IKGanKVRav335iTAh-.
Notice of Allowance for Design U.S. Appl. No. 29/869,240, mailed Mar. 5, 2025.

\* cited by examiner

FIG. 1
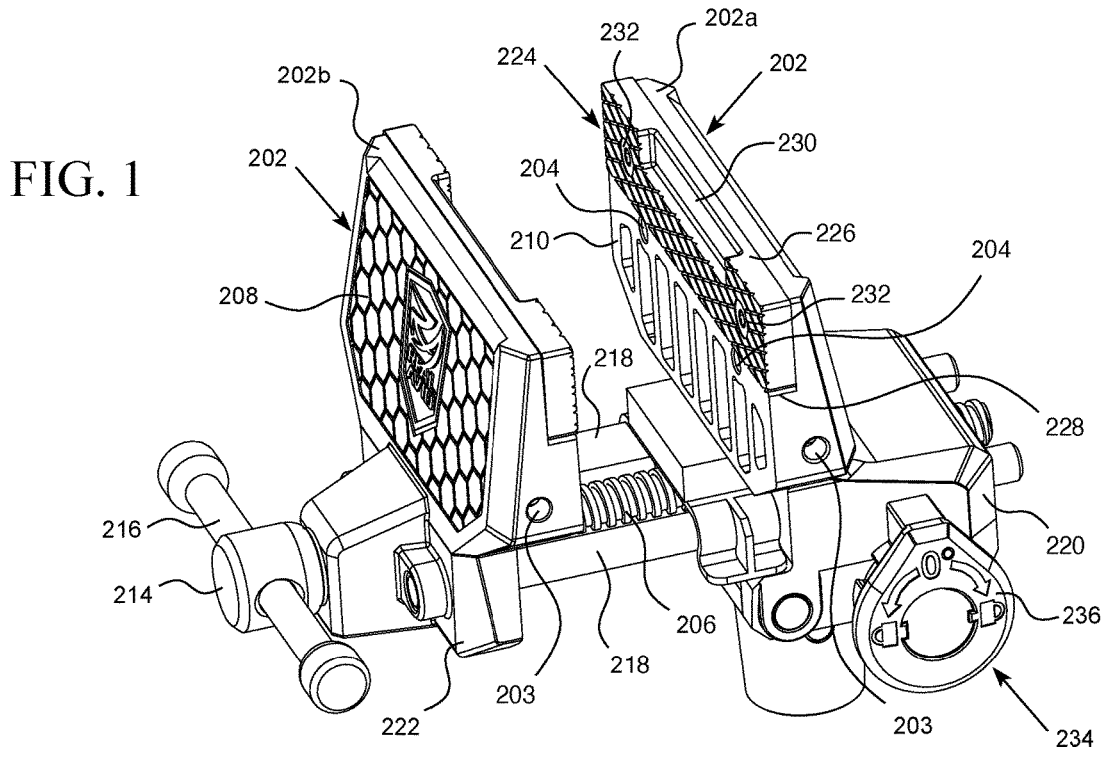
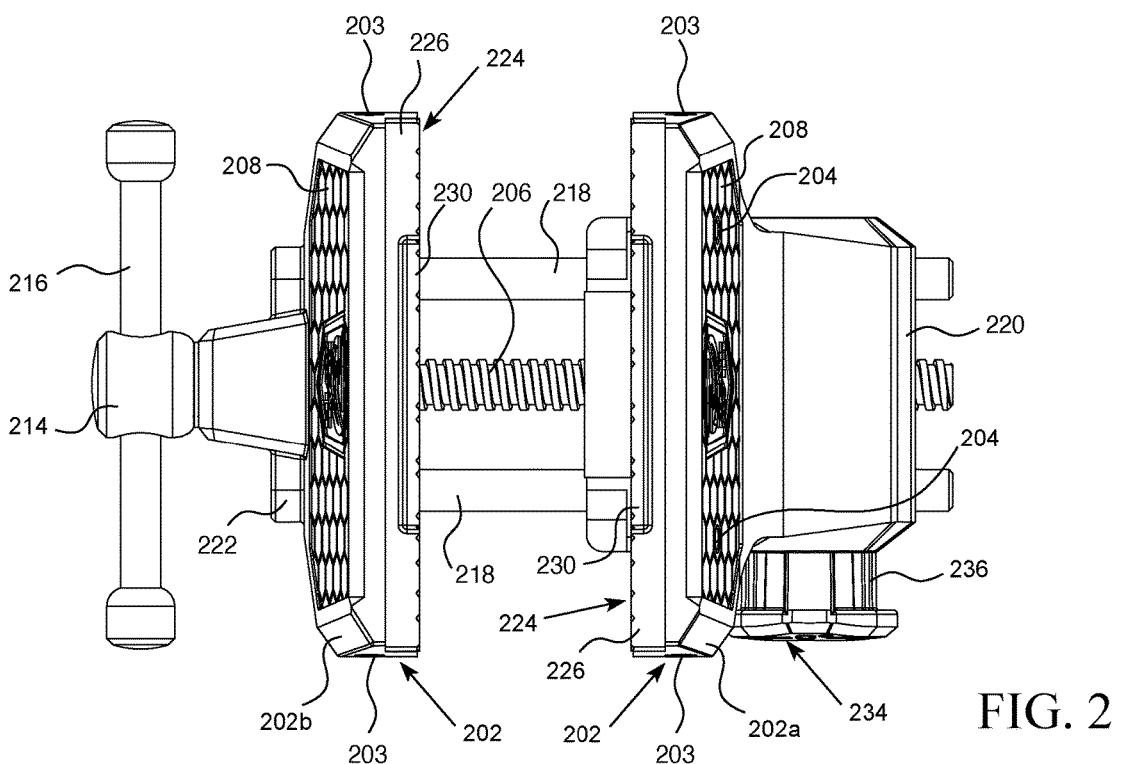
FIG. 2

300

300

490

Upper

Lower

500

516    524    514    508
                          518
                          506
                          520

X —                                    — X 504    502    528    526    512    522

Proximal ⟷ Distal

500

516    524    514
526

518
506
510

504

520

502    508    528    512

522

500

504      524      522

520

500

504       522

512       520

900

520

514

522

512

504

502

1300

1302

1304

1308

1306

ACCESSORY FOR WORKING DEVICE

CROSS-REFERENCE TO RELATED APPLICATION

This application is a continuation-in-part of U.S. Non-Provisional application Ser. No. 29/869,240, filed Dec. 27, 2022 and titled CLIP FOR VISE ACCESSORIES; and is a continuation-in-part of U.S. Non-Provisional application Ser. No. 18/489,450, filed Oct. 18, 2023 and titled LEVELING KNOB SYSTEM AND MECHANISM, which is a continuation of U.S. Non-Provisional application Ser. No. 18/152,247, filed on Jan. 10, 2023 and titled ADJUSTABLE SUPPORT STAND; and is a continuation of U.S. Non-Provisional application Ser. No. 17/751,101, filed on May 23, 2022 and titled BALL JOINT SYSTEM AND SUPPORT DEVICE, which is a continuation-in-part of U.S. Non-Provisional application Ser. No. 17/455,034, filed on Nov. 16, 2021 and titled MULTIFACETED VISE-JAW COVER, which is a continuation-in-part of U.S. Non-Provisional application Ser. No. 16/989,878, filed on Aug. 10, 2020 and titled FIREARM VISE AND SUPPORT DEVICE, now U.S. Pat. No. 11,493,299, which is a continuation-in-part of U.S. Non-Provisional application Ser. No. 16/545,779, filed on Aug. 20, 2019 and titled FIREARM SUPPORT DEVICE, now U.S. Pat. No. 10,739,101, which claims the benefit of U.S. Provisional Patent Application Ser. No. 62/724,279, filed Aug. 29, 2018 and titled FIREARM SUPPORT DEVICE, all of which are herein incorporated by reference in their entirety.

FIELD OF THE INVENTION

This disclosure relates to accessories for working devices, and more particularly, relates to accessories that can transiently connect to vises and supports.

BACKGROUND OF THE INVENTION

During maintenance or construction activities, objects being worked upon are often held or otherwise supported by supports, clamps, jigs, vises, or other mechanical support arrangements. This can free up a user's hands for performing maintenance/construction tasks and can enable greater application of torque to components than, for example, handholding. However, often during maintenance or construction tasks, complimentary accessories are required to aid with maintenance (such as a flashlight or magnifying glass) that monopolize the user's hand(s), thus making it more difficult for the user to complete their maintenance/construction work. Additionally, if these accessories are placed or attached to nearby devices or surfaces, often times a user will eventually move or adjust themselves or the object being worked upon, thus necessitating further adjustment of the accessory. Therefore, it is desirable to provide accessories that can connect directly to a working device (or a receiving adapter on a working device) and provide for repositioning so a user can maintain the use of their hand(s) for maintenance and/or construction work and minimize time spent re-adjusting accessories.

SUMMARY OF THE INVENTION

This disclosure relates to accessories for working devices, and more particularly, relates to accessories that can transiently connect to vises and supports. In an illustrative but non-limiting example, the disclosure provides an accessory for a working device that can include a plug body having a length along a first axis and being comprised of a keyed connection piece on a first end, and an extension portion connected on one end to a second end of the plug body and on an opposite end to a tool, wherein at least the keyed connection piece of the plug body can be receivable by a plug receptacle on a receiving adapter or a working device.

In some cases, the plug body may be further comprised of a mount, and the mount can be connected on a first end to the second end of the keyed connection piece and on a second end to the extension portion. Further, the plug body may be further comprised of a compression spring connected to the mount near the second end of the mount, and a pivot joint positioned on the mount near the first end of the mount. Additionally, or alternatively, the keyed connection piece can have a length that is approximately equivalent to a length of the mount. In some cases, a majority of the extension portion may be a flexible and repositionable arm.

In some cases, the keyed connection piece can be multi-lobed. The accessory can further include a spring-loaded locking mechanism that is structured and configured to transiently lock the plug body to a receiving adapter or a working device. Additionally, the spring-loaded locking mechanism can be positioned along a second axis that is parallel to the first axis. Further, the plug body may be further comprised of a compression spring positioned near the second end, and a pivot joint positioned between the first end and the second end of the plug body. The spring-loaded locking mechanism can be comprised of a front hook on a first end, and a spring connection pin on a second end opposite the first end. A central portion of the spring-loaded locking mechanism can connect to the plug body at the pivot joint, enabling the locking mechanism to pivot relative to the plug body. In some cases, the compression spring may be positioned around the spring connection pin. And in some cases, the pivot joint may be positioned between the front hook and the spring connection pin. In some cases, the plug body can have a corresponding receiving hole into which the spring connection pin is transiently insertable. And in some cases, the front hook may be positioned over at least a portion of the multi-lobed connection piece. In embodiments where the keyed connection piece is multi-lobed, the multi-lobed connection piece can be tri-lobed. In some cases, the lobes of the multi-lobed connection piece can have a length equal to an entire length of the multi-lobed connection piece.

In some cases, the accessory can be combined with a working device, wherein the spring-loaded locking mechanism is further comprised of a front hook on a first end, and the front hook fits onto a complimentary hook receptacle on the working device. Alternatively, the accessory can be combined with a receiving adapter, wherein the spring-loaded locking mechanism is further comprised of a front hook on a first end, and the front hook fits into a complimentary receptacle on the receiving adapter. Further, the accessory and receiving adapter can be combined with a working device, wherein the receiving adapter mechanically connects to the working device.

In another illustrative but non-limiting example, the disclosure provides a method of using an accessory comprising inserting a plug body into a plug receptacle on a receiving adapter or working device, compressing a first end of a spring-loaded locking mechanism toward the plug body, securing a front hook of the spring-loaded locking mechanism over a hook receptacle on the receiving adapter or working device, and releasing the first end of the spring-loaded locking mechanism, wherein a compression spring can push the spring-loaded locking mechanism away from the plug body. In some cases, the method further comprises compressing the first end of the spring-loaded locking mechanism toward the plug body, pulling the plug body out from the plug receptacle, and releasing the first end of the spring-loaded locking mechanism, wherein the compression spring can push the spring-loaded locking mechanism away from the plug body.

The above summary is not intended to describe each and every example or every implementation of the disclosure. The Description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which:

FIG. 1 is a perspective view of an example of a portion of a vise tool;

FIG. 2 is a top plan view of the portion of the vise tool of FIG. 1;

DETAILED DESCRIPTION

Figure 3:
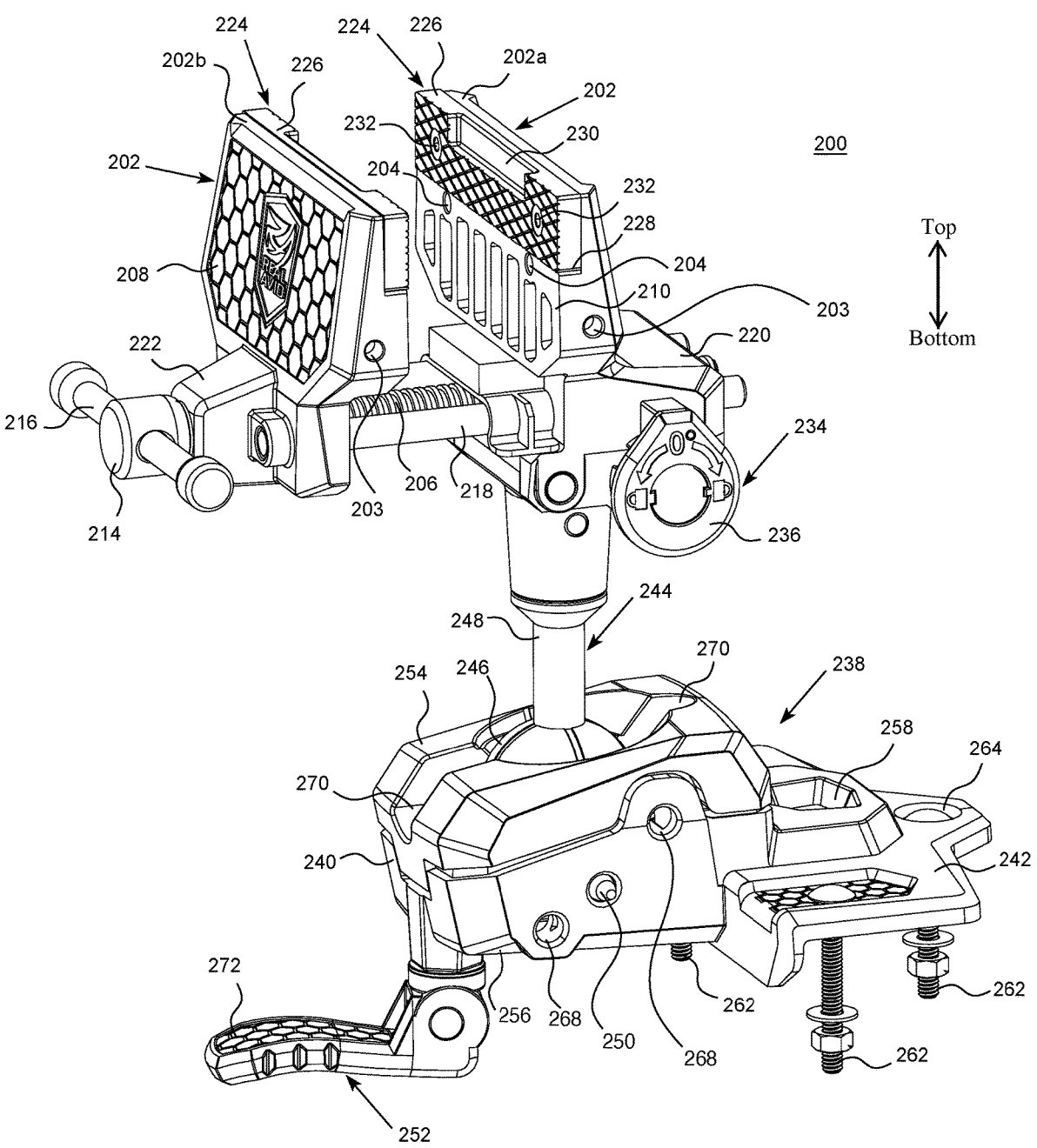
FIG. 3 is a perspective view of an example of a vise tool.

The present disclosure relates to accessories for working devices, and more particularly, relates to accessories that can transiently connect to vises and supports. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements, those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Working Device Embodiment 1: Vise

Vise 200, as illustrated in FIG. 1, may include a plurality of vise jaws 202 that each have a plurality of jaw pin holes 204 and bolt-receivers 203. Vise jaws 202 may be connected to each other by threaded rod 206 and may be comprised of first jaw 202*a* and second jaw 202*b*. Further, jaw pin holes

Figure 4:
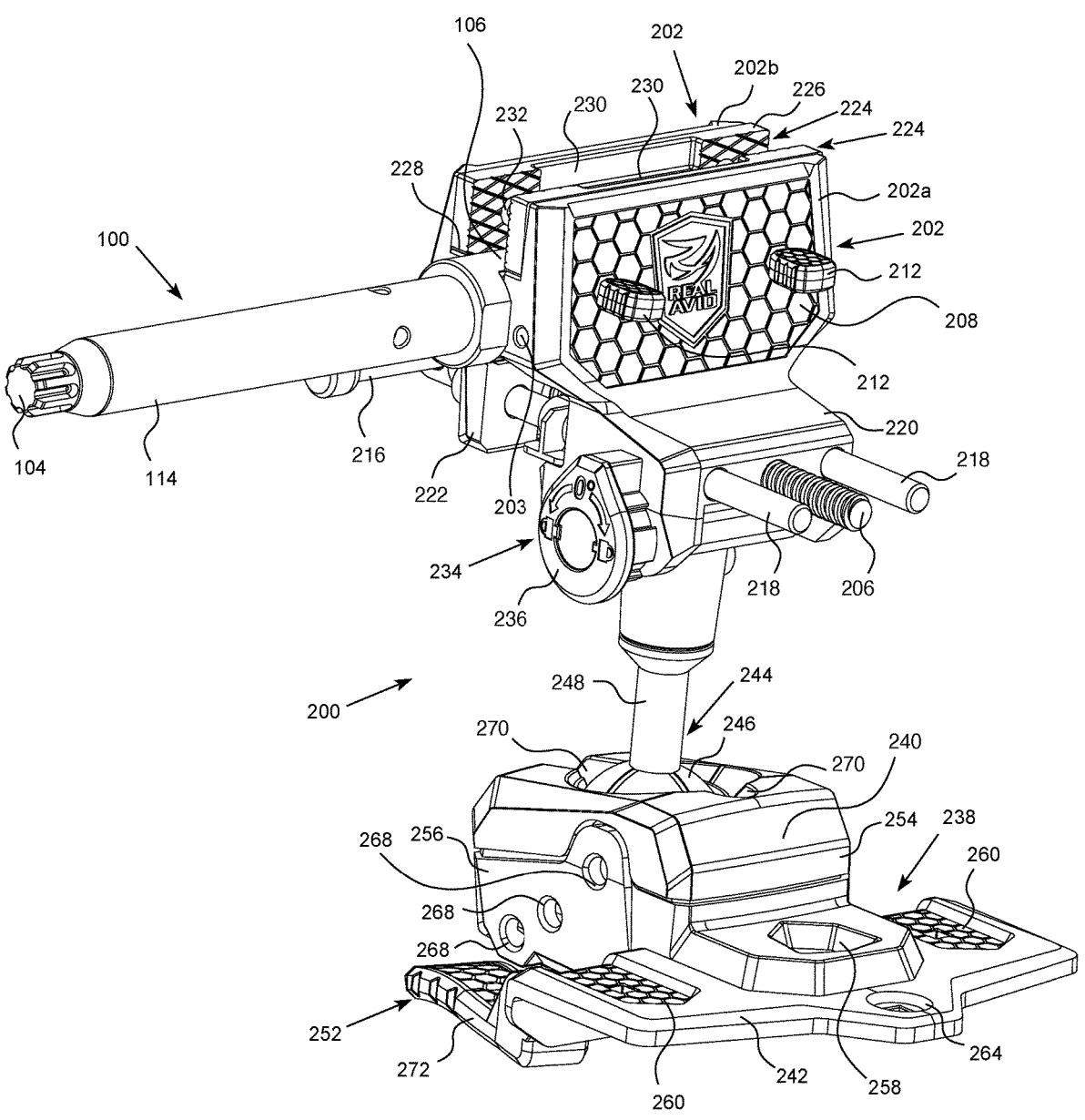
FIG. 4 is a perspective view of a support device clamped in the vise tool of FIG. 3.

204 in one or both of vise jaws 202 may extend from outer surface 208 of the vise jaw through to inner surface 210 of the vise jaw, and bolt-receivers 203 in one or both of vise jaws 202 may, as described above, be located on the left and right sides of vise jaws and may be minor images of each other. In some embodiments, some or all of jaw pin holes 204 in first jaw 202*a* can align with some or all of the jaw pin holes in second jaw 202*b*. Therefore, when a vise pin 212 is inserted into vise jaws 202, as illustrated in FIG. 4, it can insert into both first jaw 202*a* and second jaw 202*b* via the aligned jaw pin holes 204.

In some embodiments, vise jaws 202 may have relatively flat inner faces, and the flat inner faces may be textured to increase friction with a clamped component, such as firearm support device 100. However, a textured surface is not necessary for vise jaws 202 to securely clamp a component, as is described in detail below. Therefore, the inner face of each vise jaw 202 may, alternatively, be smooth. In some cases, inner faces 210 of vise jaws 202 may be parallel to each other and may be mirror images of each other such that when they are moved together so that the inner faces touch, the entire surface of one inner face touches the entire surface of another. However, in other embodiments, the inner faces may have slightly different dimensions and/or sizes such that one is smaller or larger than the other. In addition to inner faces, vise jaws 202 have top and side edges, which may be flat and angled 90 degrees from inner faces 210, as illustrated in FIGS. 1-5 and 9-11, as well as outer faces 208, which may be flat or decoratively patterned. Further, the outer face may be parallel to the inner faces or may slope outward from the top to the bottom, as illustrated in FIGS. 1-3 and 9-11.

Figure 9:
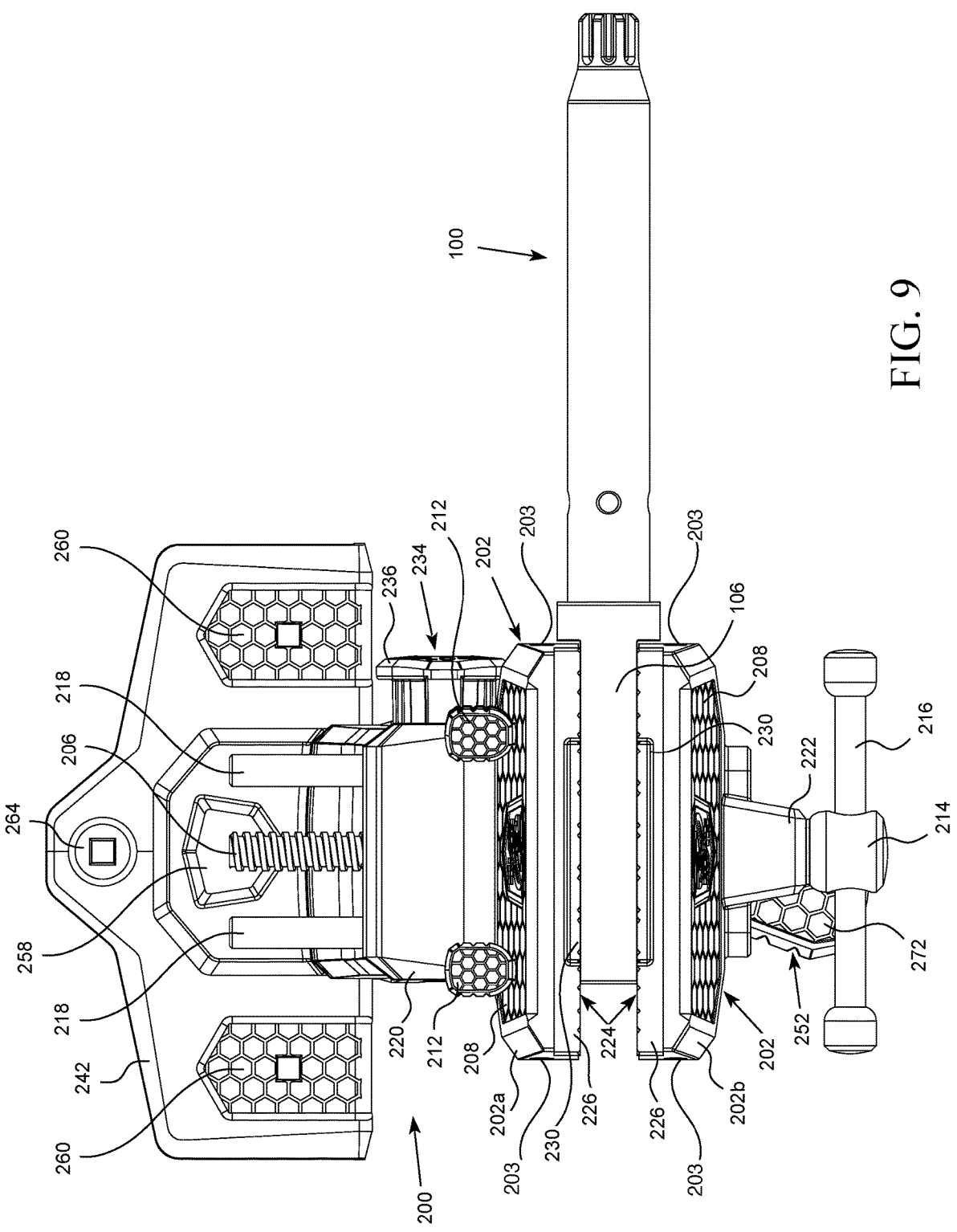
FIG. 9 is a top plan view of a support device clamped in the vise tool of FIG. 3.
Figure 10:
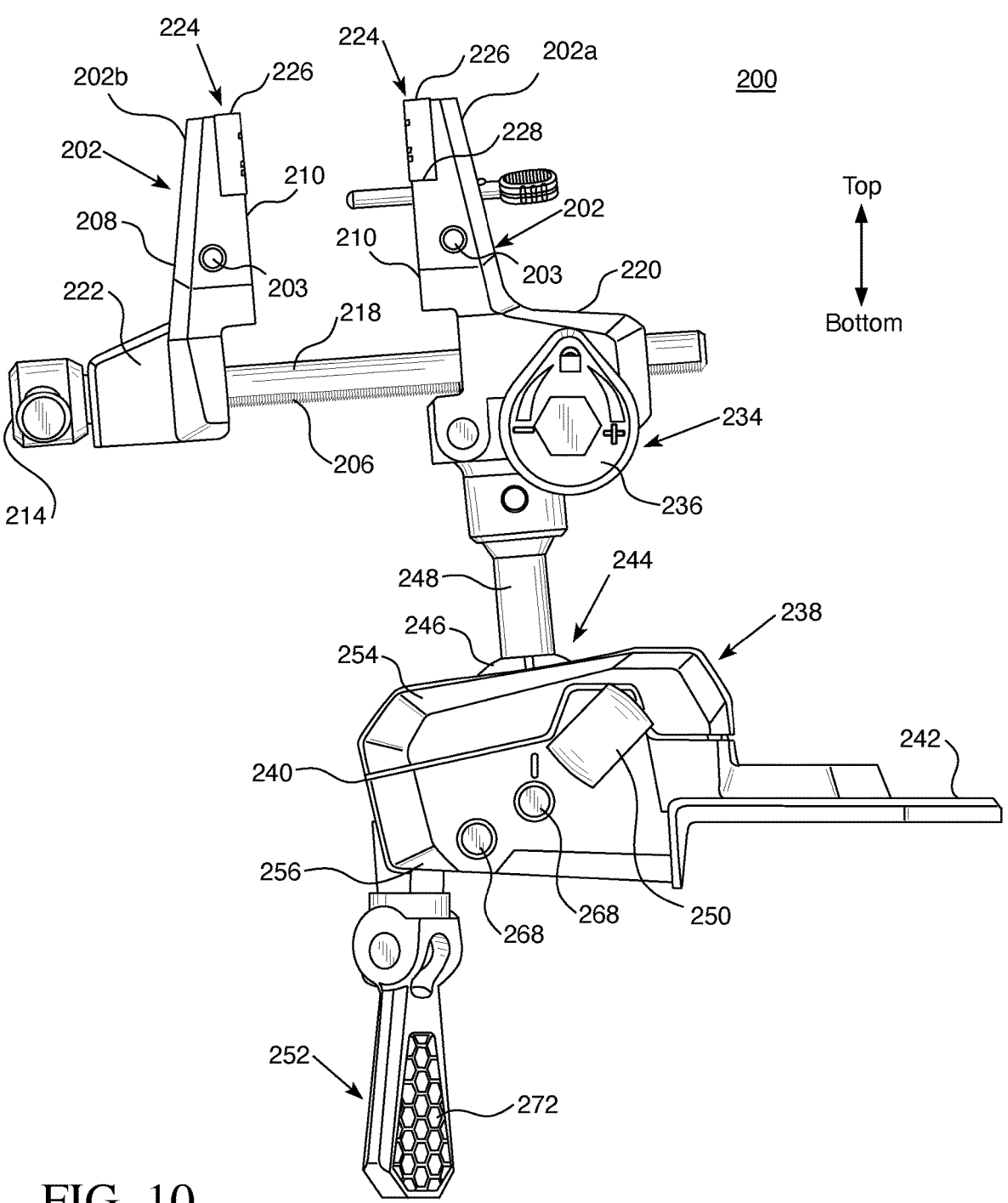
FIG. 10 is a side view of the vise tool of FIG. 3.

As mentioned above, vise jaws 202 may not need a textured surface to securely clamp a component in place. To accomplish a secure clamp, vise jaws 202 may have a plurality of jaw pin holes 204 into which vise pins 212 can be inserted to lock a clamping component, such as firearm support device 100 having vise pin holes 310, in place. Additionally, jaw pin holes 204 in vise jaws 202 may align with each other to enable a vise pin 212 to pass from one vise jaw through to another. More specifically, jaw pin holes 204 may be located in both vise jaws 202*a/b* and aligned with each other such that one vise pin 212 can be simultaneously connected to a jaw pin hole in each vise jaw. In some embodiments, jaw pin holes 204 may extend from outer surface 208 to inner surface 210 of one or both vise jaws 202. For example, as illustrated in FIGS. 4 and 9-10, first vise jaw 202*a* may have jaw pin holes 204 that pass from outer surface 208 to inner surface 210 and second vise jaw 202*b* may have jaw pin holes that are only open to its inner surface. Therefore, when firearm support device 100 is clamped into vise 200, vise pins 212 can be inserted from outer surface 208 of vise pin holes 204 of first vise jaw 202*a* and through to inner surface 210, through the support device, and into vise pin holes 204 on the inner surface of second vise jaw 202*b* where they can be stopped by the remaining solid material of the second vise jaw. While vise pin holes 204 are illustrated herein on outer surface 210 of first vise jaw 202*a*, it is noted that first vise jaw 202*b* can have vise pin holes 204 that penetrate from the outer surface through to the inner surface as well.

Figure 5:
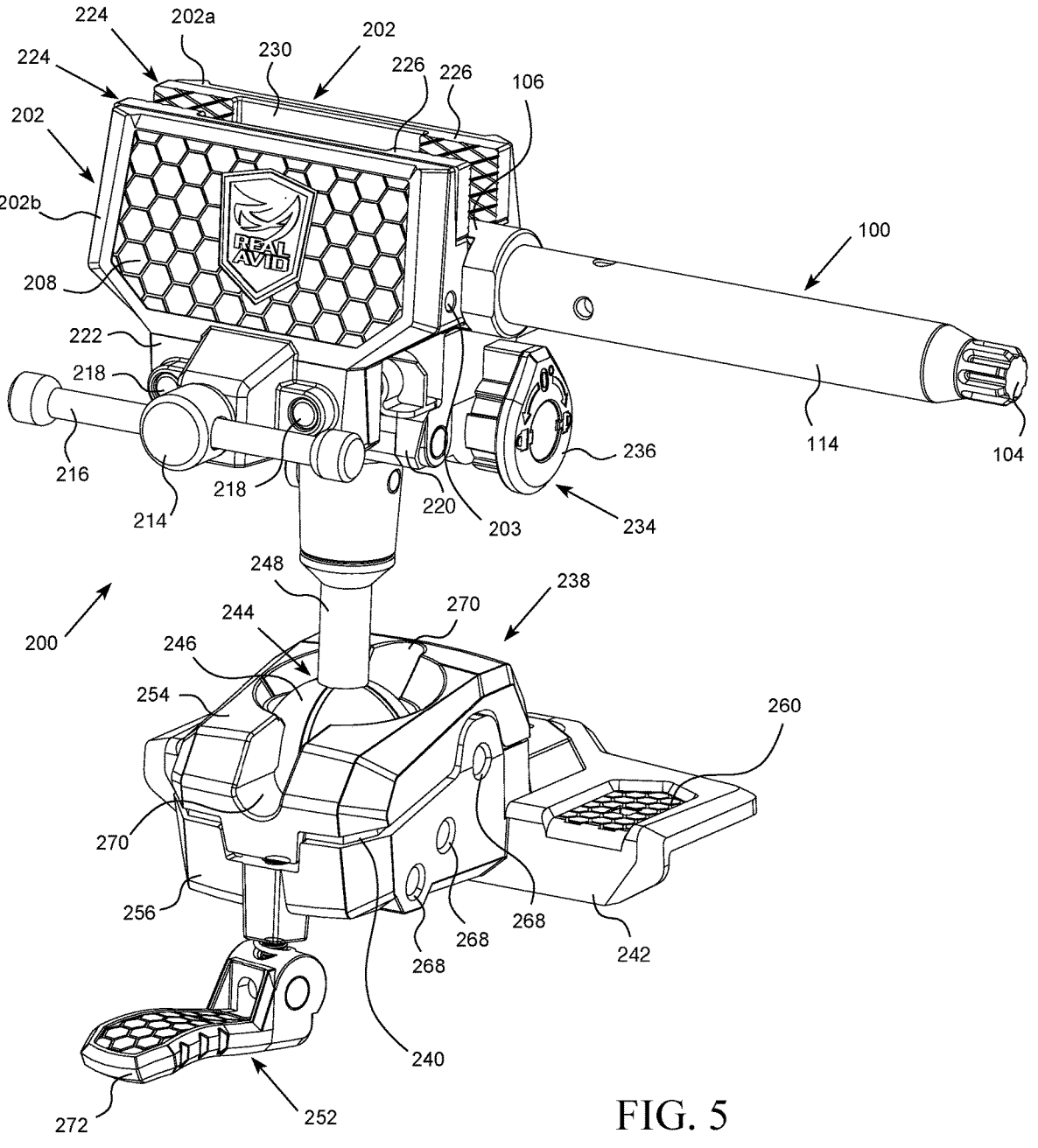
FIG. 5 is a perspective view of a support device clamped in the vise tool of FIG. 3.

In some embodiments, some or all of jaw pin holes 204 in first jaw 202*a* can align with some or all of the jaw pin holes in second jaw 202*b*. Therefore, when a vise pin is inserted into vise jaws 202, it can insert into both first jaw 202*a* and second jaw 202*b* via the aligned jaw pin holes 204. In one configuration, jaw pin holes 204 may horizontally align with each other on each vise jaw 202. For example, as illustrated in FIGS. 3-4 and 9, two holes from vise jaw 202 may be aligned along a horizontal line such that they are the same distance from the top and/or bottom of first vise jaw 202*a*. This allows the component to be locked in a parallel configuration to inner faces 210 of vise jaws 202, as illustrated in FIGS. 4-5. Other jaw pin hole configurations may include two holes aligned along a vertical line such that when vise 200 is upright, the first hole is directly above, or below, the second hole, and the component can be locked perpendicular, or 90 degrees, to inner faces 210. These are not the only alignments or configurations that may be possible. Further alignments or configurations can include any angle such as, but not limited to, jaw pin holes that allow for the component to be locked at a 30-degree angle, a 45-degree angle, and a 60-degree angle to the inner face. There may be several jaw pin holes in each vise jaw such that any or all of the above-mentioned hole configurations are accessible to a user. For example, in one embodiment, each vise jaw may have four vise pin holes, wherein two of the vise pin holes vertically align on one half of the vise jaw, two of the vise pin holes vertically align on another half of the vise jaw, the top two vise pin holes are horizontally aligned with each other, the bottom two vise pin holes are horizontally aligned with each other, and the bottom vise pin holes and their opposite side, top vise pin hole are in 45-degree alignment.

Vise pins 212 may be structured and configured to be received by any of the plurality of the vise pin holes of clamping portion 106 of firearm support device 100 as well as by any of the plurality of jaw pin holes 204 of vise jaws 202, such that the vise pins are elongate and cylindrical in form and the vise pin holes are similarly shaped and dimensioned to enable a friction fit. More specifically, the external circumference of vise pins 212 may be substantially equivalent, albeit slightly smaller, to the internal circumference of the vise pin holes and jaw pin holes 204. Vise pins 212 may be inserted from the outer surface of vise jaw 202, thereby allowing user to clamp component between the vise jaws prior to inserting the vise pins. Further, as discussed more below, if the clamped component, such as firearm support device 100, has pin holes, the clamped component may first be secured between vise jaws 202 and then vise pin 212 can be inserted into one vice jaw, through the clamped component, and into second jaw. If two or more vise pins 212 are used, this can lock the clamped component securely in place for the user to work with. So positioned, the vise pins 212 can serve to define and to assist in maintaining a working angle for the clamped component (for example, firearm support device 100). In some embodiments, the vise pins may be simple cylindrically shaped pins. Alternatively, vise pins 212 may have a head or grip on one end of a cylindrical shaped pin portion, as illustrated in FIGS. 4 and 9-10, to offer users a more ergonomic grip when placing the vise pin through vise jaws 202 and the clamped component. The head or grip may be textured or smooth and may have any ergonomic shape such as an elongated mushroom head, ball, or any other grab point.

To clamp vise jaws 202 on a clamping component, such as firearm support device 100, second jaw 202*b* may be moveable relative to first jaw 202*a*, such that the second jaw can move toward and away from the first jaw along threaded rod 206. More specifically, vise jaws 202 may further include bases 220, 222, and the bases may house threaded rod 206 and be positioned below the vise jaws, allowing for inner faces 210 of the vise jaws to be free from interference of the threaded rod when clamping onto a component. For example, first jaw 202*a* may be connected to a top portion of, or molded from the same part as, clamp base 220, and second jaw 202*b* may be connected to a top portion of, or molded from the same part as, jaw base 222. Therefore, jaw base 222 may connect to clamp base 220 via threaded rod 206, enabling second jaw 202*b* to move relative to first jaw 202*a*. To enable rotation of threaded rod 206 and movement of one vise jaw toward another, the threaded rod may have a screw head attached on one end that a user can rotate. More specifically, screw head 214 may be attached to threaded rod 206 on an outer portion of jaw base 222 of second jaw 202*b*, as illustrated in FIGS. 1-3, 5 and 9-11. Further, screw head 214 may have an aperture through which handle 216 can be inserted. In some cases, screw head 214 and handle 216 may be one singular molded part and in other cases, they may be separate parts. Handle 216 can be elongated and rigid, such that it will not bend or flex when human pressure is applied to the handle. Additionally, handle 216 may be straight, as illustrated, or have curvature, which can provide an ergonomic grip to user. When handle 216 is turned, it can cause rotation of screw head 214, which can cause rotation of threaded rod 206. Rotation of threaded rod 206 can then cause second jaw 202*b* to move toward or away from first jaw 202*a*. For example, clockwise rotation of threaded rod 206 may cause second jaw 202*b* to move toward first jaw 202*a*, while counterclockwise rotation of the threaded rod may cause second jaw to move away from first jaw.

In addition to threaded rod 206, jaw base 222 may also be connected to clamp base 220 via one or more guide bars 218. Guide bars 218 may be smooth so as not to provide friction when second jaw 202*b* moves toward first jaw 202*a*. Further, guide bars 218 may be cylindrical, as illustrated in FIGS. 1-4, or may have another shape such as rectangular or pyramidal, and they may offer additional support for when heavy components are clamped between vise jaws 202. This additional support may keep vise jaws 202 from becoming misaligned if they are twisted due to torque applied during use of vise 200, and the support may also prevent threaded rod 206 from bending due to having to withstand too much torque. In some embodiments, as illustrated in FIG. 2, vise 200 may include two guide bars 218 that are parallel to, and on opposite sides of, threaded rod 206.

In some embodiments, vise jaws 202 may each have a ledged, upper recess on inner faces 210 such that each vise jaw is compatible with insert 224. Insert 224 may be approximately rectangular with flat inner and outer faces, which may be parallel to each other, may have top long edge 226 and bottom long edge 228, and the upper recess in vise jaws 202 may be approximately the same size and shape as the insert such that when the insert is attached to the vise jaw, the side and upper edges of both the vise jaw and the insert align and the inner faces are on the same plane. In some cases, the inner face of insert 224 may be textured (for example, knurled) and the outer face of the insert may be smooth, although this is not required and either or both faces may be textured or smooth. If the outer face of insert 224 is smooth, the surface of the ledged, upper recess may also be smooth to prevent gaps between the insert and the upper recess when they are connected together. Since insert 224 may be removable, an attachment mechanism can be used to keep the insert connected to vise jaw 202. More specifically, vise jaw 202 and insert 224 may be attached or connected using connections such as, but not limited to, screws 232, as illustrated in FIGS. 1 and 3, snap fit connections, or dove tail connections.

Insert 224 may have cutout or recess 230 along top long edge 226 or bottom long edge 228 that is roughly rectangular. In some embodiments, the cutout/recess is through the entire insert, thereby causing the insert to have a u-shape. In other embodiments, cutout/recess 230 is only a portion of a long edge such that the back of insert 224 remains a complete rectangle, as illustrated in FIGS. 1, 3, 9, and 11. Further, insert 224 may be reversible and, if so, cutout/recess 230 along top long edge 226 may appear to be along a top portion when insert is in one configuration and it may appear to be along a bottom portion when insert is rotated 180 degrees into a reversed configuration.

In some embodiments, if jaw pin holes 204 are located in the region of vise jaws 202 where insert 224 attaches, then in order to retain the securing function of vise pins 212 when the insert is attached to the vise jaw, the insert can have insert pin holes that align with jaw pin holes 204. More specifically, the insert pin holes may be positioned such that they align with jaw pin holes 204 regardless of whether insert 224 is upright or upside down. For example, the insert pin holes may be located in the center of the insert. In other embodiments, the insert may have a first set of holes that align with jaw pin holes 204 in a first configuration and a second set of holes of that align with the jaw pin holes when the insert is in the reversed configuration. However, to simplify the design of vise 200, jaw pin holes 204 may be located beneath the connection region of insert 224 with vise jaws 202, as illustrated in FIG. 3.

Figure 18:
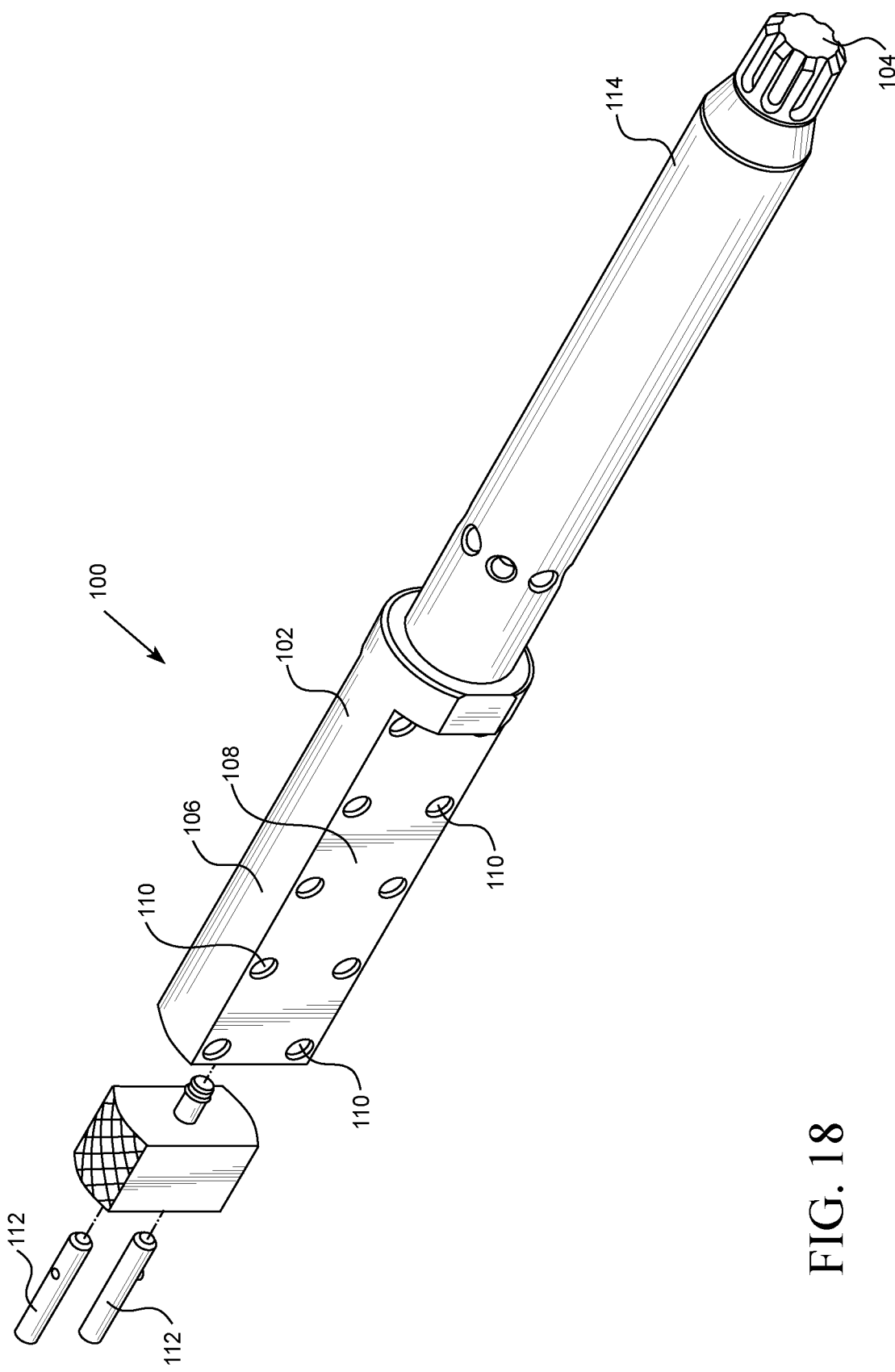
FIG. 18 is a perspective view of an example of a support device.

To assemble a firearm support device 100 with vise 200 for use with a tool or firearm, a user can place firearm support device 100, illustrated in FIG. 18, between two vise jaws 202 of vise 200, as illustrated in FIGS. 4-5 and 9. Firearm support device 100 can have clamping portion 106, which can include two parallel clamping faces 108 on opposite sides of the clamping portion and which can define a plurality of vise pin holes 110. Vise jaws 202 can be comprised of first jaw 202a and second jaw 202b, and the first and second jaws can each define a plurality of jaw pin holes 204, wherein the jaw pin holes can extend between outer surface 208 of one or both jaws and inner surface 210 of each jaw. Once placed between vise jaws 202, the user can align at least two of the plurality of vise pin holes 110 with at least two of the plurality of jaw pin holes 204 from each jaw 202 and can clamp firearm support device 100 between the first and second jaws 202a/b of vise 200, thereby implementing a first locking feature. To further secure firearm support device 100 within vise 200, the user can next insert a vise pin 212 into outer surface 208 and through to inner surface 210 of one of jaw pin holes 204 of, for example, first vise jaw 202a and continue inserting the vise pin until it penetrates through one of vise pin holes 110 of elongate member 102 of support device 100 and into the inner surface of one of the jaw pin holes of, for example, second vise jaw 202b. In this manner, a second locking feature is in place, and firearm support device 100 is no longer separable from vise 200 using solely shear forces.

To further lock firearm support device 100 into a specific configuration, the user can insert a second vise pin 212 into outer surface 208 and through to inner surface 210 of a second of the jaw pin holes 204 of, for example, first vise jaw 202a and continue inserting the vise pin until it penetrates through a second of vise pin holes 110 of elongate member 102 and into the inner surface of a second of the jaw pin holes of, for example, second vise jaw 202b. Once this third locking feature is in place, firearm support device 100 is not only prevented from separating from vise 200, but it is now locked in a specific configuration that will resist user-applied torque in any direction. Therefore, a user can now insert barrel end 104 of supporting portion 114 of firearm support device 100 into an upper receiver of a firearm and can actively work on the firearm with reassurance that vise 200 will prevent unwanted movement of firearm support device 100 when it is secured in the vise.

In addition to connecting to first vise jaw 202a, clamp base 220 may also include, and be controlled by, leveling knob 234, which may also indirectly control jaw base 222 via its attachment to the clamp base vis-a-vis threaded rod 206. Leveling knob 234 may include a pin/rod (described in more detail below and illustrated in FIGS. 27-29), a spring (described in more detail below and illustrated in FIGS. 28-29), and knob 236 connected to an outer end of the pin/rod. The pin/rod may be locked within clamp base 220 when leveling knob 234 is in its home position. Then, when knob 236 is pulled out, the spring can be compressed, the pin/rod can be pulled out and removed from its home position, and leveling knob 234 may be able to rotate left or right. This left or right rotation can rotate vise jaws 202 a few degrees in one direction or another, which may help to level the vise jaws and the clamped component, such as firearm support device 100, for maintenance or other work. In some cases, when leveling knob 234 is rotated, the pin/rod is structured and configured such that it is prevented from locking back into its home position. However, leveling knob 234 may still provide enough friction and/or pressure to keep vise jaws 202 level until the user resets the leveling knob back into its home position.

In some embodiments, vise 200 may include vise base 238, which can connect to vise jaws 202 via clamp base 220, as illustrated in FIGS. 3-5 and 10-11. Vise base 238 may be used to mount vise 200 to a flat surface such as a workbench or table and may include housing 240, table mount 242, and a table clamp (not shown). Connection of vise base 238 to vise jaws 202 (via clamp base 220, for example) may be via ball joint 244, which can include ball 246, stem 248, ball lock 250, and/or cam latch 252, as illustrated in FIG. 3. Alternatively, connection of vise base 238 to clamp base 220 can also take place by a fixed connection component such as, but not limited to, a rod, neck, or post. Connection by ball joint 244 may allow for fewer jaw pin holes 204 since vise jaws 202 can move the clamped component, such as firearm support device 100, into many positions, angles, and configurations due to the flexibility of the ball joint, whereas connection by a fixed connection component may be more compatible with embodiments of the vise jaws that include additional jaw pin holes since the additional jaw pin holes will enable the clamped component to be moved into more than one secured position.

Housing 240 of vise base 238 may be comprised of one or more parts. In embodiments having ball joint 244 as a connection mechanism between vise base 238 and clamp base 220, housing 240 can have at least two parts, such as top portion 254 and bottom portion 256, to aid in assembly and, as mentioned in more detail below, locking of the ball joint via a clamping mechanism. In embodiments having a fixed connection component, the housing may be limited to one piece. Housing 240 may be either connected to table mount 242 or may be a continuous piece with the table mount such that they are not removable from each other. In some cases, housing 240 may have a top portion separate from a bottom portion and the bottom portion may be one continuous piece with table mount 242. Other configurations are possible.

As mentioned above, table mount 242 and the table clamp (not shown) can secure vise 200 to a flat, working surface such as a workbench or table. Therefore, table mount 242 may have a flat bottom face to increase the amount of surface area in contact with the working surface and to allow for a secure mount to the working surface. The top of table mount 242 may also be flat or may have additional features. For example, the top of table mount 242 may include storage trays, cavities, or pockets 258 for holding tools or firearm parts. In some embodiments, the top of table mount may include recessed portion 260 that is structured and configured to receive a portion of table clamp. Further, housing 240 may connect to table mount 242 along a central portion such that the table mount may have recessed portion 260 on either side of the central portion, as illustrated in FIGS. 4 and 9. This allows for two table clamps to secure table mount 242 to the working surface. More specifically, the table clamp may be a c-clamp and a top arm of the table clamp may nest into recessed portion 260 on table mount 242. This recessed portion may be smooth, or it may have a texture so as to increase friction and prevent unwanted sliding between table mount 242 and a table clamp. Another method for connecting table mount 242 to a work surface is via screws, as illustrated in FIG. 3. More specifically, recessed portion(s) 260 may include holes or openings into which screws 262 can be inserted. Further, table mount 242 may have connection point 264 specifically structured and configured for screw 262, as further illustrated in FIG. 3, wherein the connection point is a recessed portion that is smaller than recessed portion 260 and shaped more similarly to a screw head.

Figures 6, 7, 8:
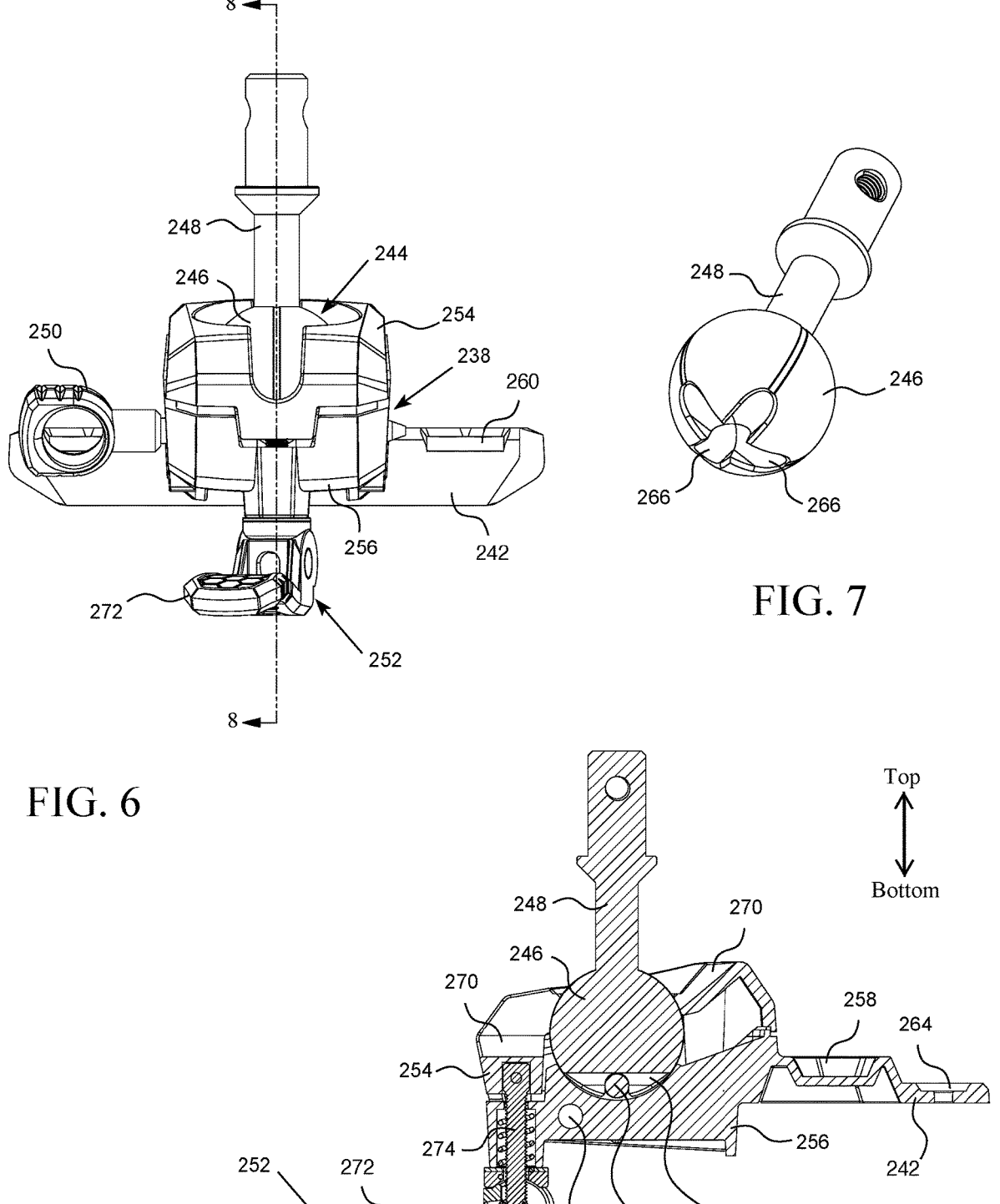
FIG. 6 is a front view of a portion of the vise tool of FIG. 3.
FIG. 7 is a perspective view of a portion of a ball joint of the vise tool of FIG. 3.
FIG. 8 is a cross-sectional side view of the portion of the vise tool of FIG. 6 taken from the line 8-8 in FIG. 6.
Figure 11:
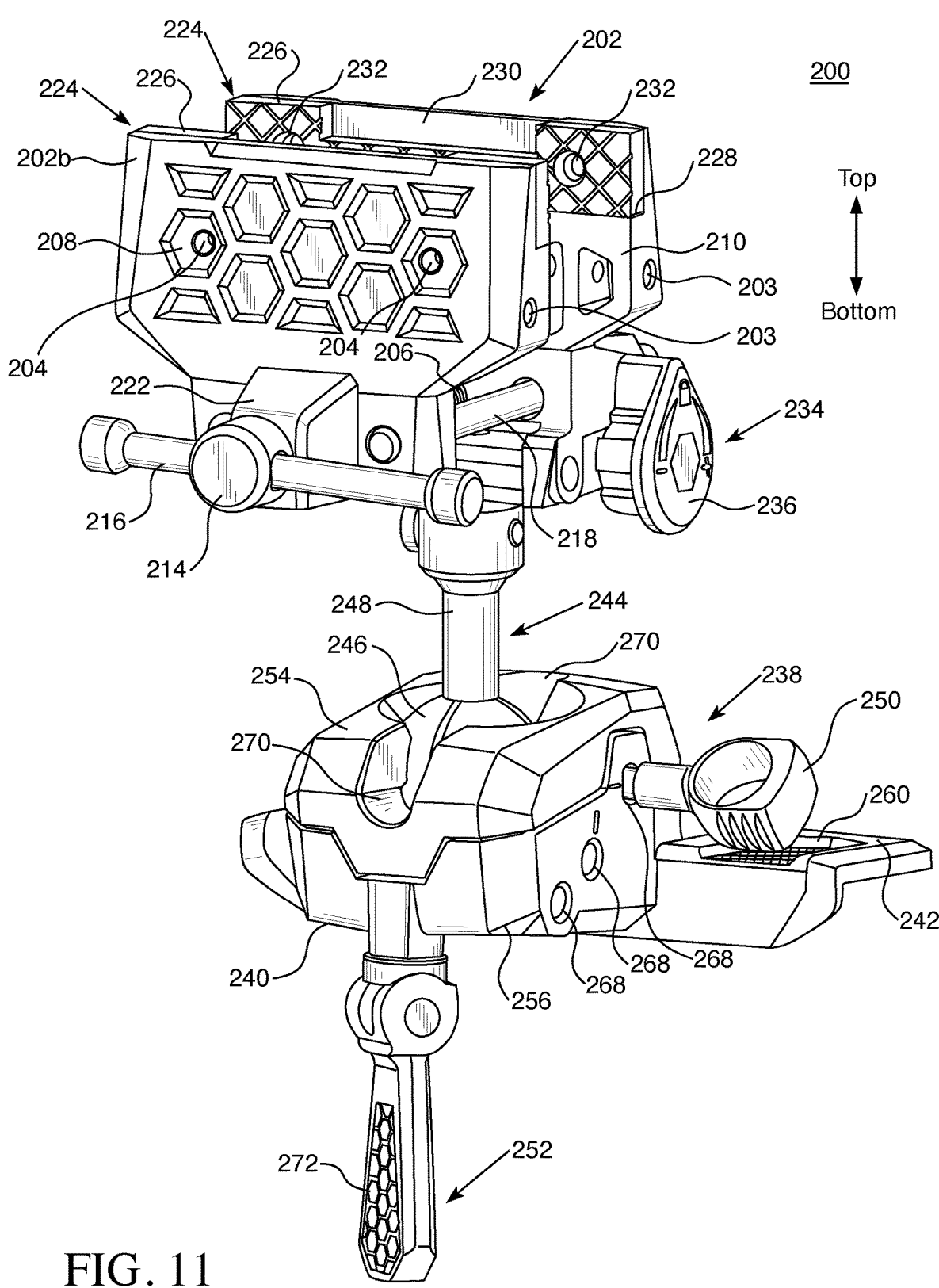
FIG. 11 is a perspective view of the vise tool of FIG. 3.

As mentioned above, housing 240, in addition to connecting to table mount 242, can connect to a connection component, such as ball joint 244, to connect vise base 238 to clamp base 220. As illustrated in FIGS. 3, 6 and 11, ball joint 244 may include ball 246, stem 248, and ball lock 250, wherein the stem can be connected on a first end to the ball and on a second end to a portion of vise jaws 202 (for example, clamp base 220), and the ball lock can secure the ball in one or more predetermined positions. Ball 246 may be located at least partially within housing 240 or, alternatively, may be completely surrounded by the housing.

In some embodiments, ball 246 may be comprised of one or more passages 266 through which ball lock 250 can be inserted in order to lock the ball in a predetermined position, although in some cases, vise pin 212 and ball lock 250 may be interchangeable so the vise pin may be used instead of the ball lock. More specifically, ball 246 can include two passages 266 that may be located at least partially along a bottom surface of the ball (i.e., opposite the side of the ball that connects to stem 248), may be perpendicular to each other, and may have surfaces that intersect or cross through each other, as illustrated in FIG. 7. Passages 266 may not be entirely internal to ball 246 and at least a portion of the length of each passage may be partially open to the inner surface of housing 240 (for example, a portion of the passage may be a channel that is at least partially open along an exterior surface of the ball) such that at least a portion of ball lock 250 (for example, a lengthwise side of the ball lock), when inserted into a passage, is not completely surrounded by the ball and may be exposed to the interior of the housing. More specifically, the part of ball lock 250 that is in the option portion of passage 266 can be located directly between the surface of the passage and the interior of housing 240. In some embodiments, passage 266 may be completely open such that the portion of ball lock 250 within housing 240, when inserted into the passage, is located directly between the surface of passage 266 and the interior of the housing. Further, passages 266 may extend completely through ball 246, as illustrated in FIG. 7, or, alternatively, may extend partway into the ball but end prior to reaching the opposite side of the ball.

Since ball 246 can be located within housing 240, the housing may further include a plurality of ball lock holes 268 in, for example, at least one side of the housing into which ball lock 250 can be inserted to gain access to passages 266. Ball lock 250 can be elongate and cylindrical in form and ball lock holes 268 can be similarly shaped and dimensioned (i.e., also elongate and cylindrical in form) such that the ball lock can securely fit in a ball lock hole. One embodiment may include at least two ball lock holes 268 in at least one side of housing 240. For example, there may be three ball lock holes 268 in two sides of housing 240 (for example, two opposing sides), as illustrated in the figures. These ball lock holes 268 can enable ball lock 250 to enter into one of the ball lock holes on one side of housing 240 and, in some embodiments, exit out the opposite side of the housing, as illustrated in FIG. 6. More specifically, each ball lock hole may have an entrance on a first side of housing 240 and an exit on a second, opposite side of the housing.

Further, in some embodiments, at least two ball lock holes 268 are configured such that ball 246 is positioned between the entrances and exits of the at least two ball lock holes and ball lock 250, when inserted into the at least two ball lock holes 268 also inserts into one of passages 266. Additionally, a third ball lock hole (for example, the hole closest to cam latch 252 in FIG. 3) can be positioned such that ball 246 is not positioned between the entrance and exit of the third ball lock hole. This third ball lock hole 246 may be used as a storage hole when ball lock 250 is not in use. Therefore, the storage hole is positioned apart from ball 246, as illustrated in FIG. 8, such that insertion of ball lock 250 into the storage hole results in no physical contact with the ball, and the ball lock does not insert into any of passages 266.

Further, as mentioned above, ball 246 can include one or more passages 266 that are structured and configured to pair with ball lock 250 in one or more predetermined locking positions. For example, one embodiment of the device can include two perpendicular passages in ball 246, as illustrated in FIG. 7, that, in combination with ball lock holes 268, enable ball lock 250 to secure ball joint 244 in one of eight positions: vertical and facing forward, left, right, or back when the ball lock is inserted through, for example, a middle ball lock hole (i.e., a ball lock hole approximately centered in the housing), and horizontal and facing forward, left, right, or back when the ball lock is inserted through a back ball lock hole (i.e., a ball lock hole nearest to vise base 238). The top of housing 240 may include recessed passages 270 near its front and back to accommodate stem 248 of ball joint 244 when the ball joint is in a horizontally forward or angled backward position, respectively.

In addition to ball lock 250, which can be used to lock ball 246 securely in place when high amounts of torque may be applied to vise jaws 202, ball joint 244 may include cam latch 252 for securing the ball within housing 240 in additional positions that are not compatible with ball lock holes 268 and the ball lock. Cam latch 252 may help connect top and bottom of housing 254, 256 and can be used to lock ball 246 in any position by compressing the top and bottom of the housing onto the ball. More specifically, cam latch 252 can include lever 272 and threaded rod 274, and top and bottom of housing 254, 256 can have a threaded receiving cavity for receiving the threaded rod. To secure ball 246 in housing 244, lever 272 can be twisted (for example, counterclockwise), thereby turning threaded rod 274 within the threaded receiving cavity and pulling top and bottom of housing 254, 256 toward each other and tightening housing 240 around the ball. Lever 272 of cam latch 252 can then be rotated upward 90 degrees to lock in place, which prevents countertwisting of threaded rod 274 and adds additional compression to ball 246. To loosen ball 246, lever 272 can be straightened, rotated in the opposite direction (for example, clockwise), thereby turning threaded rod 274 within the threaded receiving cavity in the opposite direction and allowing top and bottom of housing 254, 256 to separate from each other and from the ball.

Figures 12, 13:
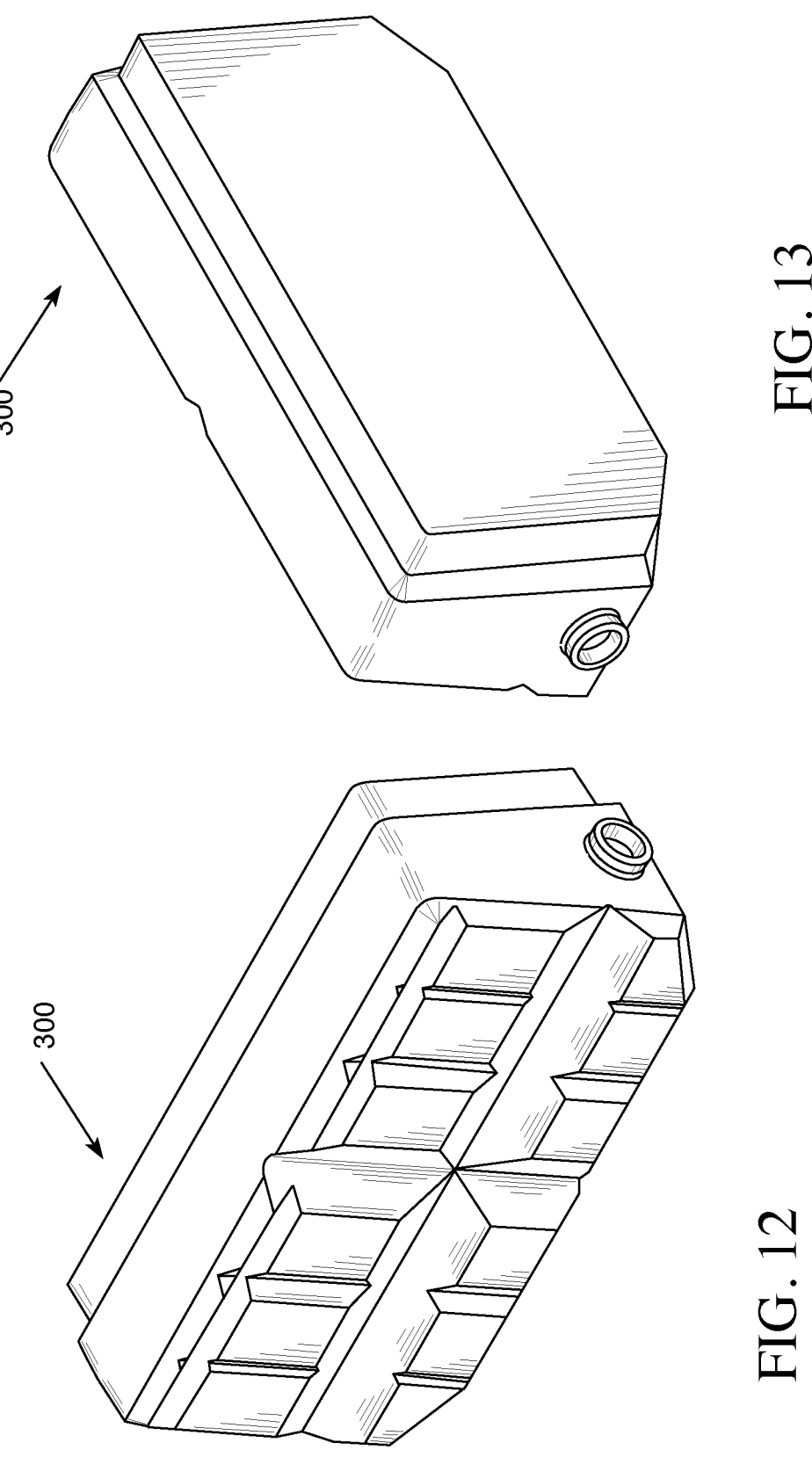
FIG. 12 is a front perspective view of an embodiment of a multi-faceted vise-jaw cover.
FIG. 13 is a rear perspective view of the multi-faceted vise-jaw cover of FIG. 12.

FIGS. 12 and 13 are schematic perspective views of an illustrative example of a multi-faceted vise-jaw cover 300 that are compatible with vise 200. In this particular embodiment, one working surface can be made from a deformable material that is adhered to a core, and the other working surface can be integral to the core of the view-jaw cover 300 such that it is comprised of the same material as the core.

Figure 14:
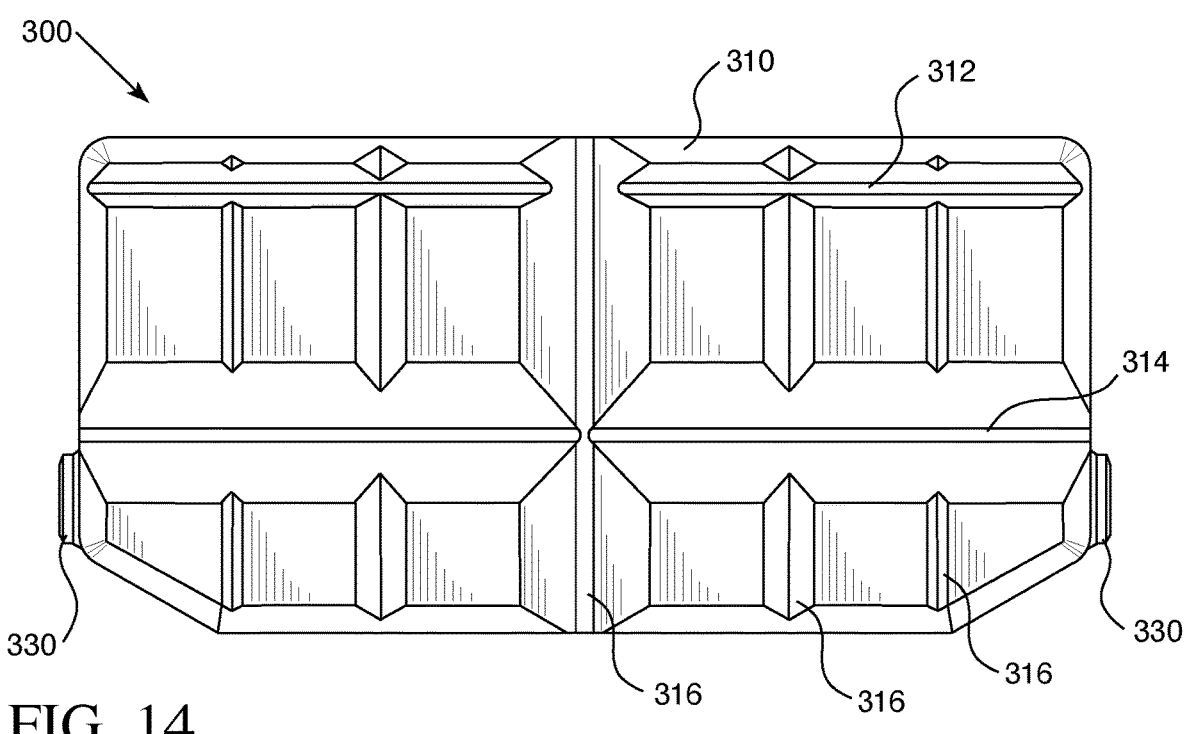
FIG. 14 is a front view of a first face of the multi-faceted vise-jaw cover of FIG. 12.

FIG. 14 is a front view of a multi-faceted vise-jaw cover 300. A first face 310, in this embodiment, can be integral to the core of the vise-jaw cover 300 such that the core and the first face 310 are comprised of the same material. In some embodiments, the core and the first face 310 are manufactured and configured such that they are one, molded piece that cannot be separated or two molded pieces that cannot be separated non-destructively.

Within the first face 310 may be a first horizontal groove 312, wherein the first horizontal groove 312 can be structured into a V-shape for conformance with the shape of a firearm's Picatinny rail. A second horizontal groove 314 can also be structured into a V-shape. Both the first and second horizontal grooves can be parallel to each other, and both can run the length of the first face 310 from the right to left sides. Other configurations may be implemented in the horizontal grooves to secure other devices, and such configurations may include U-shaped grooves and/or any other geometric shapes which may conform to other firearm and non-firearm elements alike. For example, the horizontal grooves may have a profile such as, but not limited to, rhombic, square, circle, and combinations thereof. In some embodiments, two vise-jaw covers 300 may be used (one over each of the vise jaws of a vise) and the horizontal grooves on a first of the two vise-jaw covers 300 may minor the horizontal grooves on a second of the two vise-jaw covers 300.

Figure 15:
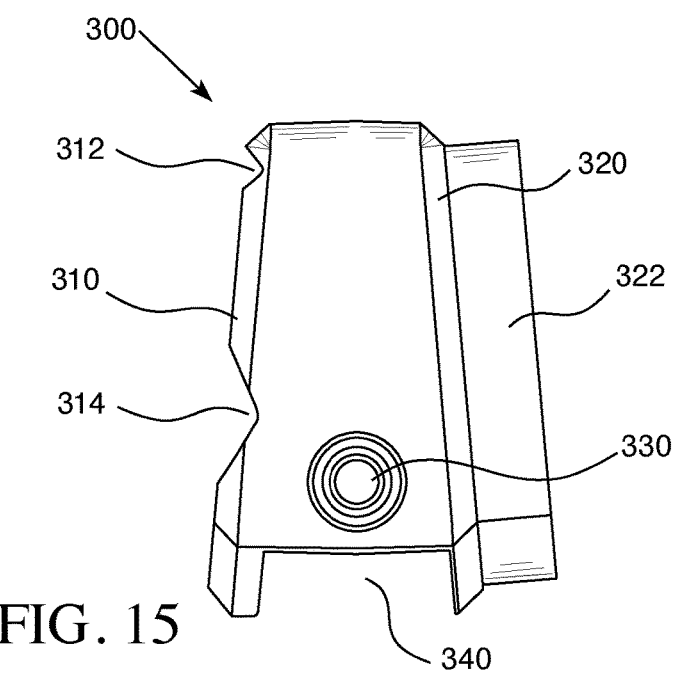
FIG. 15 is a right side view of the multi-faceted vise-jaw cover of FIG. 12.

In some embodiments, the first and second horizontal grooves 312, 314 are the same width and depth. In other embodiments, the grooves 312, 314 are different widths and/or depths. For example, as illustrated in FIGS. 12 and 14-15, the first horizontal groove 312 is both narrower and shallower than the second horizontal groove 314. However, this is not necessary and, in some cases, the first horizontal groove 312 may be only narrower or shallower than the second horizontal groove 314 and in other cases the first horizontal groove 312 may be wider and/or deeper than the second horizontal groove 314.

Additionally, the first horizontal groove 312 may be positioned nearer to the top of the vise-jaw cover 300 than the second horizontal groove 314. For example, as illustrated in FIG. 15, the first horizontal groove 312 may be positioned near the top of the front face 310, and the second horizontal groove 314 may be positioned near the bottom of the front face 310. In some cases, the two grooves 312, 314 may be closer together such that one or both are not near the perimeter of the vise-jaw cover 300 (for example, the top or bottom) but are closer to the middle. For example, as illustrated in FIG. 15, the second horizontal groove 314 may be positioned ⅓ to ½ of the way up from the bottom of the front face 310.

In addition to horizontal grooves, as illustrated in FIG. 14, the vise-jaw cover 300 may include a plurality of vertical grooves 316. These grooves can be perpendicular, in this embodiment of vise-jaw cover 300, to the right and left sides of the vise-jaw cover 300 as well as the first and second horizontal grooves 312 and 314, and the vertical grooves 316 can span the height of the first face 310. Also similar to the horizontal grooves, the vertical grooves may be V-shaped or they may be have a profile such as, but not limited to, rhombic, square, circle, and combinations thereof. In other embodiments, the vertical grooves may crisscross each other to allow the vise jaws the ability, when enveloped by the vise-jaw covers, to hold items at predefined and user desirous angles. These angled grooves may still run the entire height of the first face 310 to accommodate more desirous holding positions within the first face 310.

In some cases, there are five vertical grooves, as illustrated in FIGS. 12 and 14. However, the vise-jaw cover 300 can have fewer or more than five. Just as with the horizontal grooves, the vertical grooves may be configured into other shapes including U-shapes and/or any other geometries. As with the horizontal grooves, in some embodiments, two vise-jaw covers 300 may be used (one over each of the vise jaws of a vise) and the vertical grooves on a first of the two vise-jaw covers 300 may minor the vertical grooves on a second of the two vise-jaw covers 300.

Figure 16:
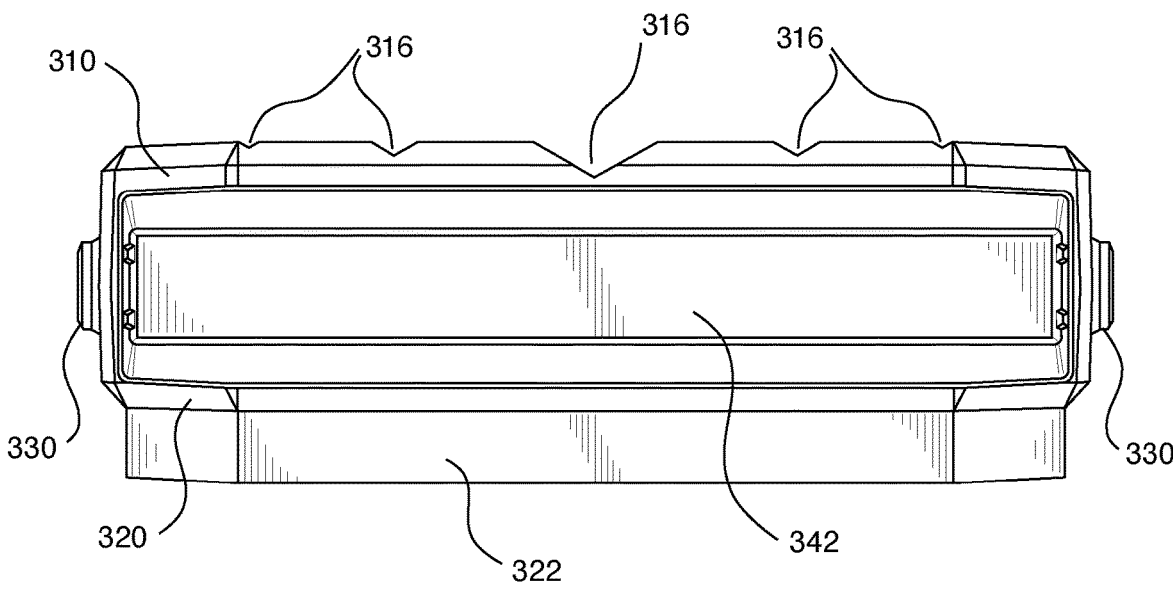
FIG. 16 is a bottom plan view of the multi-faceted vise-jaw cover of FIG. 12.
Figure 17:
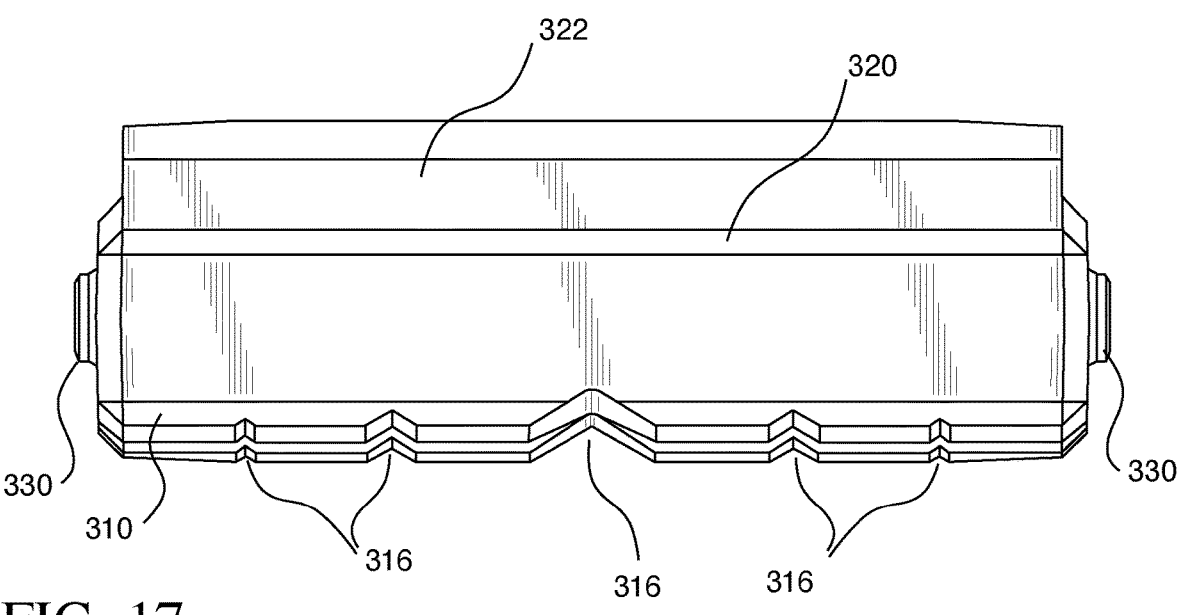
FIG. 17 is a top plan view of the multi-faceted vise-jaw cover of FIG. 12.

As with the first and second horizontal grooves 312, 314, the vertical grooves 316 may be the same width and depth or they may be different widths and/or depths. For example, as illustrated in FIGS. 12 and 16-17, the middle vertical groove can be both wider and deeper than the other vertical grooves of the vise-jaw cover 300. Further, the two vertical grooves on either side of the middle vertical groove, while narrower and shallower than the middle groove, can be wider and deeper than the two outermost vertical grooves. In this way, the vertical grooves 316 are a mirror reflection of each other when a vertical line is drawn down the center of the vise-jaw cover 300. However, the vertical grooves are not limited to this size configuration, and in some cases, each vertical groove may be of a different width and depth than each other vertical groove. In other cases, the size configuration may not be mirrored. For example, the width and depth of each vertical groove may increase from one side of the vise-jaw cover 300 to the opposite side.

Regarding positioning, the vertical grooves 316 may be evenly spaced across the face of the vise-jaw cover 300. For example, as illustrated in FIGS. 16-17, the middle vertical groove may be positioned at the central horizontal axis point of the front face 310. From there, two additional vertical grooves may be positioned on either side of the middle vertical groove such that there is equal distance between each of the grooves as well as the outer perimeter of the vise-jaw cover 300. However, in some cases, the vertical grooves 316 may be positioned closer together such that they are, as a group, closer to the middle or to one side of the vise-jaw cover 300. In other embodiments, the vertical grooves 316 may be unevenly spaced across the front face 300 and there may be uneven spacing between all or some of the grooves.

In addition to horizontal and vertical grooves, the vise-jaw cover 300 can include two bolt-holes 330 that can be located on both the right and left sides of the vise-jaw cover 300, as illustrated in FIGS. 14 and 16-17. Other embodiments may only contain one bolt-hole or may contain multiple bolt holes on one or both sides. Each bolt-hole 330 may include a center hole and may allow for the placement of a bolt, which may include a ball-lock, through its center hole and into a bolt-receiver (not shown) that is disposed within a vise jaw that is structured to receive the bolt and, if applicable, the ball-lock of the bolt. A bolt may be any elongate device that is structured to fit snugly within a bolt-hole and bolt-receiver. In some situations, the bolt and bolt-receiver may be threaded, and in some embodiments pin 212 may act as a bolt to secure the vise-jaw cover. In some cases, the bolt-hole 330 may also be threaded. In other cases, the bolt-hole 330 is not threaded. The bolt (not shown) may secure the vise-jaw cover 300 to a vise jaw by being placed through the bolt-hole 330 and into the vise jaw's bolt-receiver 203. Pins 212, illustrated in FIGS. 4 and 9-10, may act as a bolt to secure the vise-jaw cover.

In some embodiments, the two bolt-holes 330 can be symmetrical in their placement within each side of the vise-jaw cover 300 such that both bolt-holes 330 are spaced the same distance from the first face 310 as they are from the second face 320 and share a common axis. Additionally, the bolt-holes 330 may be positioned lower on the vise-jaw cover 300 than the second horizontal groove 314, as illustrated in FIG. 14. Other embodiments may include offset configurations for the bolt-holes to accommodate a particular vise jaw shape where the bolt-holes do not share a common axis and are not centered with respect to the first face 310 and the second face 320. For example, a vise may be comprised of a vise jaw that is oblong in relation to its work engaging and non-engaging sides; such a vise jaw would be dissimilar to the vise jaws illustrated in FIGS. 1-5, 9-11, and 19-20, where the jaws 202 have roughly the same distance from the bolt-receiver to the work-engaging inner face 210 and the bolt-receiver to the nonwork-engaging outer face 208. Therefore, a vise-jaw cover 300 may have a first bolt-hole 330 that is a first distance from the first face 310, wherein that first distance is a different distance than a second distance between the first bolt-hole 330 and a second face 320. The vise-jaw cover 300 may then have a second bolt-hole 330 that is a distance from a second face 320, wherein the distance between the second bolt-hole 330 and the second face 320 is the same distance as the first distance. Further, the distance between the second bolt-hole 330 and the first face 310 may be the same as the distance between the first bolt-hole 330 and the second face 320. This can provide the proper alignment of a bolt-hole 330 and a bolt-receiver of a vise jaw that has an oblong configuration; such bolt-holes 330 would not share a common axis. The distance between the bolt-hole 330 and either the first face 310 or second face 320 of the vise-jaw cover 300 can be such that the when the first or second face is the work engaging surface of a vise-jaw cover 300, the vise-jaw cover 300 can be disposed onto the work engaging inner face of the vise jaw and secured in place with a bolt. Such bolt-hole placement may be necessary for embodiments of the reversible vise-jaw cover for vise jaws having a bolt receiver that is closer to one of the inner or outer face.

FIG. 15 is a right side view of an embodiment of a vise-jaw cover 300. In this view, the V-shaped grooves of the first horizontal groove 312 and the second horizontal groove 314 are clearly shown. In some embodiments, the depths of the two horizontal grooves can vary to accommodate different firearm elements. More specifically, as mentioned above in greater detail, the first horizontal groove 312 can be shallower than the second horizontal groove 314. Other embodiments may have horizontal grooves with the same depth or where the depths are reversed form the present embodiment such that the first horizontal groove 312 is deeper than the second horizontal groove 314.

The lower side of the vise-jaw cover 300 may further include an opening 340 in the core, as illustrated in FIG. 15. The opening 340 may vary in size to accommodate a particular vise jaw. In some cases, the opening 340 may encompass the entire lower side of the vise-jaw cover 300. In other cases, the lower side of the vise-jaw cover 300 may have a portion that is solid and a portion that is the opening 340.

As illustrated in FIG. 16, the opening 340 can lead to the interior 342 of the vise-jaw cover 300, which can be a hollow cavity in the core. This hollow cavity may be defined by the front face 310, back face 320, the top and the sides of the vise-jaw cover 300. It can be a rectangular prism or, as illustrated in FIG. 16, it may be wedge-shaped. More specifically, a top portion of the interior 342 that is nearer to the first horizontal groove 312 may be narrower than a lower portion of the interior 342 that is closer to the opening 340 and the second horizontal groove 314.

The interior 342 of the core may, in some embodiments, be defined by a width, a depth, and a length of a vise jaw. The interior 342 of the core can be configured to accommodate a vise jaw. In some embodiments, a vise jaw (not shown) would be symmetrical, such that its work engaging face is structured and configured in the same shape as its non-work engaging face. Other embodiments of the vise-jaw cover 300 may include an interior 342 that is configured to accommodate non-symmetrical vise jaws.

As illustrated in FIG. 15 and mentioned briefly above, the vise-jaw cover 300 may further include a second face 320. The second face 320 can include an overlay 322 adhered to the surface of the second face 320. FIG. 15 shows the uniform structure of the core of a vise-jaw cover 300 along with the adhered overlay 322. More specifically, the core, comprised of the first face 310 and the second face 320, can be comprised of one, uniform material while the deformable overlay 322 can be comprised of a second, different material.

The overlay 322 may be comprised of a deformable material and may be configured into a rectangular prism that fully covers the second face 320. However, in some embodiments, the overlay 322 may only cover a portion of the second face 320. For example, it may cover a center portion such that the remaining, exposed portion of the second face 320 forms a perimeter around the overlay 322. Alternatively, the overlay 322 may be positioned nearer to the top, the bottom, or one of the sides. In yet another example, the overlay 322 may be comprised of multiple pieces that together make up the overlay 322 and are spaced apart on the second face 320 such that portions of the second face 320 are visible. The deformable material of the overlay 320 may consist of M. foam, #13 foam, #7 foam, and combinations thereof. These materials are unique in that they can be permanently adhered to the second face 320 and can obtain purchase of an object upon its work engaging face when used with either a vise jaw or a covered vise jaw.

As illustrated in FIG. 15, the bolt-holes 330 can be co-axial and equidistant from the first face 310 and the second face 320. More specifically, the bolt-holes 330 can be symmetrical such that they are vertically and horizontally in line with each other. Additionally, the bolt-holes 330 can be located above, and centered on, a cutout in each side of the vise-jaw cover 300. More specifically, the first face 310 and the second face 320 may span completely from the top to the bottom of the vise-jaw cover 300, whereas the sides of the cover 300 may each have a cutout near the opening 340. These cutouts can create a gripping point for a user to grab a vise jaw when removing the cover 300 and can also allow the first and second faces 310 and 320 to flex. These openings may, as illustrated in FIG. 15, be rectangular or they may be any other shape or set of shapes.

The top plan view of FIG. 17 again shows the plurality of vertical grooves 316 that run the entire height of the first face 310 and are perpendicular to the right and left sides of the vise-jaw cover 300. A structure for each bolt-hole 330 may project from the side in which it is installed (for example, left or right) to accommodate a bolt and provide a means to hold a vise-jaw cover 300 in place over a vise-jaw.

Figure 19:
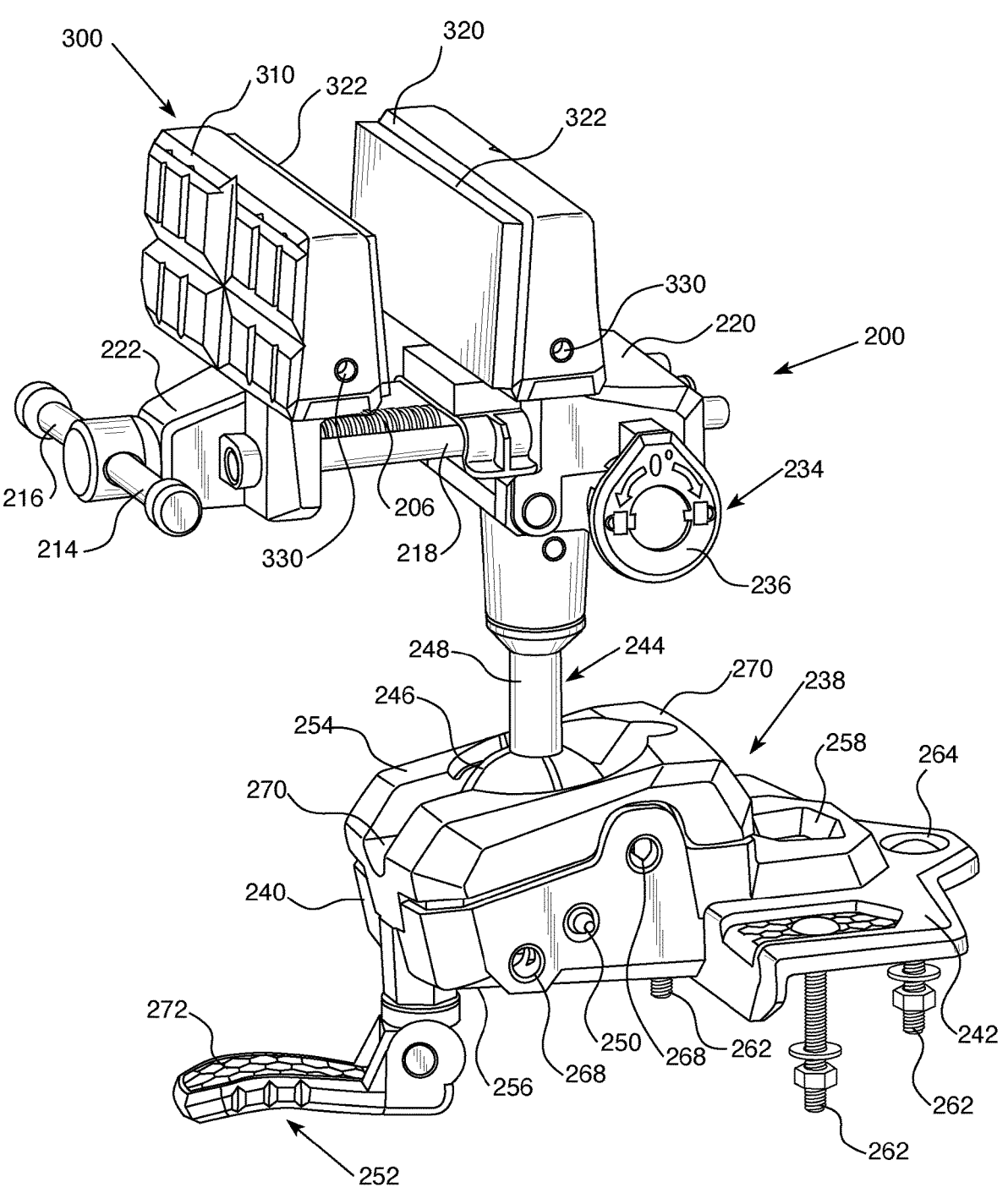
FIG. 19 is a perspective view of an illustrative example of an embodiment of multi-faceted vise-jaw covers disposed on a vise.
Figure 20:
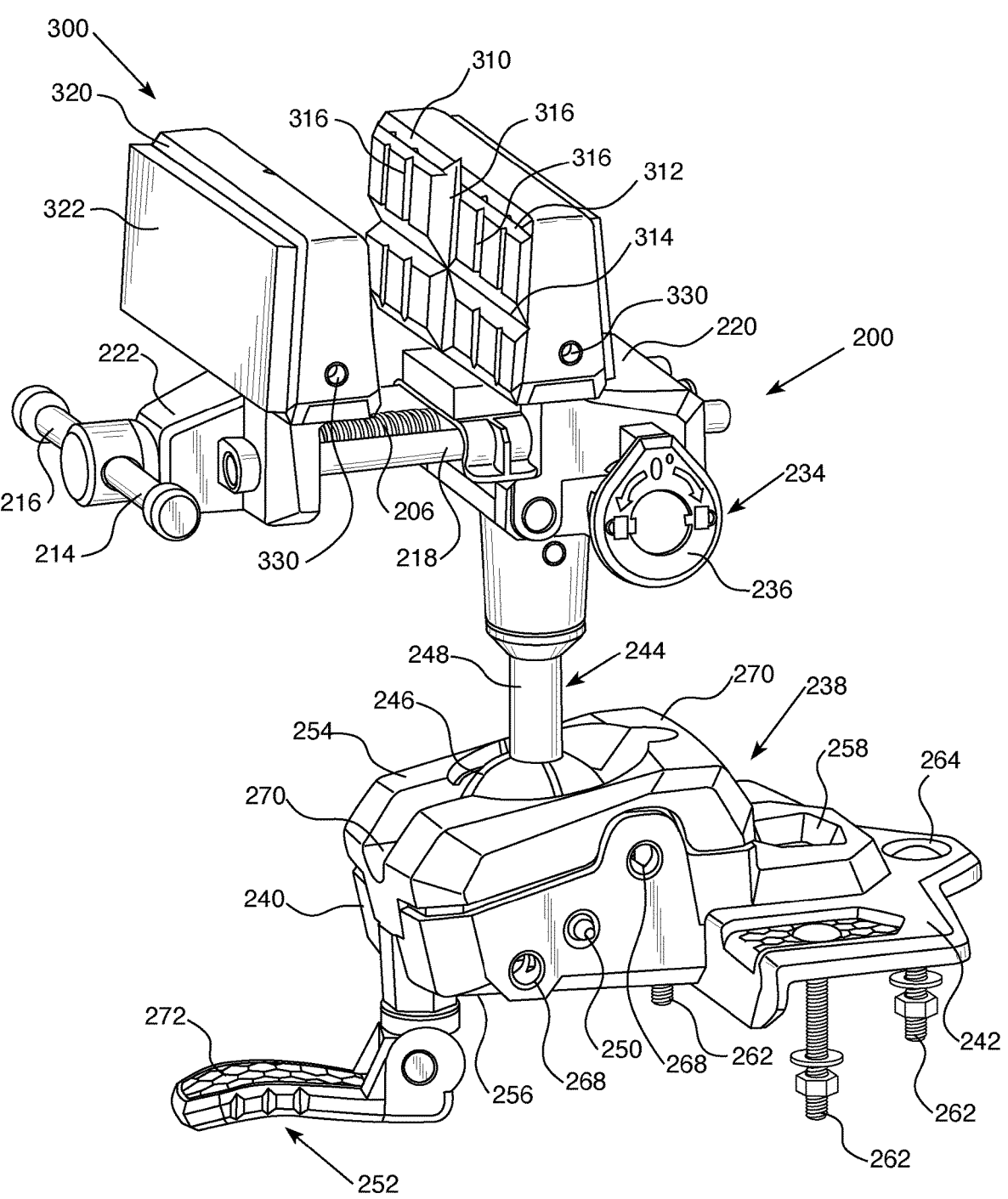
FIG. 20 is a perspective view of another example of an embodiment of multi-faceted vise-jaw covers disposed on a vise.

The deformable overlay 322 is shown herein with a uniform, smooth surface. However, the deformable overlay 322 may, in some embodiments, have a textured surface or a surface with wedges, divots, channels, or other cutouts or patterns that can assist with securing a device in place. The exterior face of the second face 320 may be roughly rectangular. In some cases, as illustrated in FIGS. 13 and 19-20, the lower corners of the second face 320 and/or the deformable overlay 322 may be angled. The bolt-holes 330 may be positioned above these angled cuts, as illustrated in FIG. 19. As mentioned above, the deformable overlay 322 can be made a of a second material that is a different material than that of the core. The deformable overlay 322 may attach to the second face 320 of the core using an adhesive. In some cases, the attachment may be permanent. In other cases, it may be removable such that the overlay 322 can be easily replaced.

FIG. 19 illustrates a pair of vise-jaw covers 300 where the second face 320 of each of the vise-jaw covers 300 have their deformable overlay 322 as the working surface of the vise 200. In such a configuration, as illustrated in FIG. 19, the vise 200 may be used to hold objects that have irregular shapes or where the surface of the object being held may be easily marred by less deformable material.

In another example of vise-jaw cover placement, FIG. 20 illustrates a pair of vise-jaw covers 300 where the first face 310 of each of the vise-jaw covers 300 have their horizontal grooves 312, 314 and vertical grooves 316 act as the working surface of the vise 200. In such a configuration, as illustrated in FIG. 20, the vise 200 may be used to hold a firearm that includes a Picatinny rail by placing the Picatinny rail into the opposing grooves of the pair of first faces 310. The same may be done with the barrel of a firearm.

To accomplish a secure clamp, a vise-jaw cover 300 may be placed over each vise jaw 202, and either the first face 310 or the second face 320 may more securely fit the clamped components than inner faces 210 through use of horizontal grooves 312, 314, vertical grooves 316, or deformable overlay 322. For example, first horizontal groove 312 may be sized to specifically accommodate a Picatinny rail, second horizontal groove 314 may be sized to specifically accommodate a firearm barrel, and deformable overlay 322 may deform when compressed so as to at least partially envelop and hold steady the component being clamped.

To assemble vise-jaw cover 300 with vise 200 for use with a tool or firearm, a user can place vise-jaw cover 300 over each of the two vise jaws 202 of vise 200. More specifically, opening 340 of vise-jaw cover 300 can be positioned over the top of vise jaw 202 and vise-jaw cover 300 can be slid down on top of vise jaw 202 such that interior 342 of vise-jaw cover 300 is filled by vise jaw 202. As mentioned above, either first face 310 or second face 320 may be positioned to be the engaging face over inner surface 210 of vise jaw 202. Once placed over vise jaw 202, at least one bolt-hole 330 can align with bolt-receiver 203 so that a bolt (not illustrated) can be inserted through the at least one bolt-hole 330 and into corresponding bolt-receiver 203. If two bolt-holes 330 align with two bolt-receivers 203, then two bolts can be inserted into each of the bolt-hole/bolt-receiver combinations.

Working Device Embodiment 2: Support Stand

Figure 21:
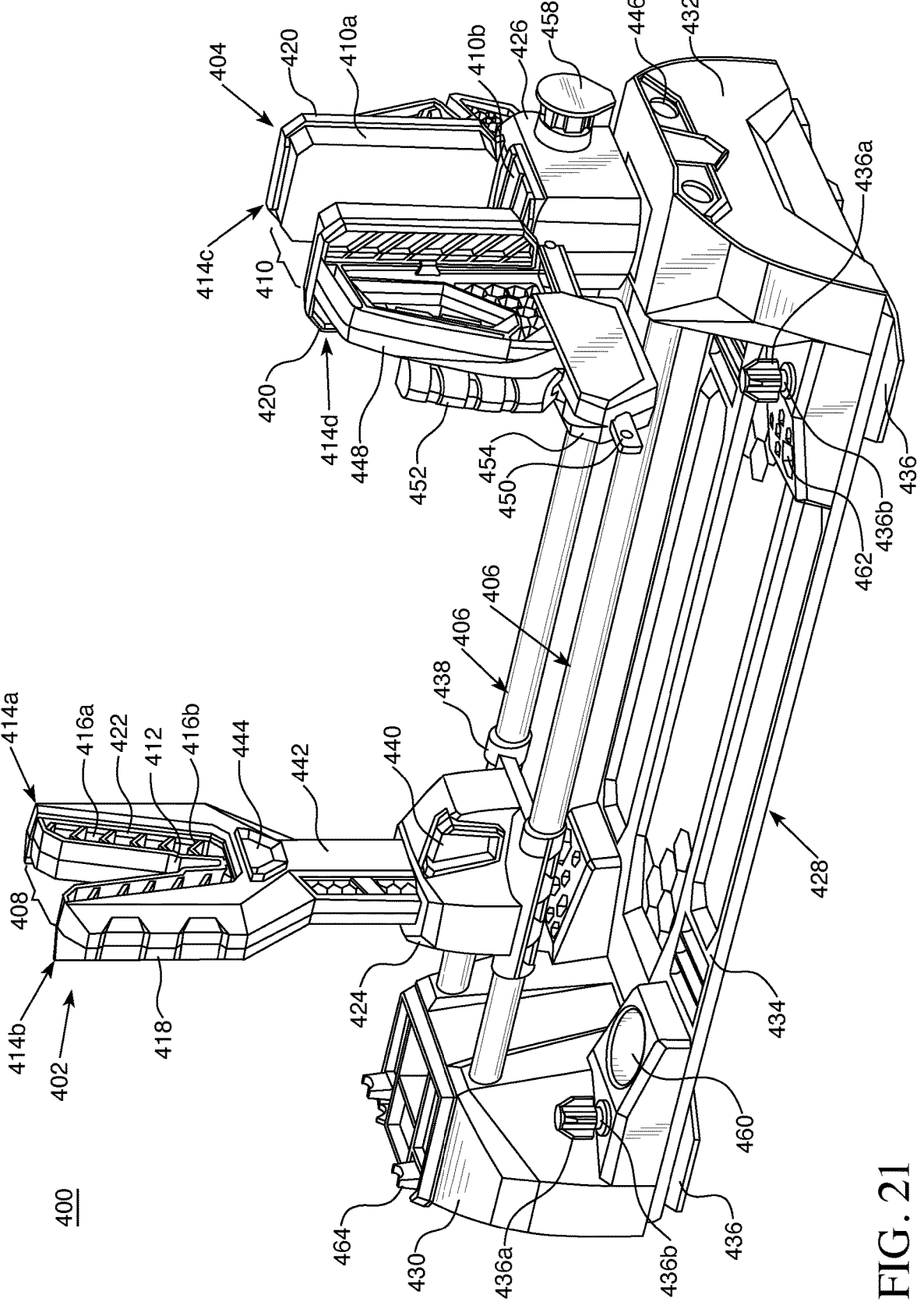
FIG. 21 is a perspective view of an embodiment of an adjustable support stand.

FIG. 21 is a perspective view of an illustrative example of an adjustable support stand of the present disclosure. The adjustable support stand may include a front support and a rear support. Further, the adjustable support stand may include rails, which may be static or telescoping rails. The front support can be comprised of a front grip, which can be a portion of a pair of vertical arms (or the entire arms themselves) and can include chevron voids. The front grip may be positioned in a front housing, which may further include a front base. Similarly, the rear support can be comprised of a rear grip, which can be a portion of a pair of vertical arms (or the entire arms themselves) and can include chevron voids. Alternatively, the rear grip in the pair of vertical arms can be solid and without chevron voids. The rear grip may be positioned in a rear housing, which may further include a rear base. Note that due to the ambidextrous nature of the device (a firearm or other elongated object can be placed in either of two directions depending on the needs of the user), the terms "front" and "rear", when used herein, can be used interchangeably. Therefore, for example, a feature present on the "rear grip" is not limited to the rear of the device; it can be assumed to alternatively be present on the "front grip." Further, what is indicated as a "rear grip in a rear housing" may, in fact, be used in practice as the front of the device. The telescoping rails can include a locking mechanism, which can lock the telescoping rails in place and can lock the front support and the rear support in a collapsed position, as described further herein.

Figure 22:
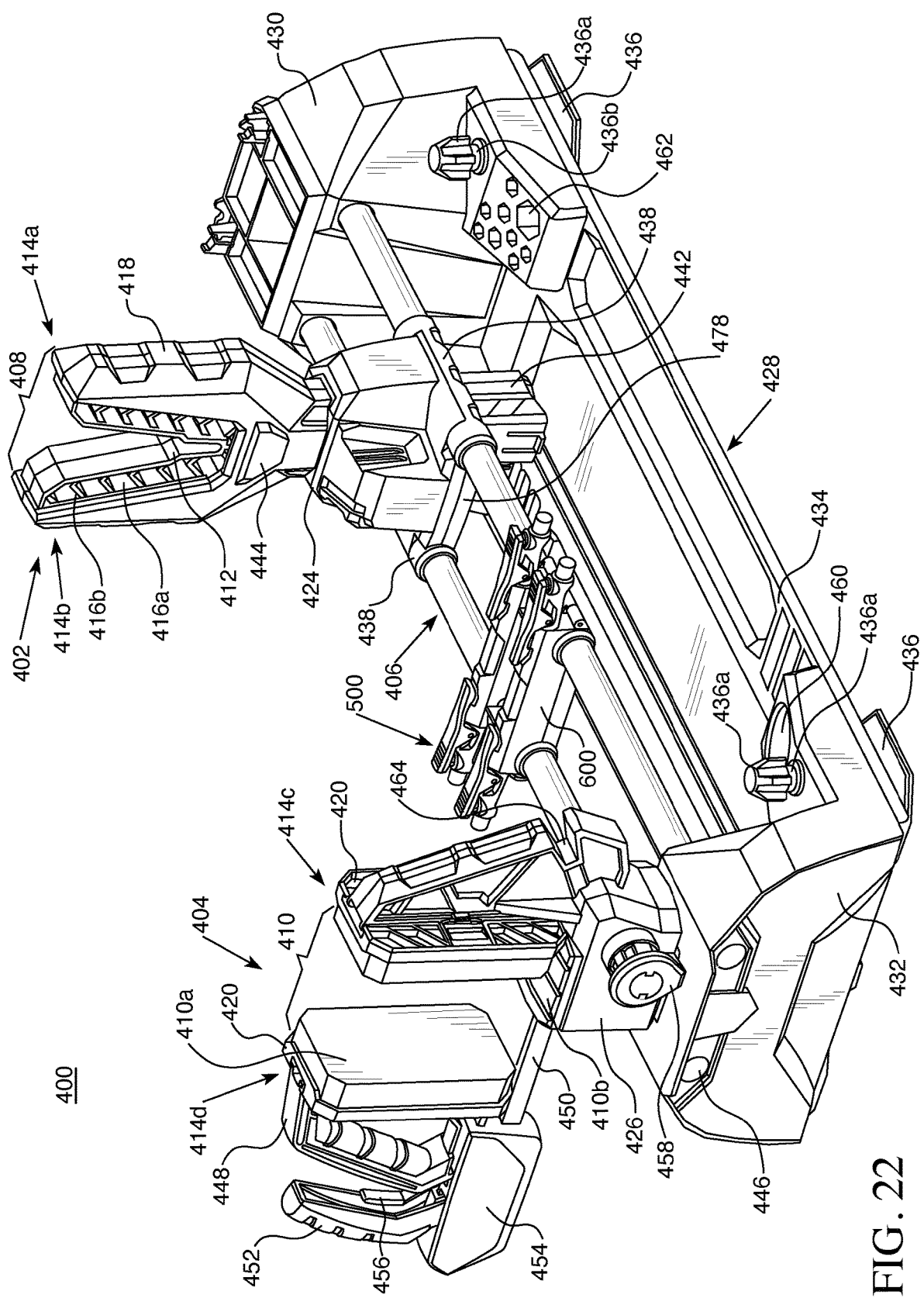
FIG. 22 is a perspective view of the adjustable support stand of FIG. 21 having accessory clips attached to a receiving adapter on the adjustable support stand.
Figure 23:
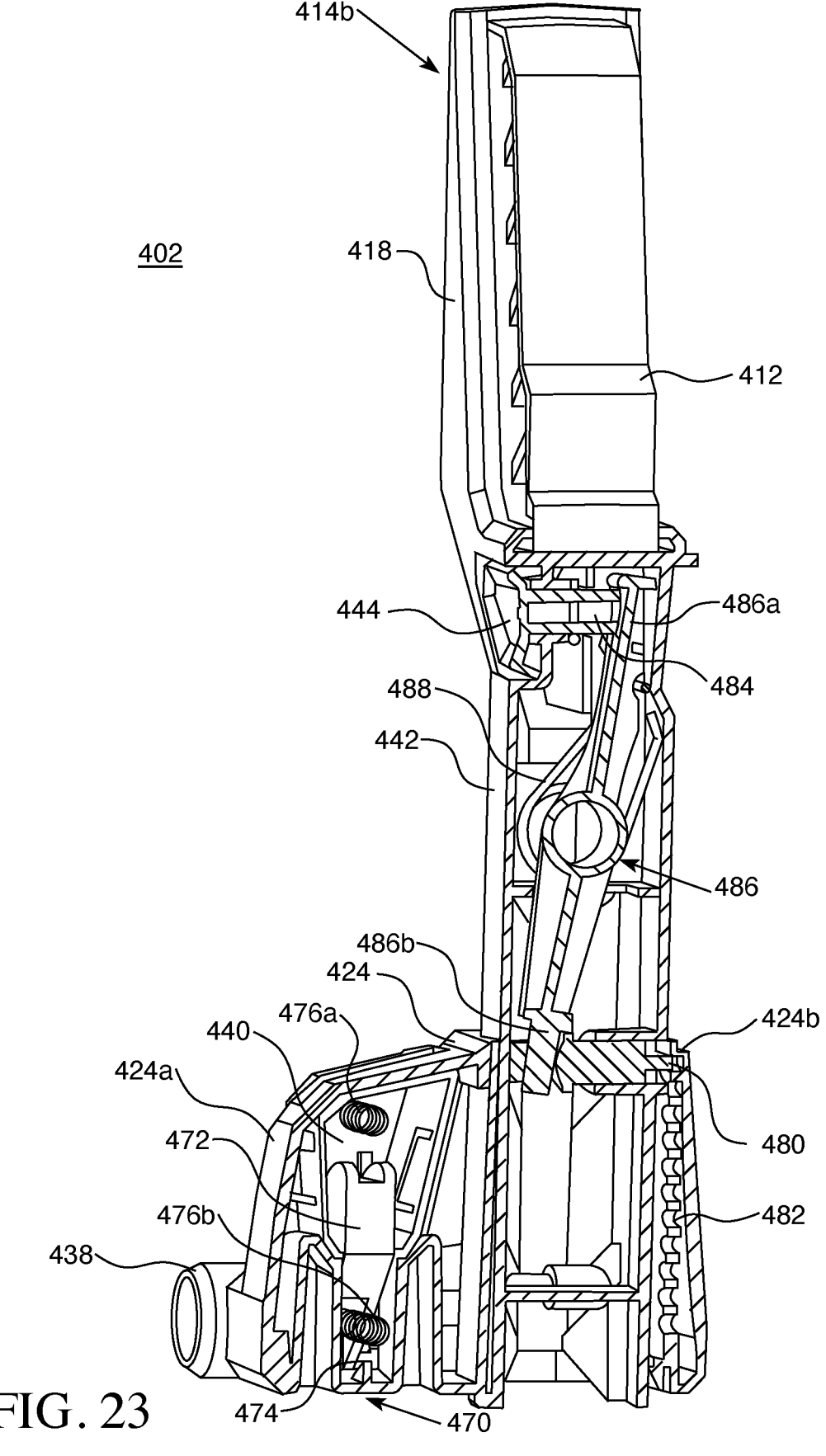
FIG. 23 is a cross-sectional view of a portion of the adjustable support stand of FIG. 21.
Figure 24:
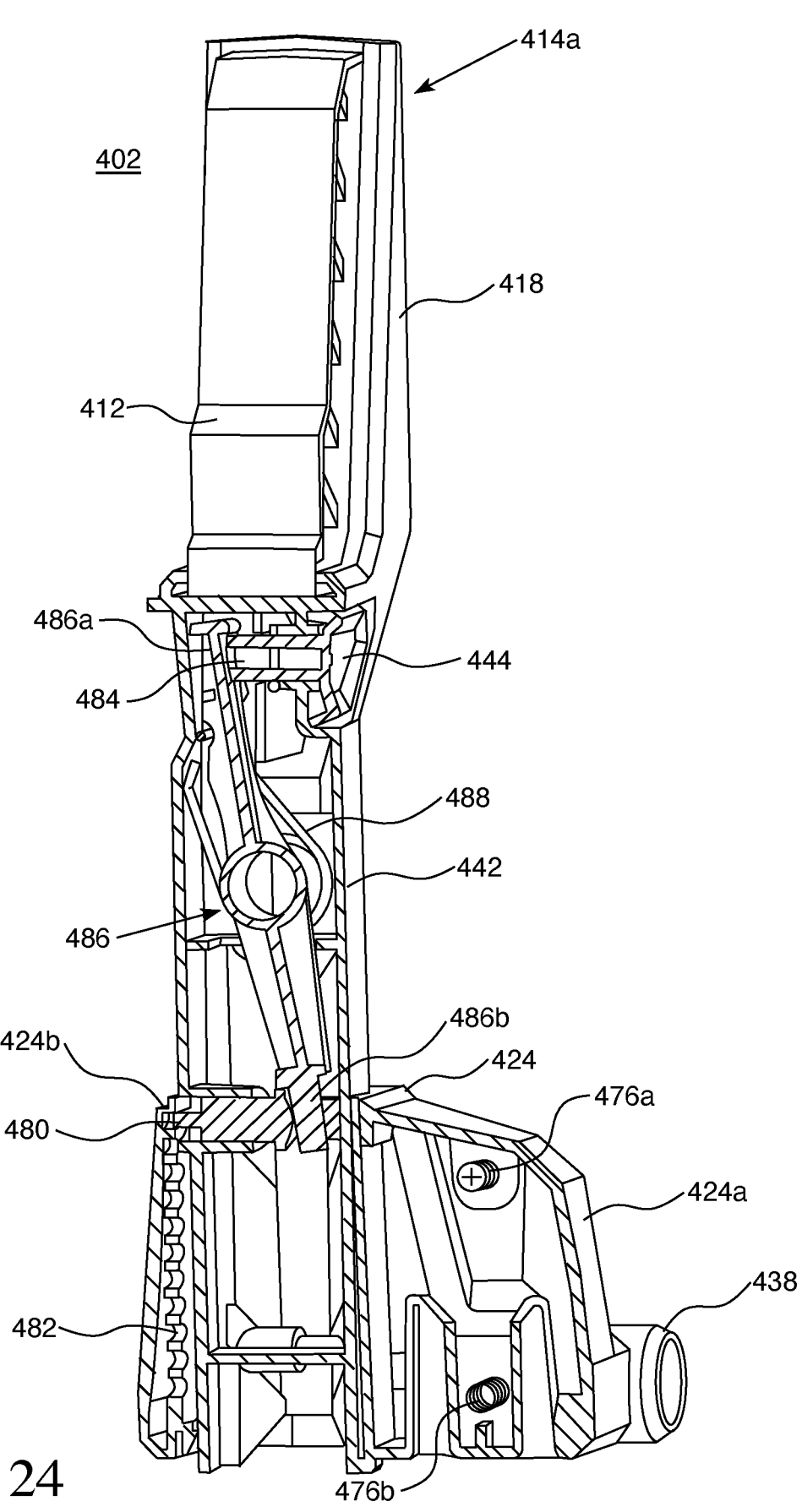
FIG. 24 is a cross-sectional view of a portion of the adjustable support stand of FIG. 21.
Figure 25:
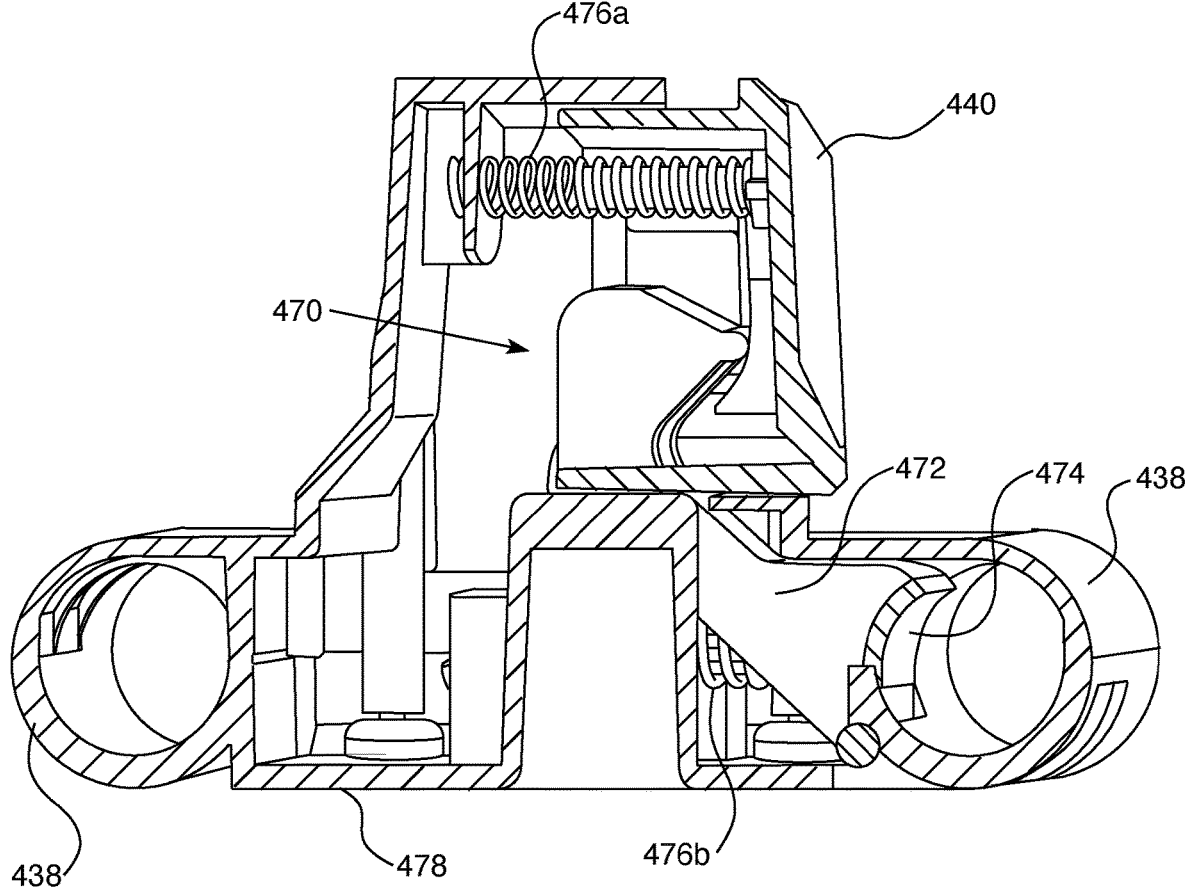
FIG. 25 is a cross-sectional view of a portion of the adjustable support stand of FIG. 21.
Figures 26, 27:
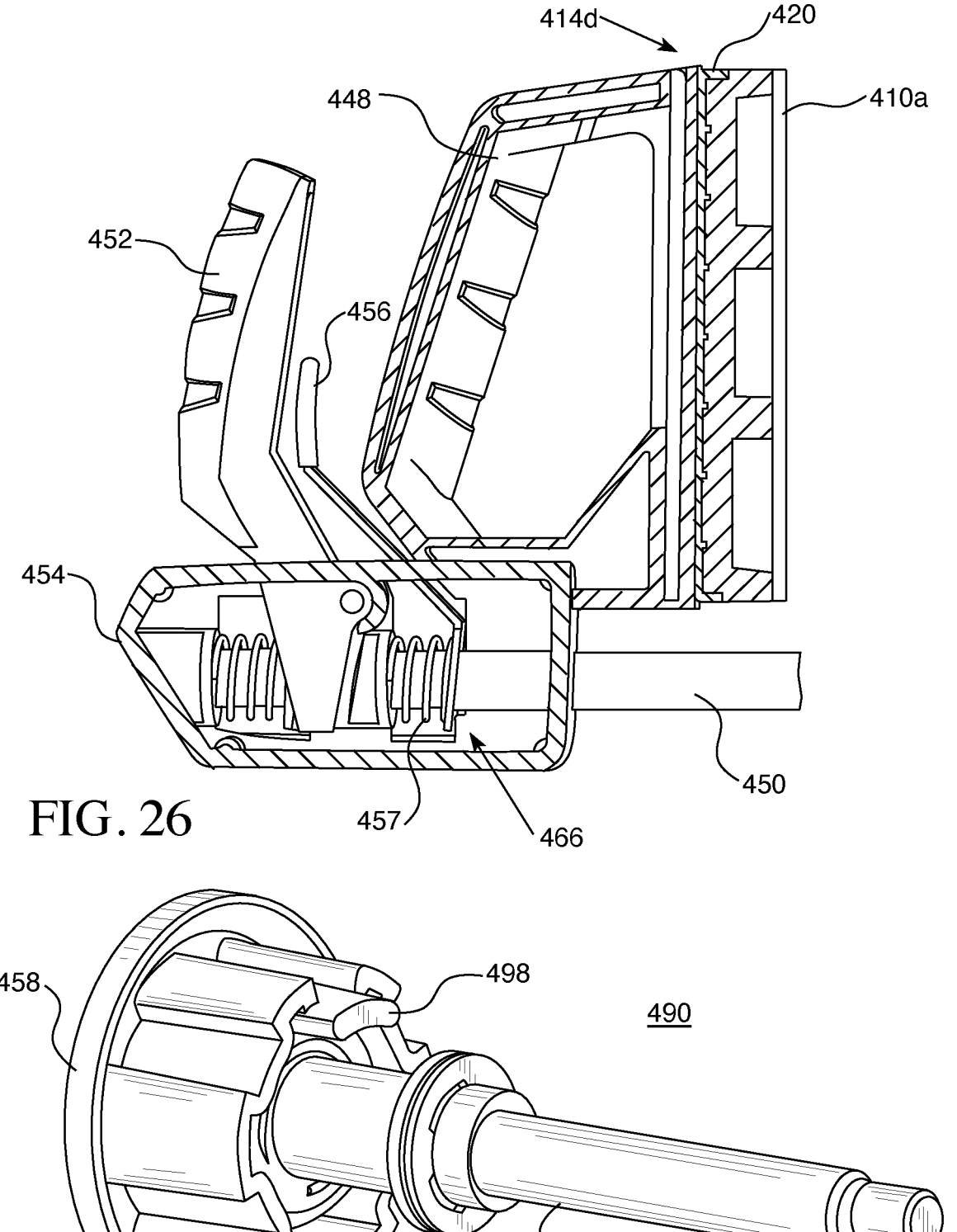
FIG. 26 is a cross-sectional view of a portion of the adjustable support stand of FIG. 21.
FIG. 27 is a perspective view of a knob of the adjustable support stand of FIG. 21.
Figure 28:
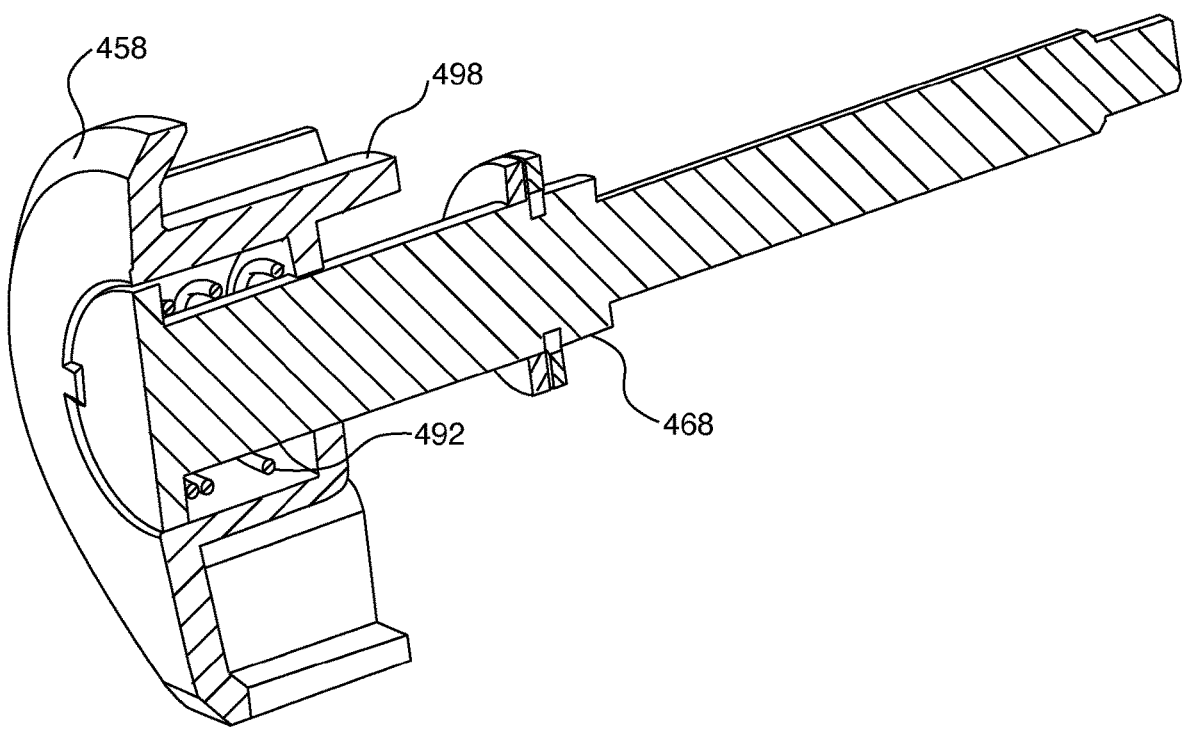
FIG. 28 is a cross-sectional view of the knob of FIG. 27.
Figure 29:
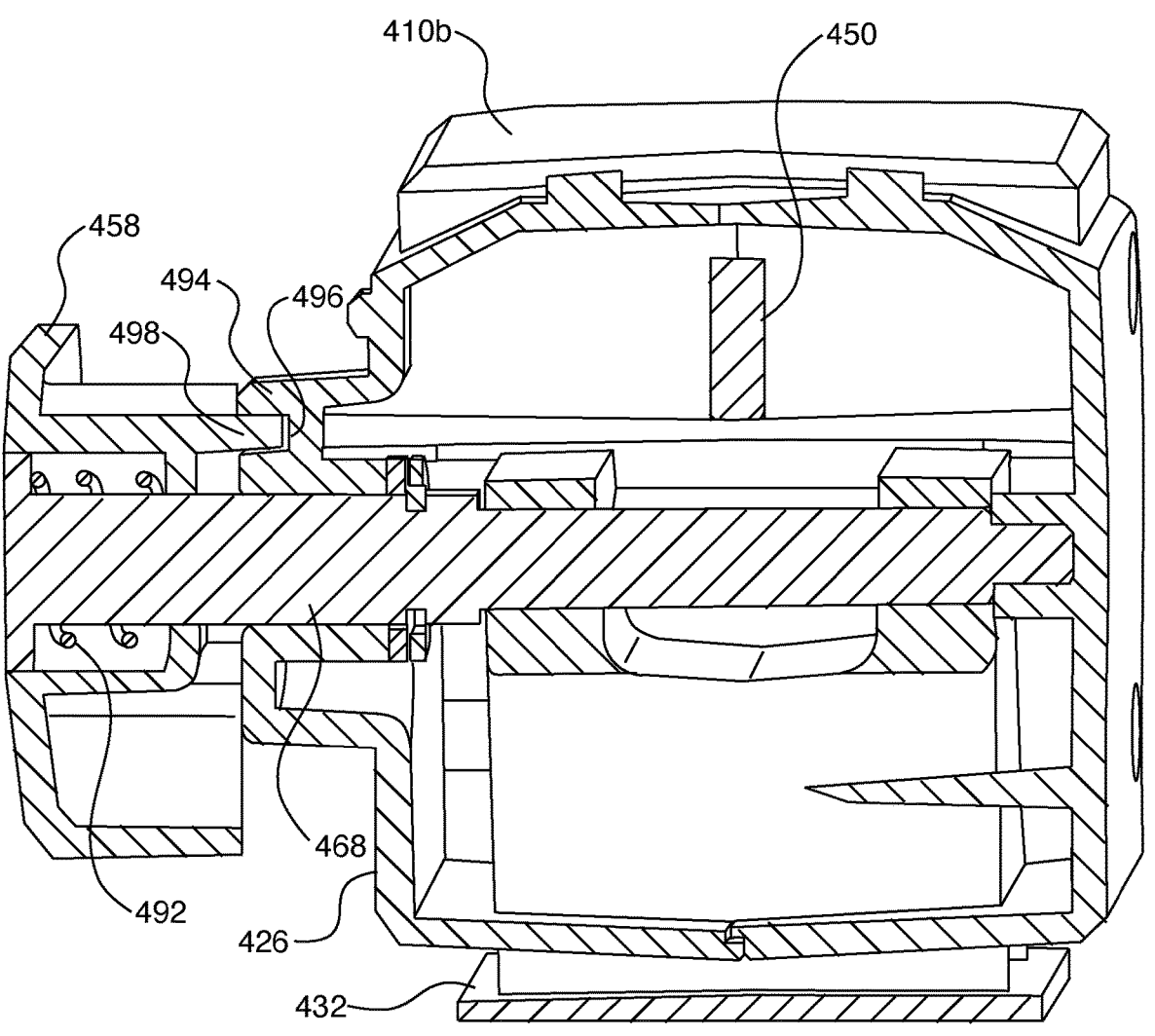
FIG. 29 is a cross-sectional view of a portion of the adjustable support stand of FIG. 21.

Additional views of the adjustable support stand are provided. FIG. 22 is a perspective view of the adjustable support stand. FIG. 23 is a cross-sectional view of a portion of the adjustable support stand. FIG. 24 is a cross-sectional view of a portion of the adjustable support stand. FIG. 25 is a cross-sectional view of a portion of the adjustable support stand. FIG. 26 is a cross-sectional view of a portion of the adjustable support stand. FIG. 27 is a perspective view of a knob of the adjustable support stand. FIG. 28 is a cross-sectional view of the knob of the adjustable support stand. FIG. 29 is a cross-sectional view of a portion of the adjustable support stand.

In some embodiments, the adjustable support stand can have a substantially rectangular footprint, wherein the first and second ends are approximately parallel to each other and equal in length, the first and second sides are approximately parallel to each other and equal in length, and the ends are at approximately perpendicular angles to the sides, as illustrated in FIGS. 21-22.

As mentioned above, one embodiment of adjustable support stand 400 may include front support 402, rear support 404, and rails 406. Front support 402 may be comprised of front grip 408, which can be part of vertical arms 414a and 414b and can include chevron voids 416a and chevron rungs 416b. Front grip 408 may be positioned in front housing 418, which may further include front base 424. Similarly, rear support 404 may be comprised of rear grip 410, which can be part of vertical arms 414c and 414d. Rear grip 410 may be connected to rear housing 420, which may further include rear base 426. Rails 406 may be positioned between front foundation end 430 and rear foundation end 432, on or near which front support 402 and rear support 404, respectively, can be located. Front base 424 may be positionable along rails 406 such that the distance between the front base and rear base 426 can be shortened or lengthened as needed. Additionally, front support 402 may be height adjustable.

Supports

As mentioned above, the adjustable support stand 400 can include a front support 402 on a first end of the adjustable support stand and a rear support 404 on an opposing, second end of the adjustable support stand. The front supports 402 and rear supports 404 can be connected by a rail or a pair of rails 406, as illustrated in FIG. 21, which can be telescoping rails or static rails.

Arms

As illustrated in FIGS. 21-22, the front and/or rear supports can have vertical arms 414*a-d* that create an approximate V-shape or U-shape. The opening between each set of arms 414*a-d* on the front supports 402 and rear supports 404 can be where an object to be worked upon is placed. One object that can be supported by the adjustable support stand 400 can be a firearm. Commonly, the barrel and the stock are the desired components of the firearm to be put in contact with a support. Since the barrel of the firearm is narrower than the stock, the front supports 402 and rear supports 404 may have openings between the two arms that are of different widths. In one embodiment, the front support 402 may be narrower than the rear support 404, as illustrated in FIGS. 21-22. Additionally, either of the front or rear supports may be stepped such that a transition point between the top portion of the opening and the bottom portion of the opening may include a step 412, as illustrated in FIG. 21.

Step

The step 412 can provide a resting point for the stock prior to the meeting point of the vertical arms 414*a-d* at their base. Therefore, the stock can be supported on the step and above the transition point, which can be a higher location than where the two arms in the rear support join together. This configuration enables the firearm to be oriented in the support with the stock in a higher vertical position compared to the barrel. Therefore, any solutions being used to clean the barrel that are applied to a proximal end of the barrel (i.e., an end of the barrel closer to the action and stock) may more easily drain toward the distal end of the barrel (i.e., the end of the barrel further from the action and stock). Alternatively, the forestock may be supported on the step and above the transition point.

As noted above, the object being worked upon, such as a firearm, can be placed in the front supports 402 and rear supports 404 in either of two configurations (i.e., the front of the object in the front support and the rear of the object in the rear support or, alternatively, the rear of the object in the front support and the front of the object in the rear support), and either the rear support 404 or the front support 402 can be stepped. Therefore, in one embodiment, the stock (i.e., the broader portion of the object) can be supported by the rear support 404 if it is stepped. In another embodiment, the barrel or forestock (i.e., the narrower portion of the object) can be supported by the front support 402 if it's stepped. In some embodiments, the rear support may be stepped, but may still support the narrower portion of the object, such as the barrel or forestock. Ultimately, either, or both, of the front and rear supports can be stepped and the placement of the object to be worked upon is not limited; it can be placed with either end in either support.

In some embodiments, the front support 402 may be configured to include the step 412 and a rear support 404 may be U-shaped instead of V-shaped, as illustrated in FIGS. 21-22. In such an embodiment, the step 412 in the front support 402 may allow the support to be compatible with both a stock, a forestock, and a barrel. Therefore, the front support 402 can include the stepped configuration to allow the barrel to be secured below the transition point of the support or to allow the forestock to be supported above the transition point. In cases where the rear support 404 is U-shaped, the rear support may be a vise wherein the rear arms 414*c-d* can be vise jaws, the rear grip 410 can be a set of vise jaw pads that clamp onto the sides of the stock to hold it in place, and the rear housing 420 can be a rigid structure onto which the rear grip (i.e., the set of vise jaw pads) is placed. The rear support 404 (i.e., the vise) can also have a base 426 to support the bottom of a stock. As illustrated in FIGS. 21-22, the rear support 404 may be a vise.

Grip

Further, the front and rear supports can both have a grip for securing in place an object to be worked upon. In some embodiments, the grips of the front and rear supports are made from the same material. In other embodiments, the grips are made from different materials. In some embodiments, at least one of the grips are deformable and made from a non-slip material providing a high friction coefficient such as, but not limited to, thermoplastic rubber, thermoset rubber, other polymers, natural or synthetic rubbers, plastics, or similar material. A rubber material can exhibit useful properties for securing an object in place, including tackiness or high-friction between the object and the grip.

In some examples, the grip can be provided in multiple, non-connected pieces. Such multiple pieces of the grip material may be referred to in the context of the present disclosure in the singular as "a grip." One example of such a grip is shown in FIG. 21, wherein the rear grip 410 is comprised of a set of separate vise jaw pads 410*a* and, optionally, a base pad 410*b*. In other examples, such as that of front grip 408 in FIGS. 21-22, the grip can include grip material that is substantially connected or contiguous. In some examples, a grip can consist essentially of grip material that is contiguous.

Chevrons

As illustrated in FIGS. 21-22, the front support 402 and/or rear support 404 can further include chevron voids 416*a*. More specifically, the grips of the front and/or rear supports can be comprised of a grip material (ex: thermoplastic or thermoset rubber) that outlines a series of vertically stacked chevron voids defined by chevron rungs. More specifically, the grip material can frame the top, bottom, and sides of the front grip 408 and/or rear grip 410 and further fill in the frame with spaced apart, stacked chevron rungs 416*b*, thereby leaving chevron voids 416*a* in between the rungs. As is commonly understood, the term "chevron" refers to an object or space having an inverted V-shape. In the current disclosure, this definition continues to apply.

While the chevron runs are described as being vertically stacked, vertical does not require an exact North/South or up/down configuration. Rather, when the support is in an upright configuration, the chevrons are at least above a 45-degree angle. Further, the chevron rungs and voids of the present disclosure can be symmetrical, or they may be a-symmetrical such that one side of a chevron void 416*a* may be slightly longer than the other, or the height along the length of each chevron void 416*a* or chevron rung 416*b* may vary. For example, the outer portion of the chevron void and rung 416*a-b* may be shorter than the central portion. Alternatively, the central portion of the chevron void and rung 416*a-b* may be shorter than the outer portion. Further, the height of the chevron rungs 416*b* may be shorter than the height of the adjacent chevron voids 416*a*, as illustrated, however this is not required. In some embodiments, the chevron rungs 416*b* may have the same height as the chevron voids 416*a* or be taller.

As illustrated in FIGS. 21-22, the front grips 408 and/or rear grips 410 may primarily be comprised of the chevron voids 416*a* and rungs 416*b* but may have non-chevron portions at the top and bottom of the grips to accommodate the remaining space between the topmost and bottommost chevron rungs and the grip's frame. Additionally, the chevron voids 416*a* and rungs 416*b* may comprise the full width of the front grips 408 and/or rear grips 410 such that there are no other shapes or materials to the right or left of the chevrons other than the frame of the grips. More specifically, the front grips 408 and/or rear grips 410 may each be comprised of two arms, as described herein, and each of those arms can have a single column of chevron voids 416*a* and rungs 416*b*. Therefore, each grip 408 and/or 410 may have two columns of chevron voids 416*a* and rungs 416*b*, but those columns can be separated by a V- or U-shaped gap such that there are no other shapes or materials to the right or left of the chevrons other than the frame of the grips.

As mentioned above, the grip may be deformable. Therefore, if the grip is comprised of chevron voids and rungs, the chevrons are also deformable. When an object to be worked upon is placed in the grip and is larger than the void between the two arms, the grip and, correspondingly, the chevrons will deform. The chevron voids can become smaller, and the grip can collapse on itself. Additionally, the chevron rungs in each vertical stack may come into closer proximity to each other while the chevron rungs on an opposite arm may get further apart. This functions to provide a compressed and secured grip on the object being worked upon. In some embodiments, if an object has a fairly small radius, the chevron rungs and voids near the top of the support may not be deformed even though the rungs and voids further down on the support are deformed.

Housings

In addition to the vertical arms and the front and rear grips, the front and rear supports can be further comprised of housings, which are structured and configured to house the grips. Therefore, the front support 402 can be comprised of two arms 414*a-b*, which have a front grip 408 that is secured in or on a front housing 418. Additionally, the rear supports 404 can be comprised of two arms 414*c-d*, which each have a rear grip 410 that is secured in or on a rear housing 420. The housing may be contiguous between the two arms of each support and secured to a base at its bottom, as shown in the front support 402 of the embodiment herein, or each arm may have a separate, non-contiguous housing that is separately secured to a base, as illustrated by the rear support 404 in FIG. 21. The grips may also be contiguous between the two arms of each support, as shown in the front support 402 of the embodiment herein, or each arm may have a separate, non-contiguous grip, as illustrated by the rear support 404 in FIG. 21.

In some embodiments, the housing 418 can be configured such that it is approximately Y-shaped, wherein it has an upper, branched portion and a lower, straight, shaft portion 442, as illustrated in FIGS. 21-22. The grip 408 can be secured in the upper, branched portion of the housing 418, and the shaft 442 of the housing can be slidable through the base 424 in order to adjust the height of the housing. For example, sliding the shaft 442 of the housing 418 down through the base 424 can cause the housing to have a smaller height then before (i.e., it is shorter), whereas sliding the shaft of the housing up through the base can cause the housing to a have a greater height than before (i.e., it is taller). The means by which this height adjustment mechanism takes place is described in more detail below.

Instead of being Y-shaped, the housing may, as mentioned above, be comprised of non-contiguous portions that are each separately secured to the base. More specifically, as illustrated in FIGS. 21-22 and 26, the support 404 may be comprised of two parallel housing portions 420 that each have a grip 410*a* and connect, directly or indirectly, to the base 426 and further include a clamping mechanism 466 such that the housing, base, and grip are, collectively, a vise. Therefore, the rear support 404 can be a vise, the rear arms 414*c-d* can be vise jaws, the rear grip 410 can be vise jaw pads, and the rear housing 420 can be the rigid parallel portions of the arms that can attach to the rear grip (i.e., vise jaw pads). The housing 420 can directly or indirectly attach to a handle 448, a lever 452 and spring-based clamping mechanism 466.

As mentioned above, the rear housing 420 can be comprised of two parallel housing portions that each have a relatively flat inner face orientated to face the inner face of the opposing portion of the rear housing. The inner faces can be approximately rectangular with a height being longer than a width. The rear grip 410 can attach to these relatively flat inner faces. At least one of the housing portions may also include a handle 448 on a side opposite the inner face, as illustrated in FIG. 21. The handle 448 can be positioned perpendicular to the outer face of the housing such that it protrudes out at a right angle from the outer face. The handle 448 can be used to push or pull the respective housing portion toward and away from the opposing housing portion, thereby increasing or decreasing the overall width of the rear housing 420.

To enable the housing portions of the rear housing 420 to remain connected while the width between them changes, the housing portions can each be connected to a bar 450. One housing portion may be positionally fixed on the bar 450 while the other may either slide along the bar or, alternatively, allow the bar to slide through it. Therefore, while one housing portion may be positionally fixed on the bar 450, the other housing portion may be positionally fixed on the adjustable support stand 400 (for example, it can be fixedly mounted to the top or the side of the base 426) and may allow the bar to slide through it such that the first housing portion can move relative to the other housing portion and relative to the adjustable support stand. In embodiments with a base 426 between the housing portions 420, the bar 450 may also slidably penetrate through the body of the base.

Therefore, as illustrated in FIG. 21, one embodiment of the adjustable support stand may have a rear support 404 comprised of rear arms 414*c-d* with a rear base 426 located between the rear arms and a bar 450 connecting the rear arms to each other and to the base. The rear arms 414*c-d* can be comprised of a rear housing 420 having two parallel housing portions, a rear grip 410 having multiple, non-connected pieces that are each connected to an inner face of a housing portion, and a handle 448 positioned perpendicularly to the outer face of one of the housing portions. The bar 450 can be slidingly connected to the first arm 414*d* having the handle 448, can be fixedly connected to the rear base 426 and can be fixedly connected to the second arm 414*c*. To fix the positioning of the first arm 414*d* relative to the second arm 414*c*, a spring-based clamping mechanism 466 can be incorporated with the bar 450 near the bottom of the first arm 414*d*. The clamping mechanism 466 can be comprised of a lever 452 and a spring 457 housed inside a car 454 that operates to lock the position of the first arm 414*d* in place. The clamping mechanism 466 is described in more detail below.

While specific combinations of housings have been described above, any combination of the above housings may exist for the adjustable support stand. For example, in some embodiments, the adjustable support stand can have one support that is comprised of a Y-shaped housing with a grip and one support that is a vise, as illustrated in FIGS. 21-22. In other embodiments, the adjustable support stand may have one support that is comprised of a Y-shaped housing with a grip and one support that is comprised of a V-shaped housing with a grip (for example, if the vise of the embodiments in FIGS. 21-22 was replaced with a V-shaped housing with a grip). In yet other embodiments, the adjustable support stand may have one support that is comprised of a V-shaped housing with a grip and one support that is a vise (for example, if the vise of the embodiments in FIGS. 21-22 was paired with a V-shaped housing with a grip). In some embodiments, the adjustable support stand may have two supports that are the same. For example: both supports can be comprised of V-shaped housings with grips, both supports can be comprised of Y-shaped housings with grips, or both supports can be comprised of supports that are vises.

Grip Tabs/Attachment of Grip to Housing

The front housing 418 and rear housing 420 may retain the respective front grip 408 and rear grip 410 in a secured configuration through the presence of tabs 422. Therefore, the housing can provide support to the grip due to the deformable and flexible nature of the grip. More specifically, the outer frame of the grip can be retained and secured within the housing. Further, the frame may be secured thereto by tabs on the housing that are positioned between the chevron voids, as illustrated in FIG. 21. There may be tabs in each chevron void such that there are an equal number of tabs as there are chevron voids, or there may be fewer or more tabs than there are chevron voids. For example, in the embodiment illustrated in FIGS. 21-22, there are five chevron voids on each arm and five corresponding tabs on each side (ex: front, back) of each arm. However, even if there are five (or more) chevron voids on each arm, there may be a non-equal number of tabs on each side of each arm. There may be fewer tabs, in which case some chevron voids will not have a tab, or there may be more tabs, in which case the non-chevron voids near the top or bottom of the grips may have tabs.

Instead of tabs, the grip 410 may otherwise be attached to the housing 420, as illustrated in FIG. 21. As briefly mentioned above, the rear grip 410 can be comprised of multiple, non-connected pieces that separately attach to non-contiguous portions of the housing 420. The attachment can occur through permanent means or through non-permanent means that allow the grip to be replaced. For example, adhesives, screws, bolts, rivets, and mechanical attachment means such as tongue-in-groove, dovetail connections, and t-slots. The grip may have a portion that slides over the housing or around the edges of the housing to effectively "grip" onto the housing. As illustrated in FIGS. 21-22, the grip may be two relatively rectangular pieces. Further, the grip may be smooth on all sides or, alternatively, the grip may have texture to assist with gripping object to be worked upon. The relative size and shape of the grip can match the inner face of the housing portions or can be slightly smaller or slightly larger.

Base

In some embodiments, the front and rear supports can have a base to which the front and rear housings connect.

The base may be directly connected to, or be a continuation of, the housing, as shown in FIG. 21. For example, the front and rear bases can be end portions of the adjustable support stand to which the housings attach. Alternatively, the base can mount directly to the rails and, optionally, the housing can slidably attach to the base, as illustrated in FIG. 21. In another example, the base can be positioned between two separate portions of the housing and can directly support the object to be worked upon, as illustrated in FIG. 21. In yet another example, the base can be part of a larger storage container and can include a cavity into which the housings can be inserted.

In some embodiments, the attachment between the housing and the base may accommodate various adjustment mechanisms. For example, the attachment mechanism may be adjustable such that the housing can be folded over with respect to the base. In another example, the housing can be height-adjustable, as illustrated by the front support 402 in the embodiment of FIG. 21. In yet another example, the housing can be width-adjustable, as illustrated by the rear support 404 in the embodiment of FIG. 21. These various adjustments enable the adjustable support stand to collapse, to accommodate various-sized objects, and to be easily transportable.

While some embodiments of the adjustable support stand have the bases as the end portions that demarcate the outer bounds of the support stand or where the bases can be part of a larger storage container and can define a cavity into which the housings can be inserted, the embodiment disclosed herein can have a separate foundation 428 to which the bases are directly or indirectly attached or mounted. For example, as illustrated in FIG. 21, the front base 424 can attach to, and be slidable along, the rails 406, which can then mount to a front foundation end 430. Therefore, instead of the rails mounting to the base, as described above, the front base 424 can mount to the rails 406, and the front ends of the rails can mount to a front foundation end 430. The front base 424 can, as described further herein, include rail connectors 438 and a rail locking mechanism. The rear ends of the rails 406 can then mount to a rear foundation end 432. Further, in some embodiments, the rails 406 may be hollow and the rear ends of the rails may penetrate completely through the rear foundation end 432 such that an open rail end 446 is accessible to a user, as illustrated in FIG. 21, for storage purposes. Therefore, if a user is cleaning the barrel of their firearm with a cleaning rod, the user can quickly and easily store the cleaning rod by inserting it into one of the open rail ends 446.

In another example, as illustrated in FIG. 21, the base, such as the rear base 426, can attach directly to a rear foundation end 432 and can provide a surface (in some cases, a padded surface 410*b*) upon which an object to be worked upon can be placed. For example, a bottom portion of the rear base 426 can attach to a top portion of the rear foundation end 432. This connection can, in some cases, enable a scope-leveling mechanism 490 to make small adjustments in the position of the rear base 426 relative to the rear foundation end 432 and, therefore, make small adjustments to the angle and/or position of the object being worked upon. In addition to having a scope leveling mechanism 490 with a scope-leveling knob 458, the rear base 426 can also allow a horizontal bar 450 to be slidably connected through it to allow the rear housing 420 to have an adjustable width, as described in more detail above.

Feet

On the bottom of the adjustable support stand 400 there may be adjustable feet 436. In some embodiments, the bases may be configured to house adjustable feet. For example, each corner of the adjustable support stand 400 can have an adjustable foot 436 such that there are two feet under each base. Further, the adjustable support stand 200 may have intermediary components, such as a foundation 428 that supports the front and rear supports 402/404, that the feet 436 attach to, as illustrated in FIGS. 21-22.

In some embodiments, the feet of the adjustable support stand can attach and adjust through the use of a threaded connection point. For example, each adjustable foot 436 may have a knob 436a, a shaft 436b, and a threaded rod (not visible) that enables the foot to be adjustable relative to the support stand 400, as illustrated in FIG. 21. More specifically, the front foundation end 430 and rear foundation end 432 may have extensions onto the foundation tray 434, the adjustable foot 436 may be located underneath those extensions, and the shaft 436b may penetrate through those extensions such that it connects to the knob 436a on top of the extensions. Further, the threaded rod can have a threaded connection with the support stand 400 to enable the foot 436 to move closer to or further from the support stand. Therefore, rotating the knob 436a clockwise and counterclockwise can move each corner of the support stand 400 up and down to balance the stand if it is on an uneven surface, to lift the stand into a higher overall position, or to otherwise adjust the leveling of the support stand.

Telescoping Rails

As mentioned above, some embodiments of the adjustable support stand can include a rail. The rail can be a telescoping rail or a static rail 406, as illustrated in FIG. 21. The telescoping rail can include a locking mechanism in order to lock the outer rail and inner rail into a set length. This adjustability enables users to use the same support stand for objects having a wide range of lengths. In some cases, a first rail can be partially or completely slidable into another rail, thereby nearly halving the length of the device. Additionally, the telescoping rail may be comprised of more than two pieces to provide more flexibility for users and a wider range of lengths. Further, in embodiments where the support stand is foldable or otherwise collapsible, the locking mechanism can secure the housings in their folded configuration. More specifically, when the locking mechanism is engaged and the housings are positioned in a folded configuration, the locking mechanism can ensure that the housings do not lift up until the locking mechanism is disengaged.

Static Rail

As mentioned above, the rails can be static rails 406 that may be hollow and open on at least one end, as illustrated in FIGS. 21-22, such that the rails themselves, can be used as a storage compartment. In some embodiments, the adjustable support stand 400 has rails 406, but instead of the base 424 and housing 418 of each support being positioned at the end of the rails, one of the supports (for example, the front support 402) can be slidingly connected to the rails while the other of the supports (for example, the rear support 404) can be fixed at or near one end of the rails, as illustrated in FIG. 21. Therefore, as opposed to adjusting the length of the rails to move the supports closer to and further away from each other, one of the supports 402 can be moved along the rails 406 to be positioned closer to and further away from the other support 404.

In this embodiment, as illustrated in FIG. 21, the front of the rails 406 can be attached to a front foundation end 430 and the rear of the rails can be attached to a rear foundation end 432. Further, the front base 424 of the front support 402 may have rail connectors 438 so that the entire front support 402 can slide along the rails 406, whereas the rear base 426 can be fixed in place at the other end of the adjustable support stand 400 (for example, mounted on top of the rear foundation end 432). As mentioned above, "front" and "rear" can be used interchangeably, so while this example illustrates a front support as being slidable along the rails, it is possible that a rear support may be slidable along rails while a front support is fixed. In some embodiments, not only can the rail connectors 438 slide along the rails 406, they can also separate from the rails. For example, the rail connectors 438 may be comprised of a separable portion 478 that can, when separated from the remainder of the base 424, enable the base to separate from the rails. In some cases, separable means that the separable portion 478 can completely detach. In other cases, it can mean that the separable portion can simply pivot open along a hinge.

Front Support Rail Locking Mechanism

The rail connectors 438 can be integral to the base 424, as illustrated in FIG. 21, or they can be components that otherwise attach to or engage with the base. In the example illustrated in FIG. 21, the rail connectors 438 are tube-like additions to the bottom portion of the front base 424 and, as illustrated, the front base can be primarily situated between and above the rail connectors. Each rail connector 438 can have a cylindrical interior surface with which it can engage a rail 406. In some embodiments, the exterior surface is also at least partially cylindrical. However, the exterior surface can take any shape. The rail connectors 438 can engage with a rail locking mechanism (for example, a spring-based brake 470) located on the front base 424 such that when the spring-based brake is engaged, the rail connectors may not freely slide along the rails 406.

The spring-based brake 470 can interface with a rail biasing lock button 440 on a front portion 424a of the front base 424 that, when pushed or otherwise engaged, releases a rail brake 472 from contact with a rail 406 and enables the front support 402 to slide toward or away from the rear support 404. More specifically, the spring-based brake 470 can include a rail brake 472 having an upper portion in contact with the rail biasing lock button 440, a lower connection end 474, and a spring 476b, as illustrated in FIG. 23, wherein the connection end is configured to make contact with a rail 406 and to frictionally retain the front support 402 in its position on the rails. The connection end 474 can be on a front portion of the rail brake 472 and can be arcuate in shape to maximize surface area contact with the rail 406, as illustrated in FIG. 25. The spring 476b of the rail brake 472 can be a compression spring that is located on a back side of the rail brake and opposes compression force placed on it when the front portion of the rail brake (for example, the connection end 474) is removed from contact with the rail 406. Therefore, the rail brake 472, in its default configuration, can retain a frictional connection with the rail 406. An upper spring 476a can be located on a back portion of the rail biasing lock button 440, as illustrated in FIG. 25, and can be a compression spring so that when the button is released, the spring pushes the button back into its original configuration.

Therefore, when the rail biasing lock button 440 is compressed, it pushes on the upper spring 476a and pushes on the upper portion of the rail brake 472 to pull the rail brake away from its default position. This movement of the rail brake 472 pulls the connection end 474 away from the rail 406 and compresses the lower spring 476b. When the rail biasing lock button 440 is released, the upper spring 476a and lower spring 476b both push against the compression force to put the rail biasing lock button and rail brake 472, respectively, back into their default configuration.

The rail biasing lock button 440 may be a single biasing component on one side of a front portion of the front base 424 or, alternatively, it may be two components (one on each side of the front base) that are simultaneously pushed. Once the rail biasing lock button 440 is released, the rail connectors 438 can feely slide along the rails, thus allowing the distance between the front support 402 and rear support 404 to be adjusted. To reengage the rail brake 472, the rail biasing lock button 440 can be released, which can then allow the rail brake to have a friction connection with the rail 406 and prevent further movement along the rail.

Height Adjustability

The front base 424, in addition to having rail connectors 438, can connect to the front housing 418 such that the front housing is height adjustable. More specifically, as mentioned above, the front housing 418 may include a height adjustment mechanism that enables it to be height-adjustable relative to the front base 424. To accommodate the vertical adjustment, the front housing 418 can be configured such that it is approximately y-shaped, as illustrated in FIGS. 21-22, with the front grip 408 secured in the upper portion of the front housing and the shaft 442 of the front housing slidable through the front base 424 (for example, a back portion 424b of the base). The height adjustment mechanism can include a height-adjustment button 444 on the front housing 418 for a lock and pin mechanism.

Generally, the height-adjustment button 444 can be a spring-activated push button that can be pushed into a portion of the front housing 418 in order to release the front housing from a locked position within the front base 424. More specifically, the height adjustment mechanism can include a height-adjustment button 444 with an interior end 484, a vertical rocker 486 having an upper portion 486a and a lower portion 486b, a spring 488, a pin 480 and at least one pin hole 482. The interior end 484 of the height-adjustment button 444 can be located within the shaft 442 and can be engaged with the upper portion 486a of the vertical rocker 486, as illustrated in FIG. 24, and the lower portion 486b of the vertical rocker can be engaged with a pin 480. For example, the lower portion 486b may have a rounded, thinner extension that can insert into an opening on a first end of the pin 480. The pin 480 can be located primarily within the shaft 442 with a portion (for example, a second end) at least partially insertable through the shaft and into a pin hole 482 in the rear portion of the front base 424. In some embodiments, there are multiple pin holes 482 aligned vertically within the front base 424, as illustrated in FIG. 24.

Therefore, in use, when the height-adjustment button 444 is pushed inward, the interior end 484 pushes against the upper portion 486a of the vertical rocker 486, which causes the vertical rocker to pivot at a point between the upper portion and the lower portion 486b. This pivot causes the lower portion 486 of the vertical rocker 486 to move away from a center of the shaft 442 and to, accordingly, pull the pin 480 out of a pin hole 482. Once the height-adjustment button 444 releases the pin 480 from its engaged position in the pin hole 482, it allows the front housing 418 to freely move up and down relative to the front base 424 until the height-adjustment button is released. Once released, the spring 488 can push the height-adjustment button 444 back into its default position and can cause the pin 480 to engage with the interior surface of the front base 424 until the shaft 442 is moved up or down to a point where the pin aligns with a pin hole 482 and can insert into the pin hole to lock the front housing 418 in place relative to the front base 424. Therefore, to adjust the height of the front support 402, a user can engage the height adjustment mechanism by pushing and holding the height-adjustment button 444, moving the front housing 418 up and/or down as needed so that the shaft 442 slides through the front base 424, and then releasing the height-adjustment button to retain the desired height of the front housing.

Clamping Mechanism

As mentioned above, the rear support 404 of the embodiment illustrated in FIGS. 21-22 can be comprised of two parallel housing portions 420 that each have a grip 410a and connect, directly or indirectly, to the base 426 and further include a clamping mechanism 466 such that the housing, base, and grip are, collectively, a vise. Therefore, the rear support 404 can be a vise, the rear arms 414c-d can be vise jaws, the rear grip 410 can be vise jaw pads, and the rear housing 420 can be the rigid parallel portions of the arms that can attach to the rear grip (i.e., the vise jaw pads). The housing 420 can directly or indirectly attach to a handle 448, a lever 452 and spring-based clamping mechanism 466. To fix the positioning of the first arm 414d relative to the second arm 414c, the spring-based clamping mechanism 466 can be incorporated with a bar 450 near the bottom of the first arm 414d.

More specifically, the clamping mechanism 466 can be comprised of a clamping lever 452, a release trigger 456, and a spring 457 housed inside a car 454, as illustrated in FIG. 26, that operates to lock the position of the first arm 414d in place at various positions along the bar 450. The clamping lever 452, release trigger 456, and handle 448 can be positioned in line with each other and with the first and second arms 414c/d. Further, the base 426, bar 450, and car 454 upon which the clamping lever 452, release trigger 456, and handle 448 are mounted, can all be positioned in line with each other. The handle 448 can be perpendicular to the first arm 414d, and the release trigger 456 can be positioned between the handle and the clamping lever 452. A bottom portion of the clamping lever 452 and/or the release trigger 456 can be contained within the car 454 and can be engaged with the spring 457 and the bar 450, as illustrated in FIG. 26. As such, when the clamping lever 452 is squeezed toward the handle 448, it can activate the spring-based clamping mechanism 466 and cause the first arm 414d to move toward the second arm 414c.

The clamping lever 452 can include a hollow or partially hollow interior inside which the release trigger 456 can be transiently positioned with the lever is squeezed toward the handle 448. This enables the release trigger 456 to remain in a resting configuration that prevents the first arm 414d from moving away from the second arm even when the clamping lever 452 is squeezed. When the release trigger 456 is activated, it can allow the first arm 414c to move away from the second arm 414c. In some embodiments, each time the clamping lever 452 is squeezed, the first arm 414d can move a predetermined distance towards the second arm 414c. In other embodiments, the first arm 414d is glidingly pushable towards the second arm 414c with or without engagement of the clamping lever 452.

Therefore, in use, the clamping lever 452 can be squeezed toward the handle 448, the release trigger 456 can be transiently positioning inside the clamping lever, and the first arm 414d can move a predetermined distance towards the second arm 414c to clamp an object in place. When the user is ready to release the object, the user can engage the release trigger 456 and the first arm 414d can be slid away from the second arm 414c. In this manner, the width of the rear arms 414c/d can be increased and decreased accordingly.

Scope-Leveling Mechanism

As mentioned above, the rear base 426 can include a scope-leveling mechanism 490. The scope-leveling mechanism 490, as illustrated in FIG. 21, can be comprised of a scope-leveling knob 458 that may be positioned on an outer-facing portion of the rear base 426. In some embodiments, however, the scope leveling knob 458 may be positioned on an inner-facing portion of the rear base 426. The knob 458 can be positioned perpendicular to the bar 450 and can be turned clockwise or counterclockwise to make minor adjustments to the angle of the rear base 426 relative to the rest of the adjustable support stand 400. In some embodiments, the leveling knob 458 can provide continuous, fluid adjustments up to three degrees in either direction (i.e., six degrees total). In other embodiments, the leveling knob 458 can provide pre-determined adjustments at one-degree intervals, up to three degrees in either direction. For example, turning the knob in either direction can result in a one-degree shift, a two-degree shift, or a three-degree shift.

In addition to the knob 458, the scope-leveling mechanism 490 can be comprised of a shaft 468 encompassed on one end by the knob and on the other end by the base 426, as illustrated in FIG. 29. A spring 492 may be positioned on an inner portion of the knob 458 and around one end of the shaft 468, as illustrated in FIG. 28, to retain the knob in a fixed configuration. More specifically, the spring 492 may be a compression spring that functions to constantly pull the knob 458 toward the base 426. Compressing the spring 492 enables the knob 458 to turn from its fixed configuration. Further, in some embodiments, the scope-leveling mechanism 490 can include additional components to retain the knob 458 in a fixed configuration unless it is pulled out far enough to enable rotation. For example, the scope-leveling mechanism can include a base 494 having a pin hole 496 into which a pin 498 on the knob 458, illustrated in FIG. 27, can be inserted, as illustrated in FIG. 29. The pin hole 496 can be near a top portion of the base 494 such that when the pin 498 is inserted into the pin hole, the knob 458 is fixed in place in a relatively vertical configuration. To rotate the knob 458, the knob can be pulled outward away from the base 424 and the spring 492 can be compressed until the pin 498 clears the pin hole 496. If the knob 458 is then turned to a point where the pin 498 and pin hole 496 do not align and released, the spring 492 can continue to hold the knob in place. However, its positioning is less fixed then when the pin 498 is inserted in the pin hole 496.

Storage

As mentioned above, the adjustable support stand can have multiple storage features. For example, the foundation 428 can include a foundation front end 430, a foundation rear end 432, and a foundation tray 434. The foundation front end 430 can have a storage mount 464 as well as various trays and cavities, as illustrated in FIGS. 21-22. Additionally, it can contain an open storage compartment 460 on an extension and bit storage 462 on a second extension. Similarly, the foundation rear end 432 can include an open storage compartment 460 on an extension and bit storage 462 on a second extension. The foundation rear end 432 can also include an open rail end 446, as described above, to accept elongate cleaning or maintenance tools. Lastly, the foundation tray 434 itself, located between the foundation front end 430 and foundation rear end 432 can have storage trays and compartments for various tools and cleaning implements.

Example Support Stand

An adjustable support stand can comprise: a front support 402 on a first end of the adjustable support stand 400 having a grip 408 comprised of a first, front support material; and a rear support 404 on an opposing, second end of the adjustable support stand having a grip 410 comprised of a first, rear support material, wherein the front and the rear supports can each have at least two vertical arms 414a-d, at least one of the supports has vertically stacked chevron voids 416a on each arm, and the chevron voids can be deformable by the object being worked upon to secure and grip the object in place.

The front support 402 can be further comprised of a housing 418 having a second, front support material, wherein the second material on the front support can be different than the first material on the front support. The rear support 404 can be further comprised of a housing 420 having a second, rear support material, wherein the second material on the rear support can be different than the first material on the rear support. The material surrounding the stacked chevron voids 416a can be at least one of the first, front support material and the first, rear support material. A first of the two grips 408 can be a stepped V-shape, can be secured within the housing 418, and can be comprised of thermoplastic or a thermoset rubber. A second of the two grips can be V-shaped, can be secured within the housing, and can be comprised of thermoplastic or a thermoset rubber.

The chevron voids 416a positioned above the object being worked upon can substantially revert back to their original, undeformed shape after insertion of the object being worked upon. The adjustable support stand 400 can further comprise two rails 406 between the front and the rear supports 402 and 404. At least one of the front and the rear supports 402 and 404 can be slidable on the rails 406 to expand the distance between the supports. The adjustable support stand 400 can further comprise height adjustable feet 436 attached to a bottom of the stand.

The method of using an adjustable support 400 can comprise: adjusting the support stand to accommodate an object to be worked upon, wherein the support stand can have a front support 402 with a grip 408 comprised of a first, front support material, wherein the support stand can have a rear support 404 with a grip 410 comprised of a first, rear support material, wherein the front and the rear supports can each have at least two vertical arms 414a-d, and wherein at least one of the supports can have vertically stacked chevron voids 416a on each arm; placing a front portion of the object to be worked upon into the front support; and placing a rear portion of the object to be worked upon into the rear support, wherein the chevron voids can be deformable by the object being worked upon to secure and grip the object in place.

A collapsible support stand 400 can comprise: a front support 402 on a first end of the adjustable support stand; a rear support 404 on an opposing, second end of the adjustable support stand; two rails 406 that can connect the front and the rear supports; and a locking mechanism 438 to lock the front support in place.

The front support 402 can have a grip 408 comprised of a first, front support material, the rear support 404 can have a grip 410 comprised of a first, rear support material, the front and the rear supports can each have at least two vertical arms 414a-d, at least one of the supports can have vertically stacked chevron voids 416a on each arm. The chevron voids 416a can be deformable by an object being worked upon to secure and grip the object in place.

Example Front Support

An adjustable, sliding support can comprise: a shaft 442; two support arms 414a/b attached to the shaft 442; a base 424 in which the shaft 442 mounts; and at least one rail 406 to which the base 424 mounts; wherein the base 424 can include a spring-based brake 470 and a rail biasing lock button 440; and wherein the support can be slidable between a first portion of a support stand toward a second portion of the support stand when the rail biasing lock button 440 is compressed.

The spring-based brake 470 can further comprise a rail brake 472 having a connection end 474 and at least one spring 476*a/b* (for example one spring 476*a* connected to button 440 and one spring 476*b* connected to connection end 474), wherein the connection end 474 can be configured to have a friction connection with the rail 406 when the spring-based brake 470 is engaged with the rail 406. The rail biasing lock button 440 can be in contact with an upper portion of the rail brake 472 and at least one spring 476*a*. Further, pushing the rail biasing lock button 440 can compress the at least one spring 476*a* in contact with the rail biasing lock button 440, and pull the rail brake 472 away from a side of the base 424 and towards a center of the base 424, which can compress the at least one spring 476*a/b* connected to the rail brake 472. The connection end 474 of the rail brake 472 can be arcuate in shape.

The rail biasing lock button 440 is located on a single side of the base 424. A front portion of the base 424*a* can house the spring-based brake 470. A back portion of the base 424*b* can house the shaft 442.

The base 424 can further comprise rail connectors 438 that flank sides of the shaft 442 and the spring-based brake 470, wherein the rail connectors 438 can be structured to be mountable to the at least one rail 406. The rail connectors 438 can be comprised of two rail connectors 438, the at least one rail 406 can be comprised of two rails 406, and the rail connectors 438 can completely encircle the rails 406. The rail connectors 438 can be comprised of a separable portion 478 that, when separated from the remainder of the base 424, enables the base 424 to separate from the rails 406. Separable can mean it completely detaches or it pivots open.

The shaft 442 can further comprise a height-adjustment button 444 that, when engaged, enables the shaft 442 to slide within the base 424. The shaft 442 can further comprise a pin 480 that is directly or indirectly connected to the height-adjustment button 444, the base 424 can further comprise a vertical series of pin holes 482, the pin 480 can have a resting configuration wherein it is inserted in a pin hole 482 from the series of pin holes 482, and engaging the height-adjustment button 444 can remove the pin 480 from the pin hole 482, thereby enabling the shaft 442 to slide within the base 424. The height-adjustment button 444 can be a spring-activated push button, an interior end 484 of the height-adjustment button 444 can be engaged with an upper portion 486*a* of a vertical rocker 486, the pin 480 can be engaged with a lower portion 486*b* of the vertical rocker 486, the vertical rocker 486 can pivot at a point between the upper portion 486*a* and the lower portion 486*b*, and pushing the height-adjustment button 444 can compress a spring 488 and pull the pin 480 away from the resting configuration.

The method of operating a slidable support can comprise: pushing a rail biasing lock button 440 on the slidable support to pull a spring-based brake 470 away from a rail 406, wherein the rail biasing lock button 440 can be connected to a portion of the spring-based brake 470, and the spring-based brake 470 can have a connection end 474 that is configured to make contact with the rail 406; sliding the slidable support along the rail 406; and releasing the rail biasing lock button 440, which can cause the spring-based brake 470 to push the connection end 474 against the rail 406 and secure the support in place. The connection end 474 of the spring-based brake 470 can be arcuate in shape. The slidable support can include a base 424 having rail connectors 438 that flank sides of the base 424, the rail 406 can be comprised of two elongated portions, and each rail connector 438 can be mountable to one of the two elongated portions of the rail 406.

The method can further comprise: pushing a height-adjustment button 444, wherein the height-adjustment button 444 can be located on a shaft 442 of the slidable support and can be connected to a pin 480, the shaft 442 can be slidable within a base 424, the base 424 can be comprised of a series of vertical pin holes 482, and the pin 480 can be removed from a pin hole 482 of the series of pin holes 482 when the height-adjustment button 444 is pushed; sliding the shaft 442 through the base 424 until a predetermined height is reached; and releasing the height-adjustment button 444, wherein releasing the height-adjustment button 444 can enable the pin 480 to insert into a nearest pin hole 482 within the series of pin holes 482, thereby locking the shaft 442 within the base 424. The height-adjustment button 444 can be a spring-activated push button, an interior end 484 of the height-adjustment button 444 can be engaged with an upper portion 486*a* of a vertical rocker 486, the pin 480 can be engaged with a lower portion 486*b* of the vertical rocker 486, the vertical rocker 486 can pivot at a point between the upper portion 486*a* and the lower portion 486*b*, and pushing the height-adjustment button 444 can compress a spring 488 and pull the pin 480 away from the resting configuration.

Example Rear Support

A clamp for a benchtop vise can comprise: a base 426 positioned on top of a portion of the benchtop vise; a support 404 comprised of first and second arms 414*c/d*, a grip 410, and a housing 420, wherein the first and second arms 414*c/d* can be positioned above the base 426, the grip 410 can be comprised of at least two vise jaw pads 410*a*, the housing 420 can be comprised of at least first and second portions, the first arm 414*d* can be comprised of a first housing portion 420 and a first vise jaw pad 410*a*, and the second arm 414*c* can be comprised of a second housing portion 420 and a second vise jaw pad 410*a*; a bar 450 connecting the first and second arms 414*c/d* together, wherein the first arm 414*d* can be positionally adjustable along the bar 450 and the second arm 414*c* can be positionally fixed on the bar; a handle 448 on an outer face of the first housing portion 420; a clamping lever 452 positioned exterior to the handle 448 and in line with the handle 448 and the first and second arms 414*c/d*; and a release trigger 456 positioned between the handle 448 and the clamping lever 452.

The grip 410 can be further comprised of a base pad 410*b*, and the base pad 410*b* can be located on a top portion of the base 426. The first vise jaw pad 410*a* can be attached to an inner face of the first housing portion 420, and the second vise jaw pad 410*a* can be attached to an inner face of the second housing portion 420. The handle 448 can be positioned perpendicularly to the outer face of the first housing portion 420, and the first housing portion 420 of the first arm 414*d* can be parallel to the second housing portion 420 of the second arm 414*c*. The clamping lever 452, when squeezed, can activate a spring-based clamping mechanism 466 that can be incorporated onto the bar 450 and cause the first arm 414*d* to move toward the second arm 414*c*. The release trigger 456 can include a resting configuration that prevents the first arm 414*d* from moving away from the second arm 414*c*. The release trigger 456 can include an activated configuration that allows the first arm 414*d* to move away from the second arm 414*c*. The clamping lever 452 can have a hollow interior inside which the release trigger 456 can be transiently positioned when the clamping lever 452 is squeezed. The handle 448, clamping lever 452, and releaser trigger 456 can be mounted to a car 454 that is slidable along the bar 450, and a spring-based clamping mechanism 466 can be housed inside the car 454.

The clamp can further comprise: a scope-leveling mechanism 490 attached to the base 426 and configured to adjust the angle of the base 426 relative to the top portion of the benchtop vise. The scope-leveling mechanism 490 can be positioned perpendicular to the bar 450. The scope-leveling mechanism 490 can be comprised of a knob 458 and a shaft 468. The knob 458 can be turnable in a clockwise or counterclockwise direction to adjust the angle of the clamp up to three degrees in either direction. The shaft 468 can be surrounded on one end by the knob 458 and on the other end by the base 426. The scope-leveling mechanism 490 can include a spring 492 within the knob 458 and around the shaft 468 that retains the knob 458 in a fixed configuration. Compression of the spring 492 can enable the knob 458 to turn from its fixed configuration. The scope-leveling mechanism 490 can further include a base 494 having a pin hole 496, the pin hole 496 can be near a top portion of the base 494 of the scope-leveling mechanism 490, the knob 458 can include a pin 498 that is insertable into the pin hole 496, the knob 458 can be fixed in place when the pin 498 is in the pin hole 496, and pulling the knob 458 can compress the spring 492 and remove the pin 498 from the pin hole 496.

The method of operating a clamp for a benchtop vise can comprise: moving a first arm 414*d* toward a second arm 414*c*, wherein a handle 448 can be perpendicularly attached to an outer face of a first housing portion 420 of the first arm 414*d*, the first housing portion 420 can be positioned opposite a second housing portion 420 of the second arm 414*c* that can be affixed to a base 426 beneath the second arm 414*c*, the first and second housing portions 420 can each have a vise jaw pad 410*a*, a bar 450 can be affixed to the base 426 and can connect the first and second arms 414*c/d* to each other, the first arm 414*d* can be positionally adjustable along the bar 450, a clamping lever 452, handle 448, first arm 414*d*, and second arm 414*c* can all be positioned in line with each other, and a release trigger 456 can be positioned between the handle 448 and the clamping lever 452 and can be transiently positioned within the clamping lever 452 when the clamping lever 452 is squeezed; and pulling the release trigger 456 toward the clamping lever 452 to activate the release trigger 456 and move the first arm 414*d* away from the second arm 414*c*.

Each time the clamping lever 452 is squeezed, the first arm 414*d* can move a predetermined distance towards the second arm 414*c*. The first arm 414*d* can be glidingly pushable towards the second arm 414*c*. The base 426, bar 450, and a car 454 upon which the clamping lever 452, release trigger 456, and handle 448 are mounted, can all be positioned in line with each other. A resting configuration of the release trigger 456 can prevent the first arm 414*d* from moving away from the second arm 414*c*.

Accessory for Working Device(s)

Figure 30:
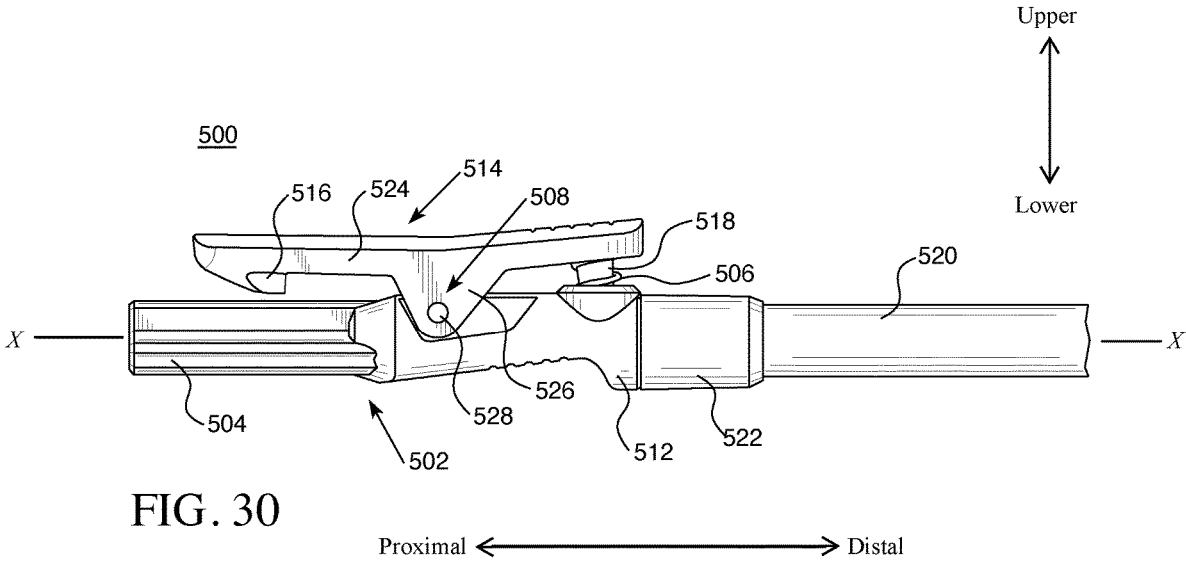
FIG. 30 is a side view of an accessory attachment portion of an accessory for a working device.

FIG. 30 is a side view of an accessory attachment portion of an accessory for a working device of the present disclosure. The accessory may include at least a plug body connected to an extension portion, wherein the plug body may be receivable by a receiving adapter on a working device. The plug body may include a keyed connection piece on an end opposite the extension portion connection. In addition to the keyed connection piece, the plug body can be comprised of a compression spring, a pivot joint, a receiving hole, and/or a mount. The extension portion can be connected to a tool on its end that is opposite the plug body. Further, the accessory may include a spring-loaded locking mechanism that can transiently lock the plug body to a receiving adapter, as illustrated and described further herein. The spring-locking mechanism can be comprised of a clip having a front hook positioned over the keyed connection piece, and a spring connection pin around which can be positioned the compression spring of the plug body. The spring connection pin can be inserted into the receiving hole of the plug body. Further, the receiving hole may be positioned more specifically in the mount of the plug body. A central portion of the spring-loaded locking mechanism can connect to the pivot joint, enabling the locking mechanism to pivot relative to the plug body.

Figure 31:
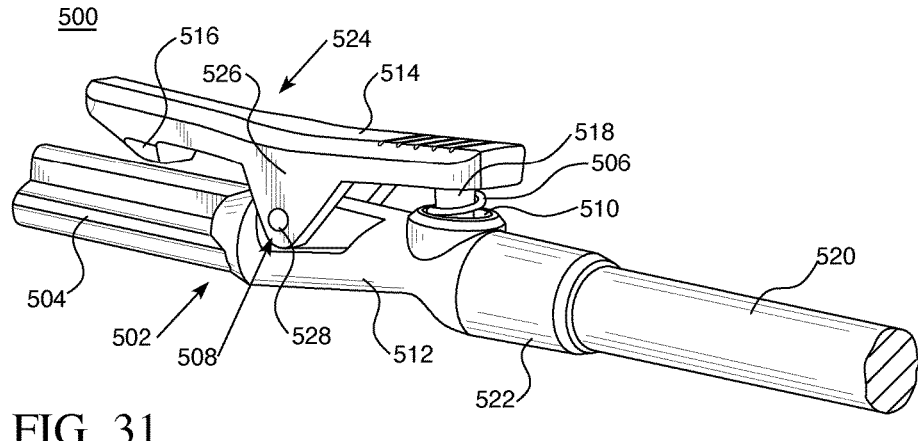
FIG. 31 is a rear perspective view of the accessory attachment portion of FIG. 30.
Figure 32:
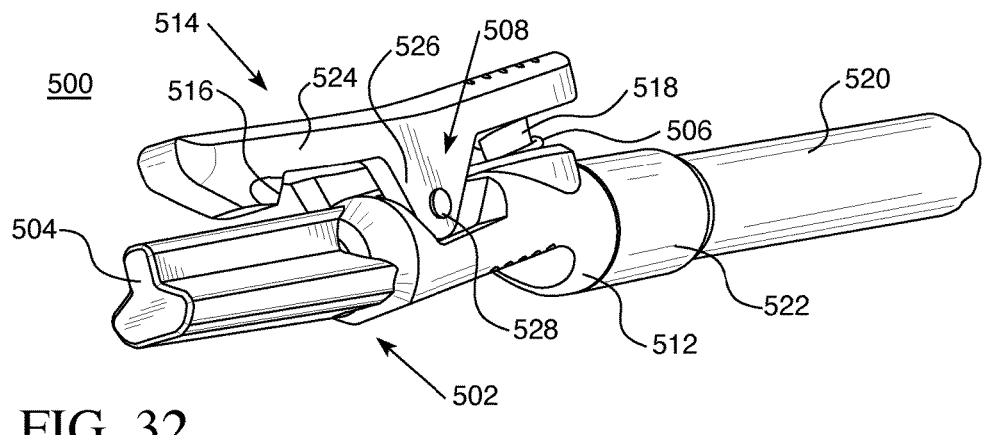
FIG. 32 is a front perspective view of the accessory attachment portion of FIG. 30.
Figure 33:
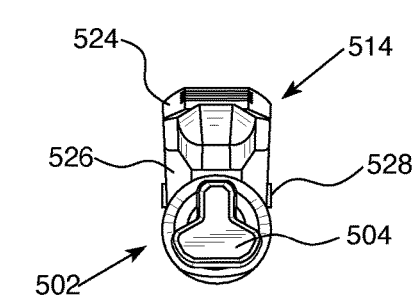
FIG. 33 is a front view of the accessory attachment portion of FIG. 30.
Figure 34:
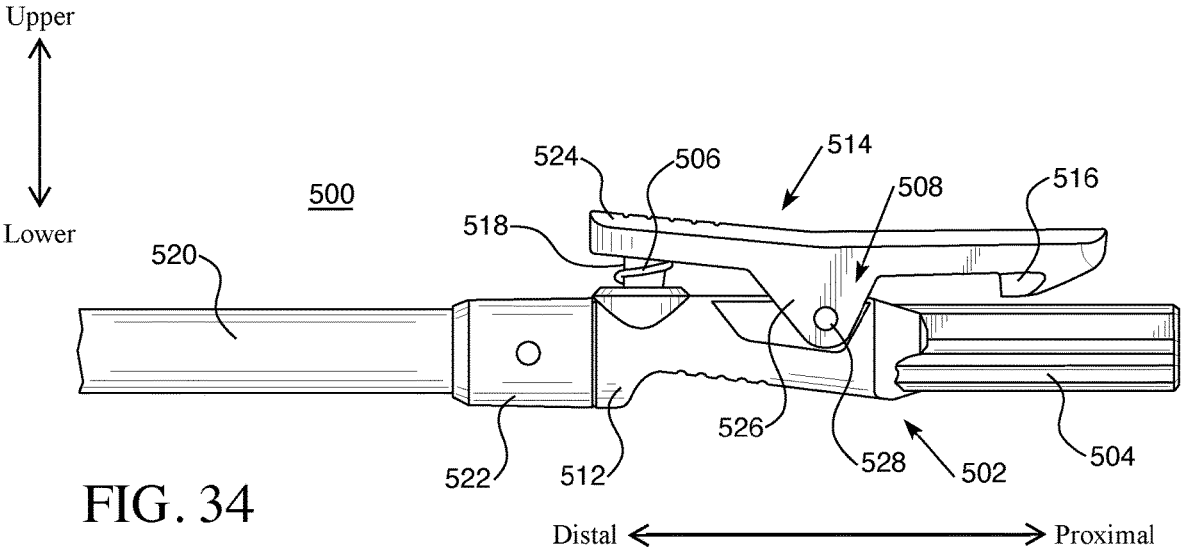
FIG. 34 is a right side view of the accessory attachment portion of FIG. 30.
Figure 35:
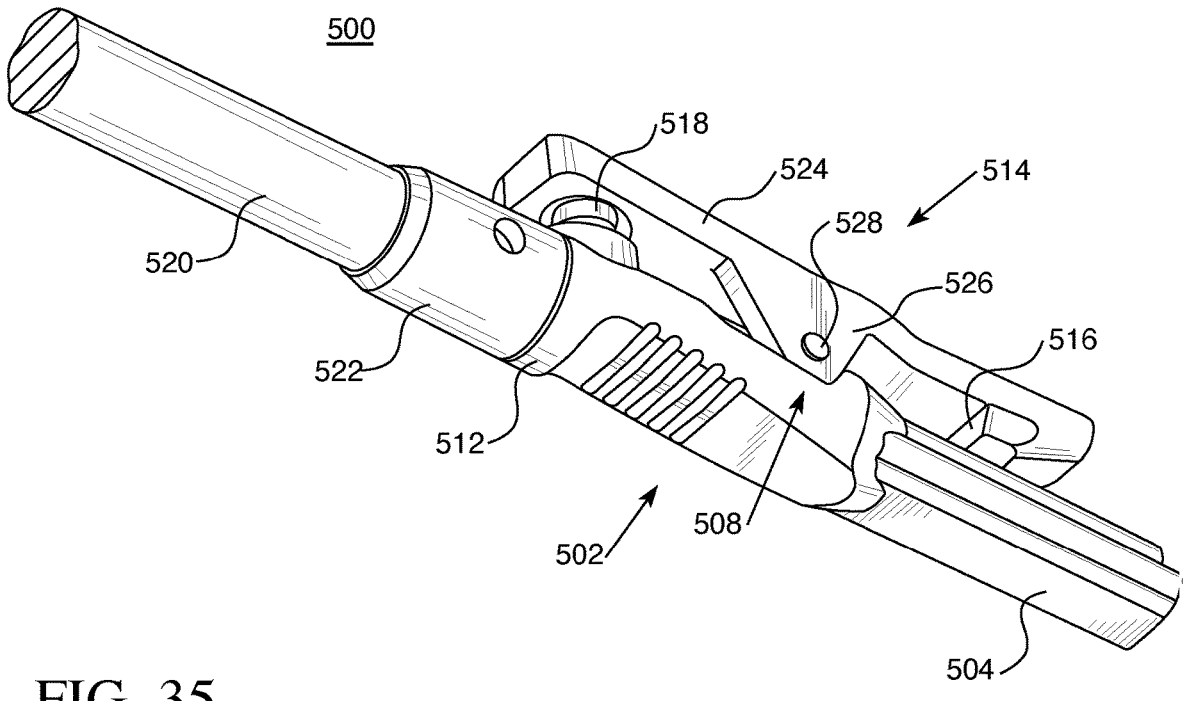
FIG. 35 is a bottom perspective view of the accessory attachment portion of FIG. 30.
Figure 36:
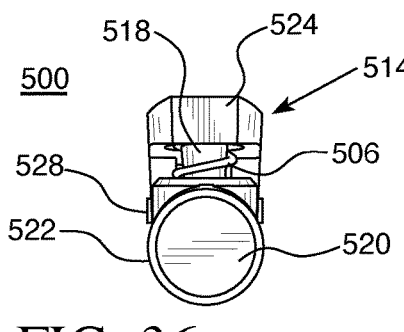
FIG. 36 is a rear view of the accessory attachment portion of FIG. 30.
Figure 37:
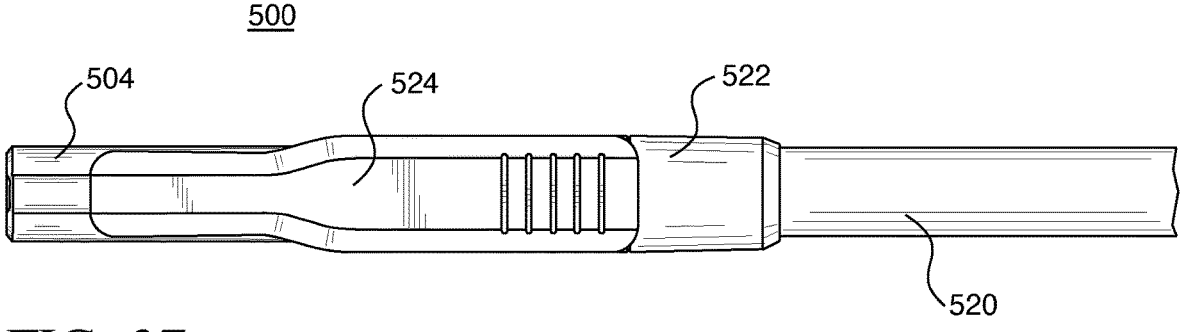
FIG. 37 is a top view of the accessory attachment portion of FIG. 30.
Figure 38:
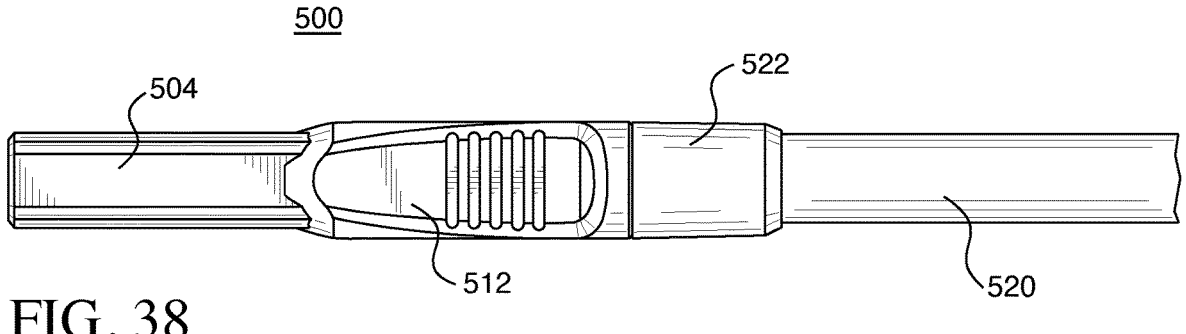
FIG. 38 is a bottom view of the accessory attachment portion of FIG. 30.
Figure 39:
FIG. 39 is a top perspective view of an example accessory for a working device.
Figure 40:
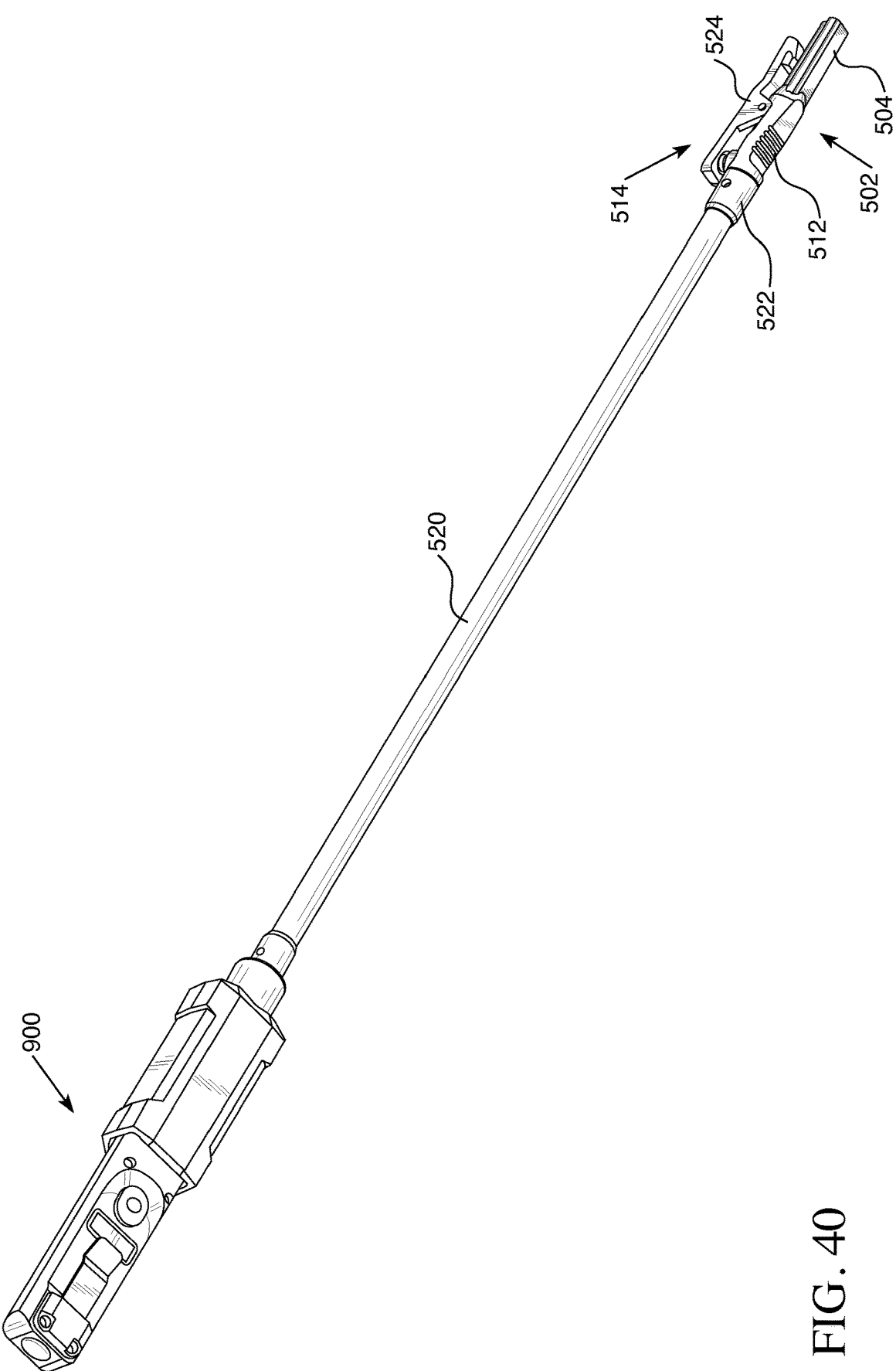
FIG. 40 is a bottom perspective view of the accessory of FIG. 39.
Figure 41:
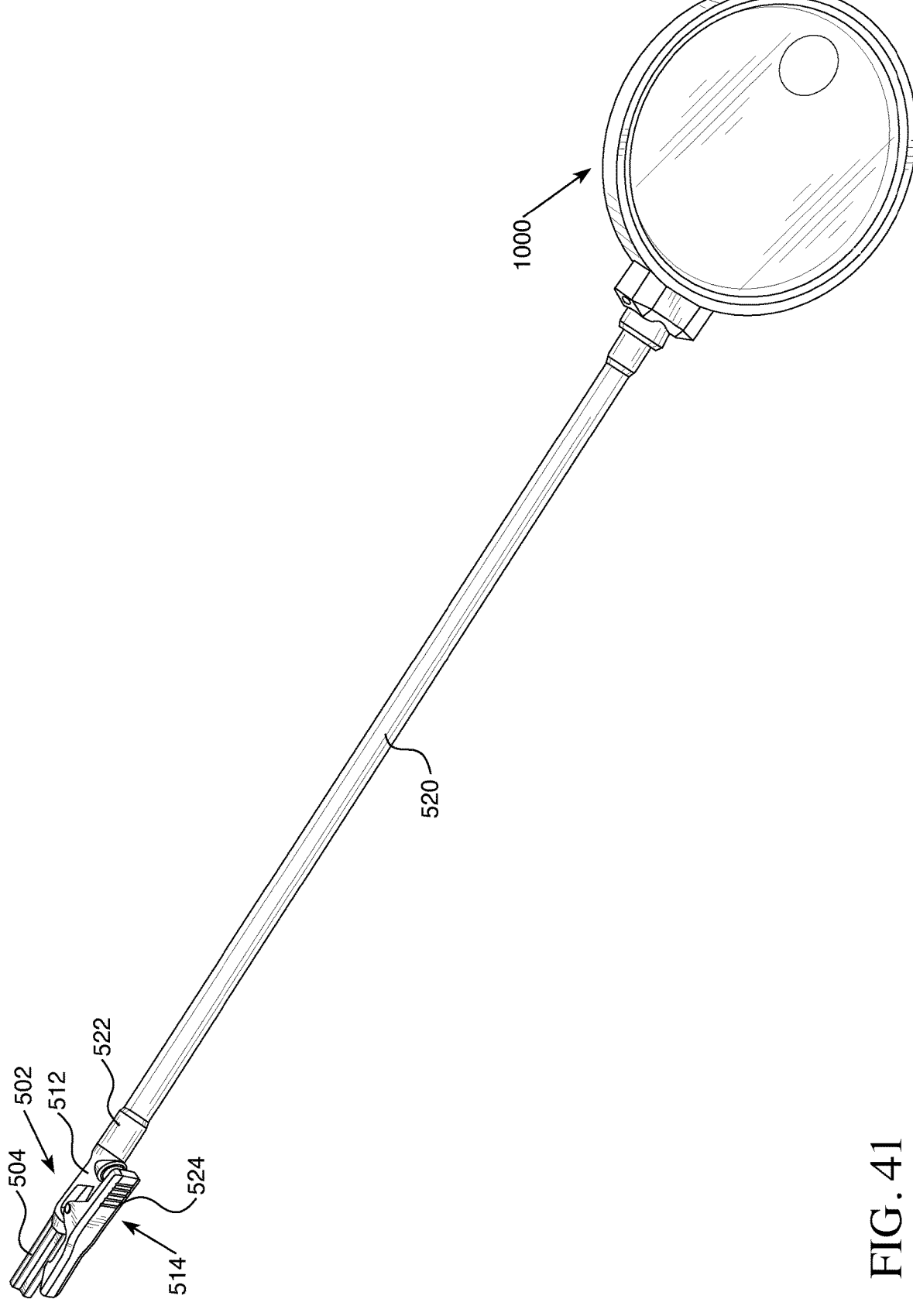
FIG. 41 is a top perspective view of an example accessory for a working device.
Figure 42:
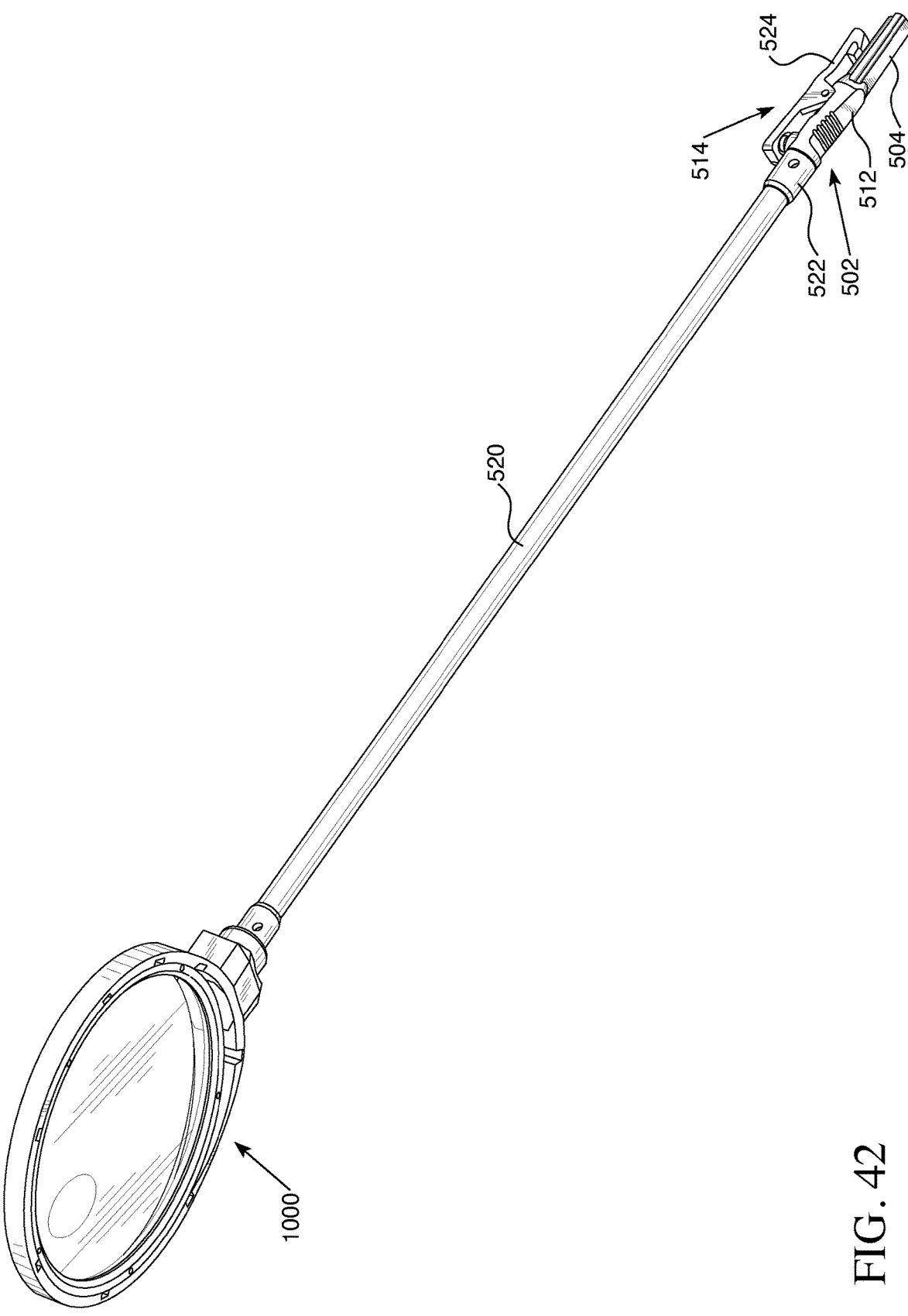
FIG. 42 is a bottom perspective view of the accessory of FIG. 41.
Figure 43:
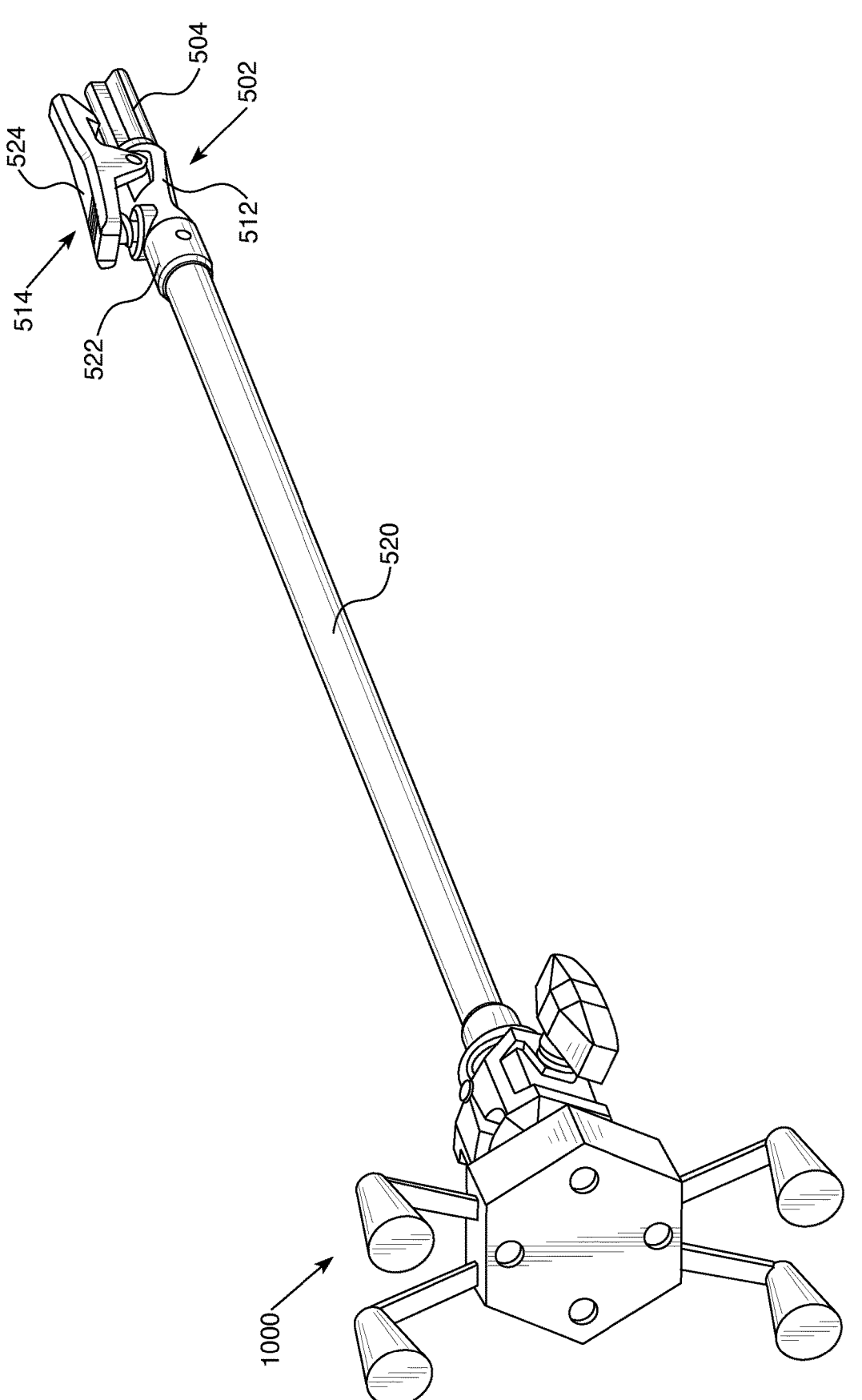
FIG. 43 is a rear perspective view of an example accessory for a working device.
Figure 44:
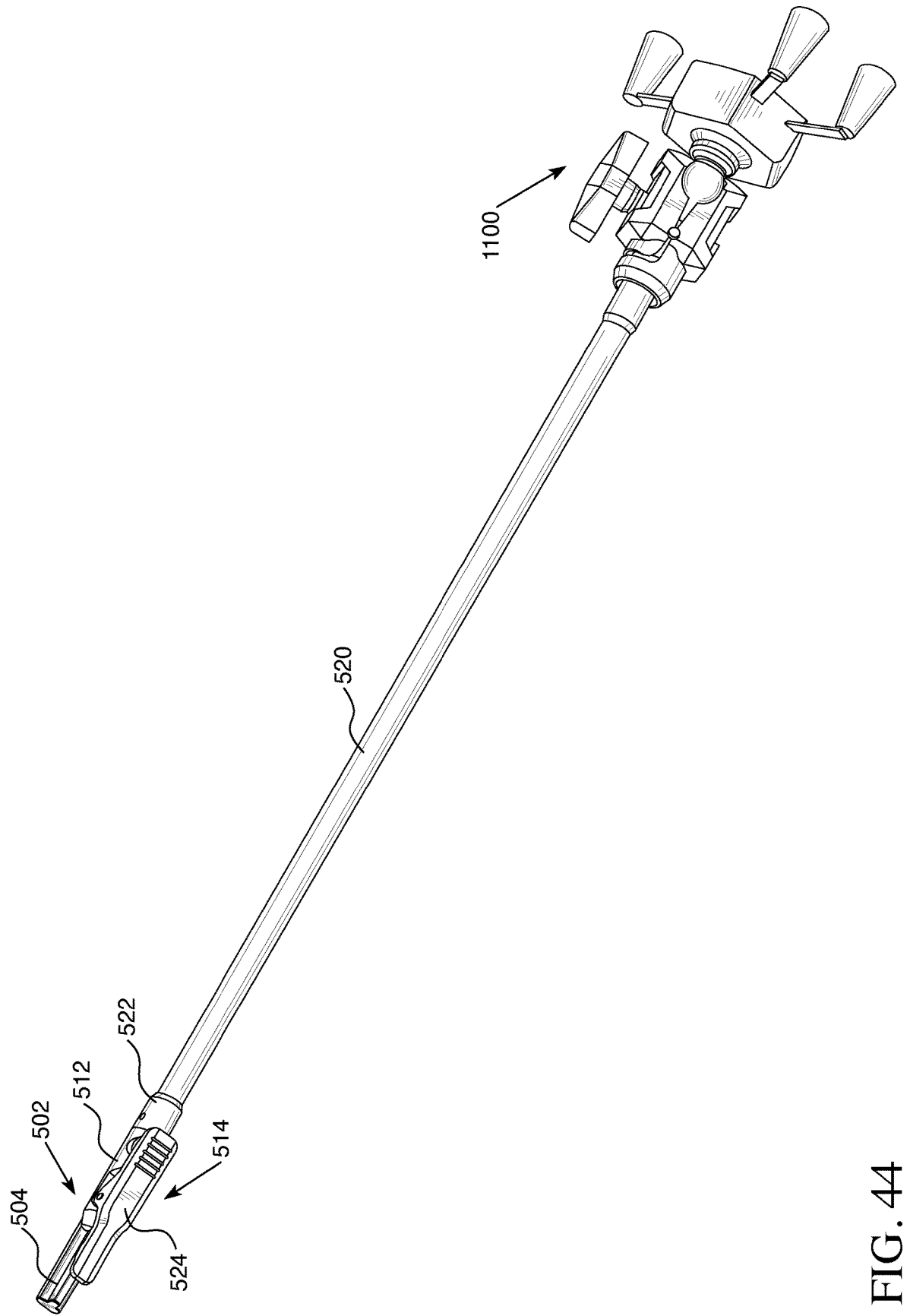
FIG. 44 is a bottom perspective view of the accessory of FIG. 43.

Additional views of the accessory are provided. FIG. 31 is a rear perspective view of the accessory attachment portion of FIG. 30. FIG. 32 is a front perspective view of the accessory attachment portion of FIG. 30. FIG. 33 is a front view of the accessory attachment portion of FIG. 30. FIG. 34 is a right side view of the accessory attachment portion of FIG. 30. FIG. 35 is a bottom perspective view of the accessory attachment portion of FIG. 30. FIG. 36 is a rear view of the accessory attachment portion of FIG. 30. FIG. 37 is a top view of the accessory attachment portion of FIG. 30. FIG. 38 is a bottom view of the accessory attachment portion of FIG. 30. FIG. 39 is a top perspective view of an example accessory for a working device. FIG. 40 is a bottom perspective view of the accessory of FIG. 39. FIG. 41 is a top perspective view of an example accessory for a working device. FIG. 42 is a bottom perspective view of the accessory of FIG. 41. FIG. 43 is a rear perspective view of an example accessory for a working device. FIG. 44 is a bottom perspective view of the accessory of FIG. 43.

Figure 45:
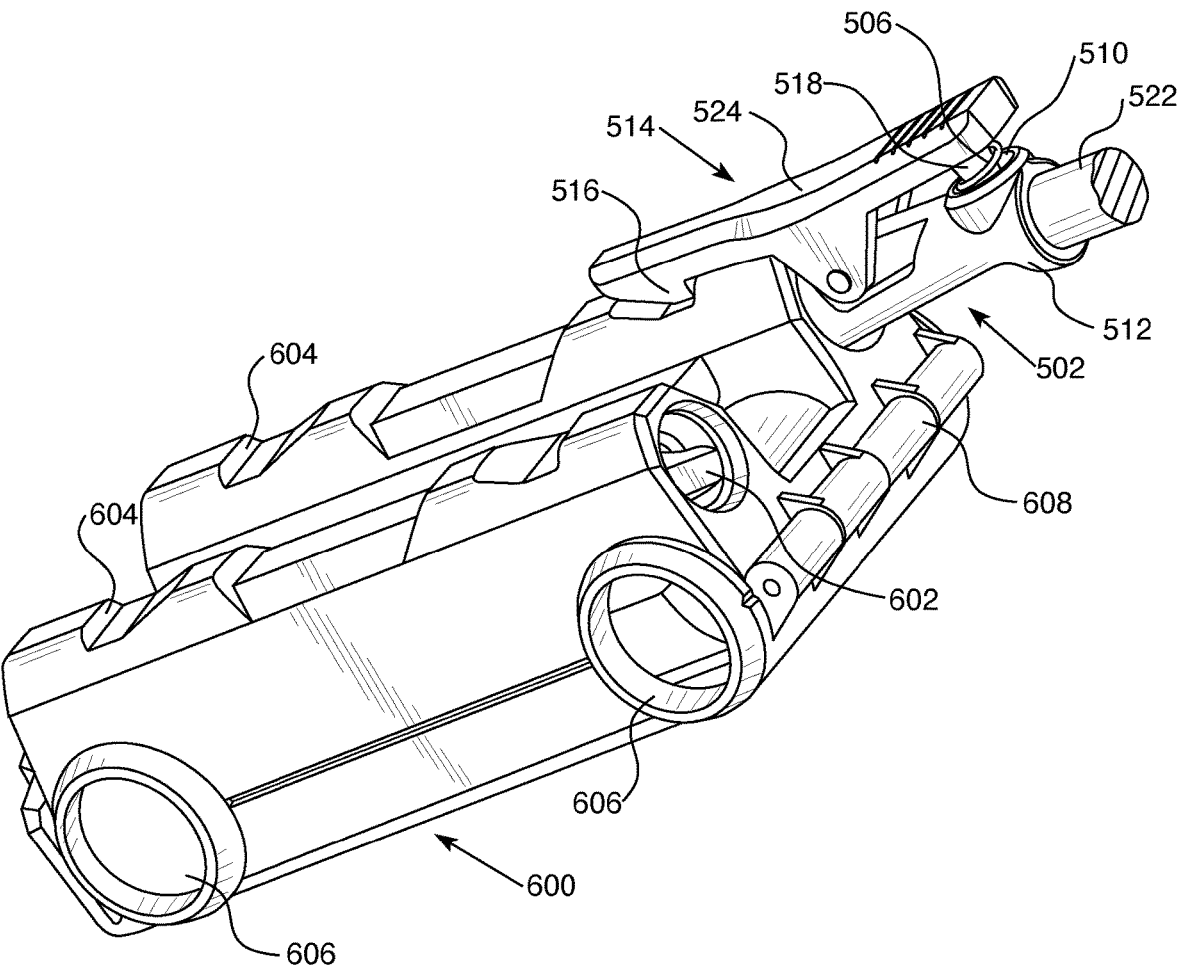
FIG. 45 is a side perspective view of the accessory attachment portion of FIG. 30 connected to a receiving adapter.
Figure 46:
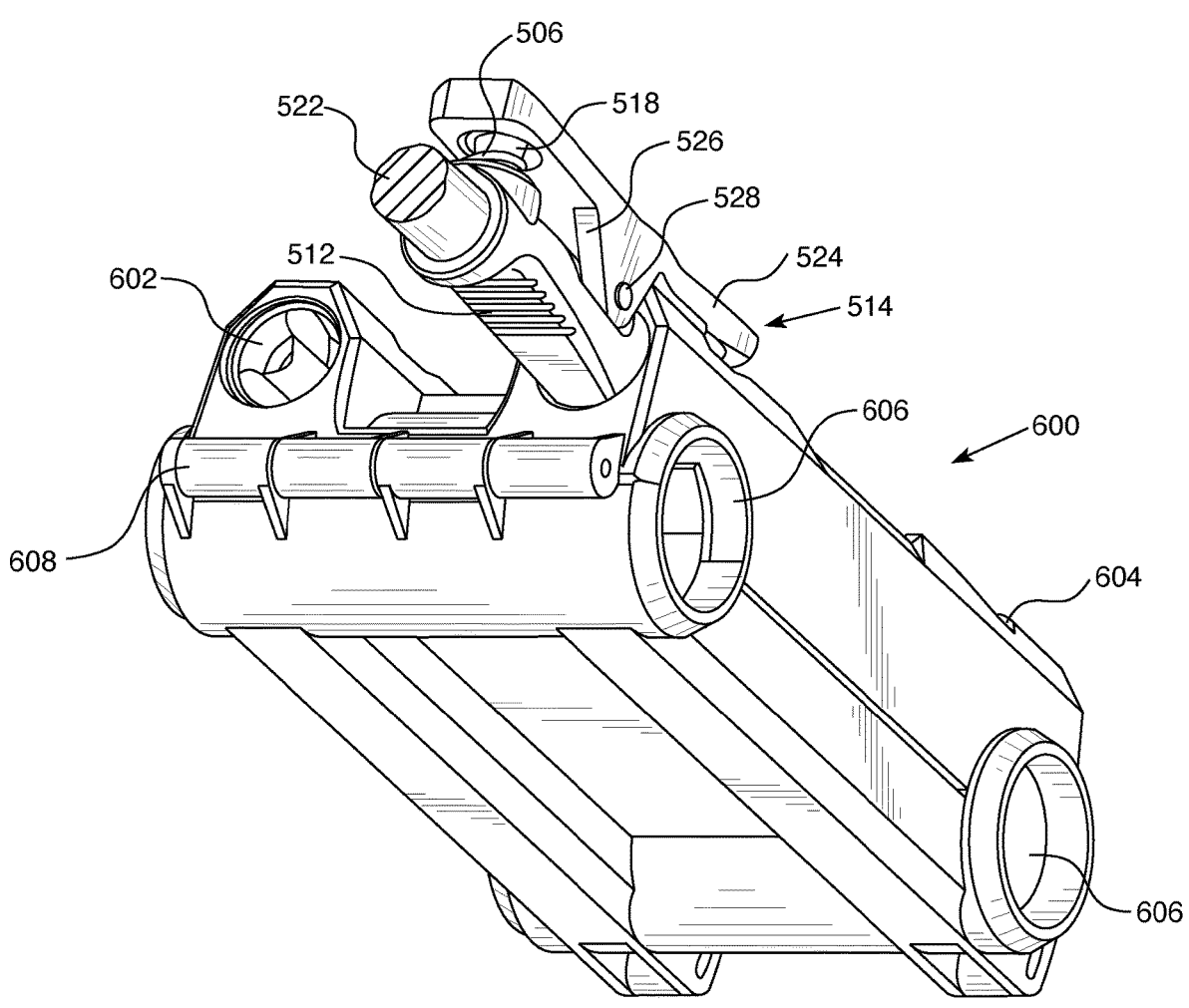
FIG. 46 is a bottom perspective view of the accessory attachment portion of FIG. 30 connected to the receiving adapter of FIG. 45.
Figure 47:
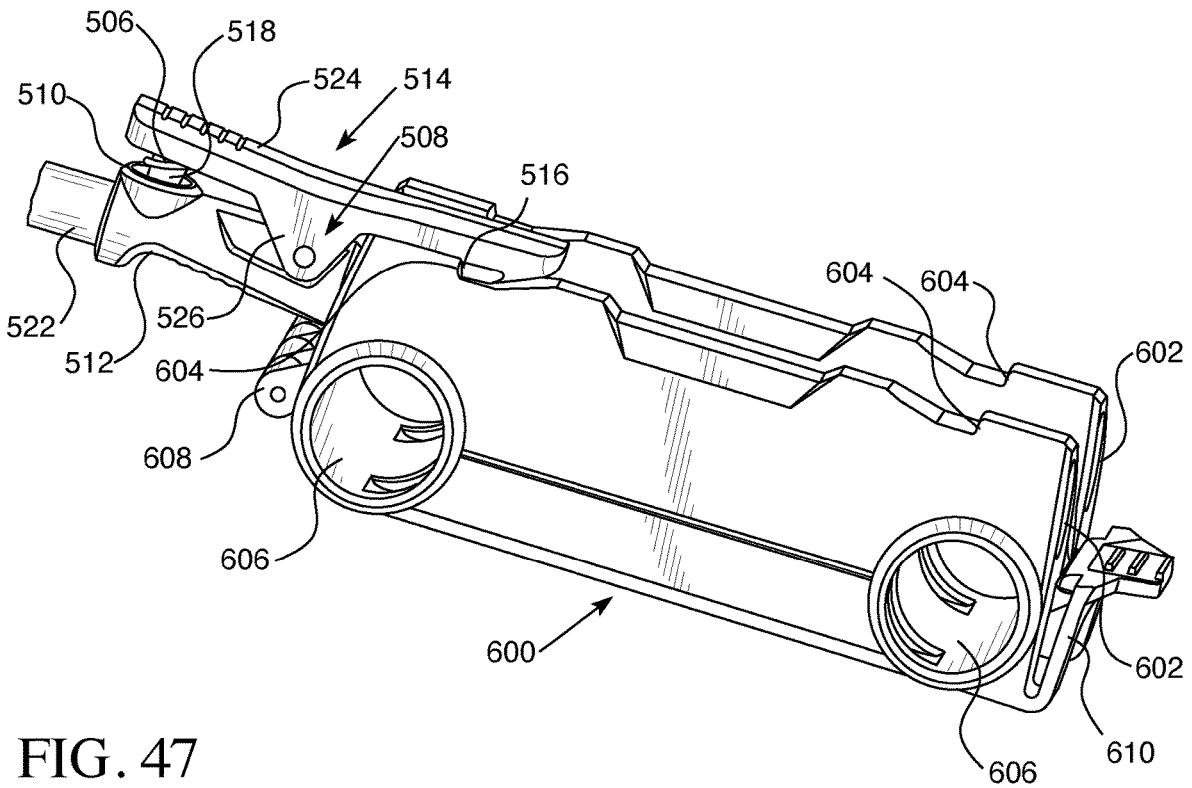
FIG. 47 is a side perspective view of the accessory attachment portion of FIG. 30 connected to the receiving adapter of FIG. 45.
Figure 48:
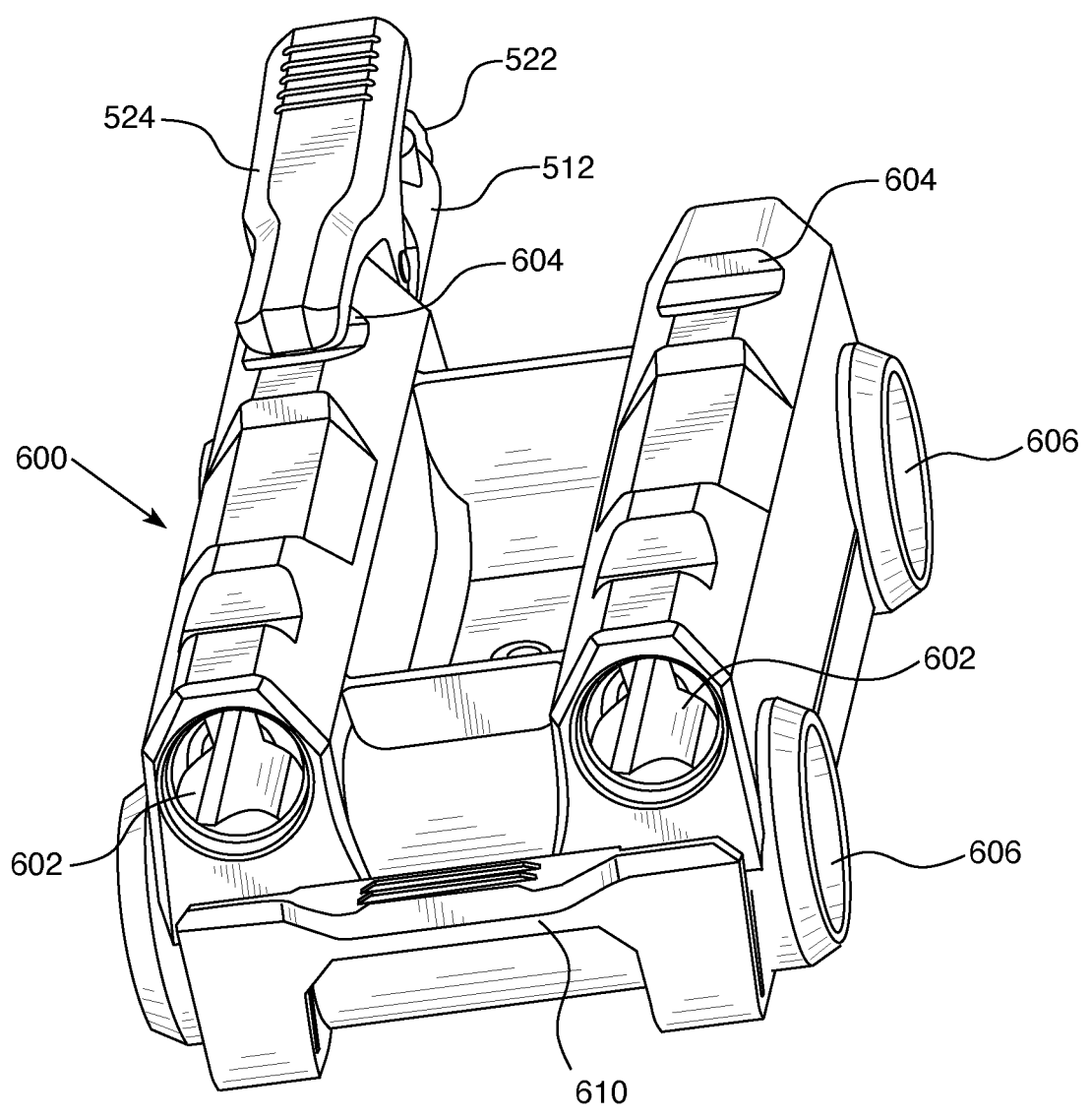
FIG. 48 is a front perspective view of the accessory attachment portion of FIG. 30 connected to the receiving adapter of FIG. 45.
Figure 49:
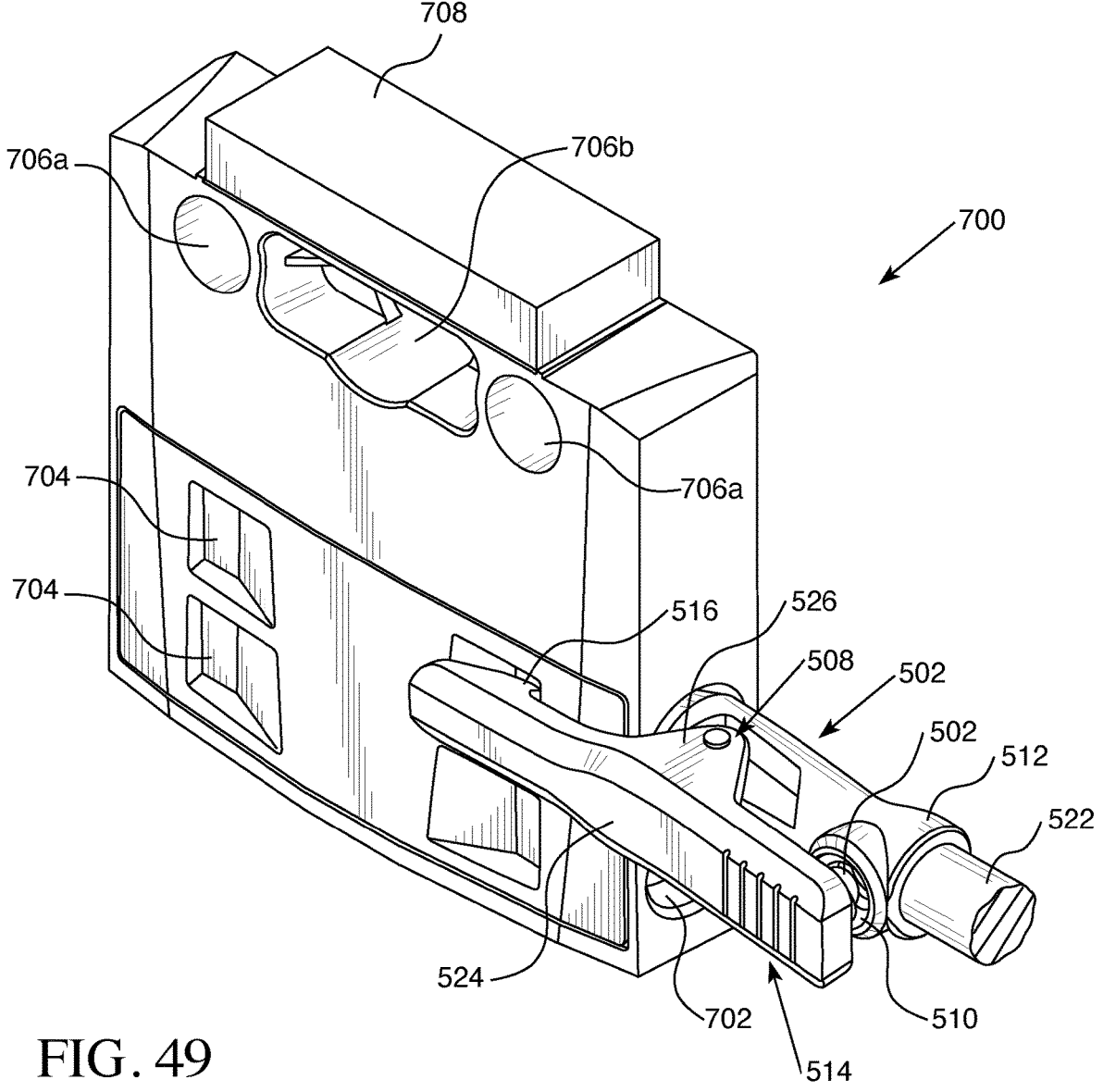
FIG. 49 is a side perspective view of the accessory attachment portion of FIG. 30 connected to a receiving adapter.
Figure 50:
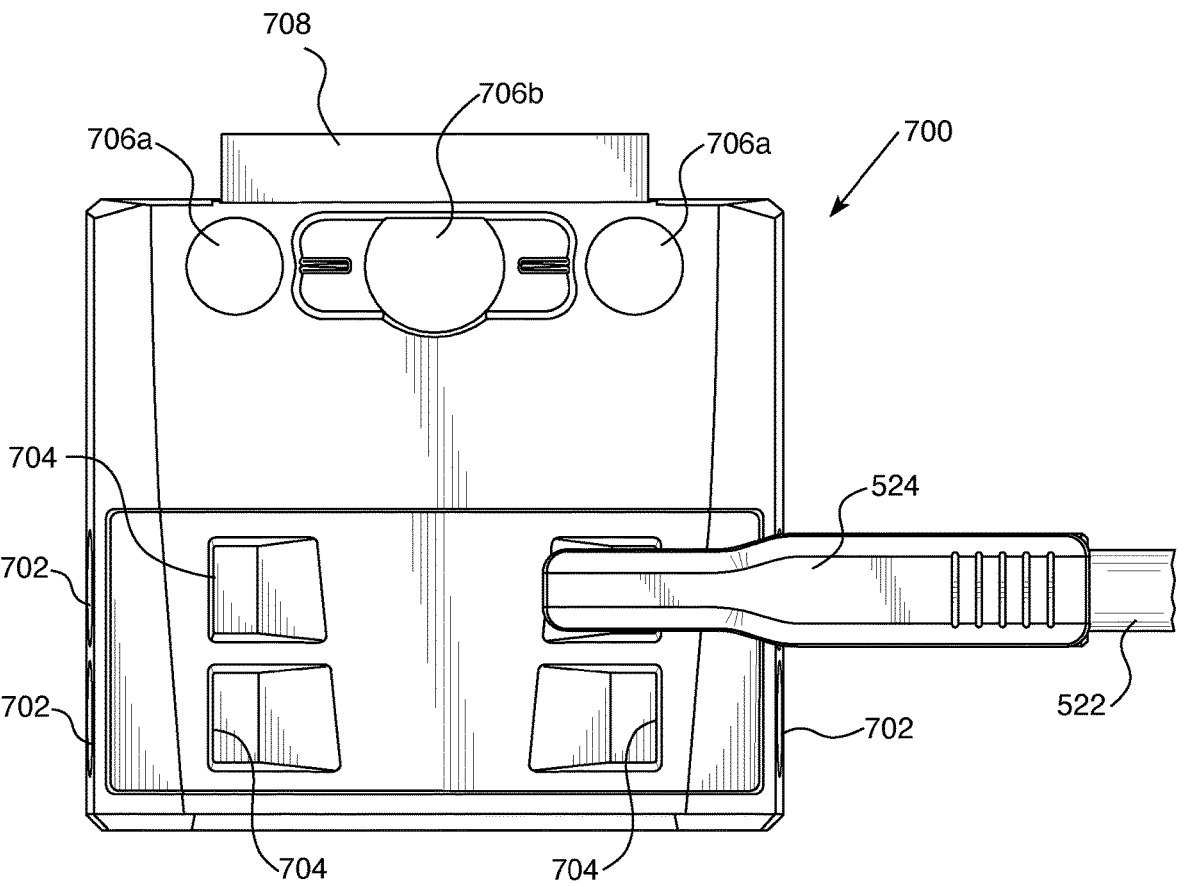
FIG. 50 is a top view of the accessory attachment portion of FIG. 30 connected to the receiving adapter of FIG. 49.
Figure 51:
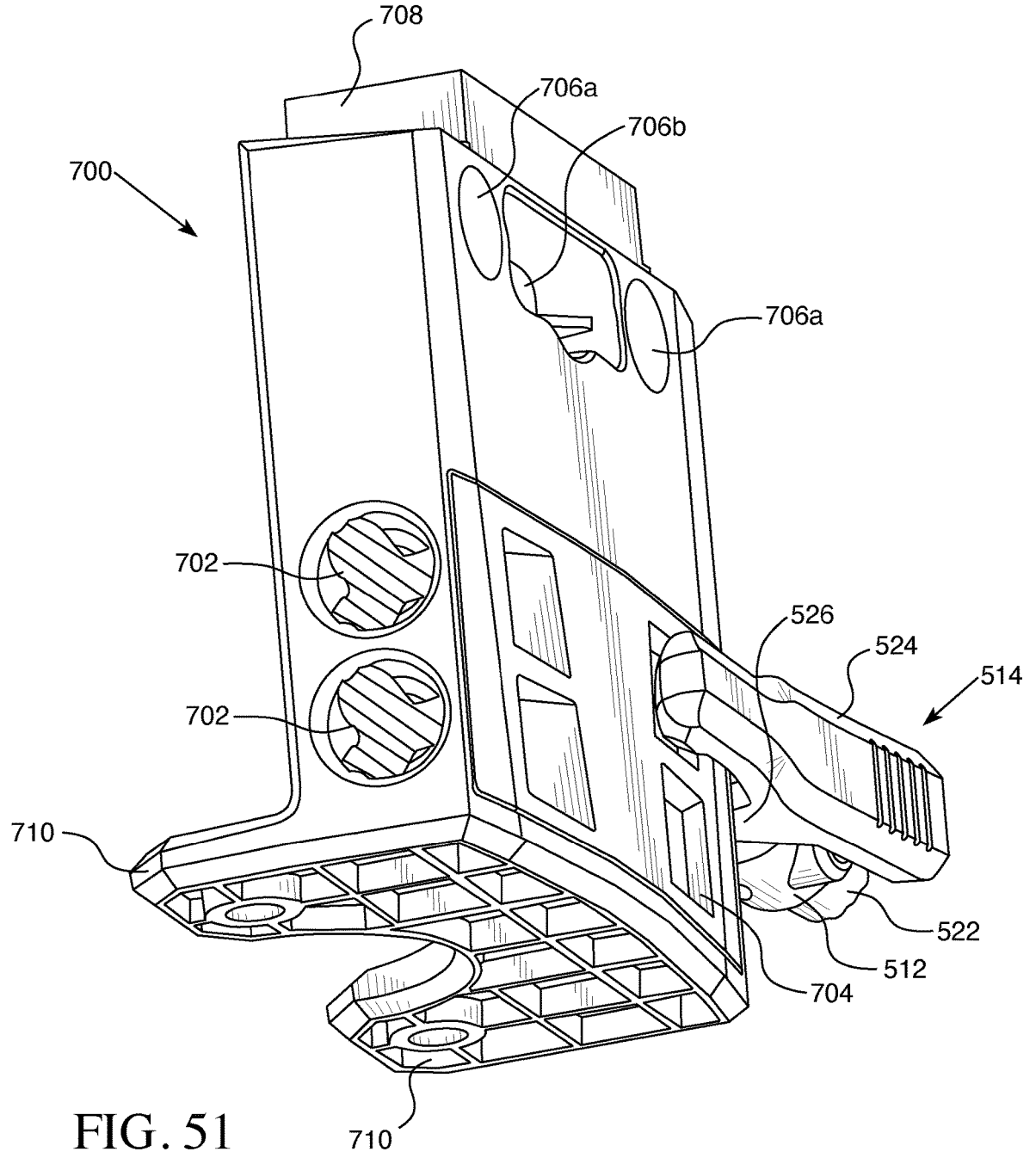
FIG. 51 is a front perspective view of the accessory attachment portion of FIG. 30 connected to the receiving adapter of FIG. 49.
Figure 52:
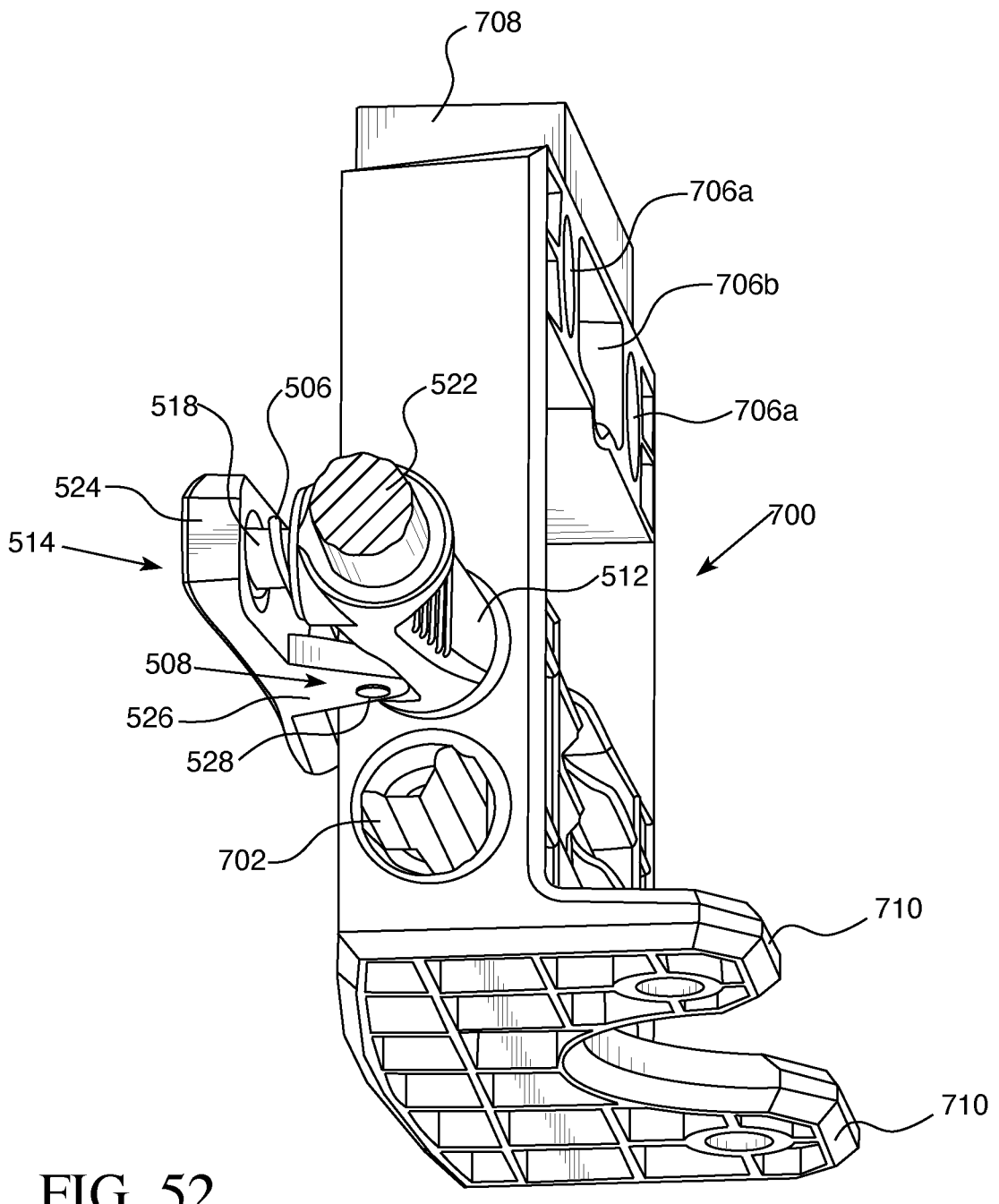
FIG. 52 is a rear perspective view of the accessory attachment portion of FIG. 30 connected to the receiving adapter of FIG. 49.

In some cases, the accessory may connect to a receiving adapter that then connects to a working device. FIG. 45 is a side perspective view of the accessory attachment portion of FIG. 30 connected to a receiving adapter. FIG. 46 is a bottom perspective view of the accessory attachment portion of FIG. 30 connected to the receiving adapter of FIG. 45. FIG. 47 is a side perspective view of the accessory attachment portion of FIG. 30 connected to the receiving adapter of FIG. 45. FIG. 48 is a front perspective view of the accessory attachment portion of FIG. 30 connected to the receiving adapter of FIG. 45. FIG. 49 is a side perspective view of the accessory attachment portion of FIG. 30 connected to a receiving adapter. FIG. 50 is a top view of the accessory attachment portion of FIG. 30 connected to the receiving adapter of FIG. 49. FIG. 51 is a front perspective view of the accessory attachment portion of FIG. 30 connected to the receiving adapter of FIG. 49. FIG. 52 is a rear perspective view of the accessory attachment portion of FIG. 30 connected to the receiving adapter of FIG. 49.

Figure 53:
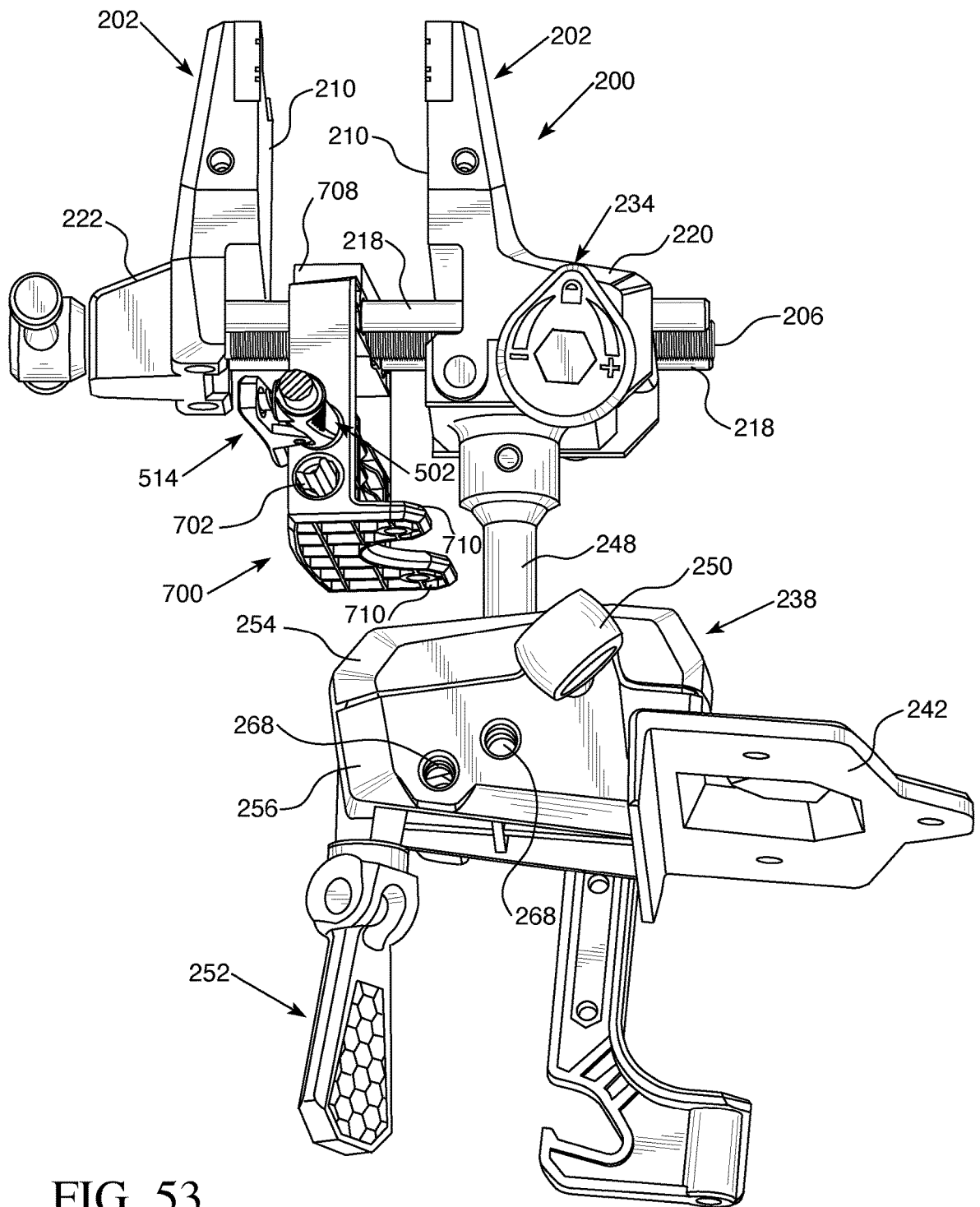
FIG. 53 is a perspective view of the receiving adapter of FIG. 49 connected to the vise of FIG. 3 and illustrates the accessory attachment portion of FIG. 30 connected to the receiving adapter.
Figures 54, 55:
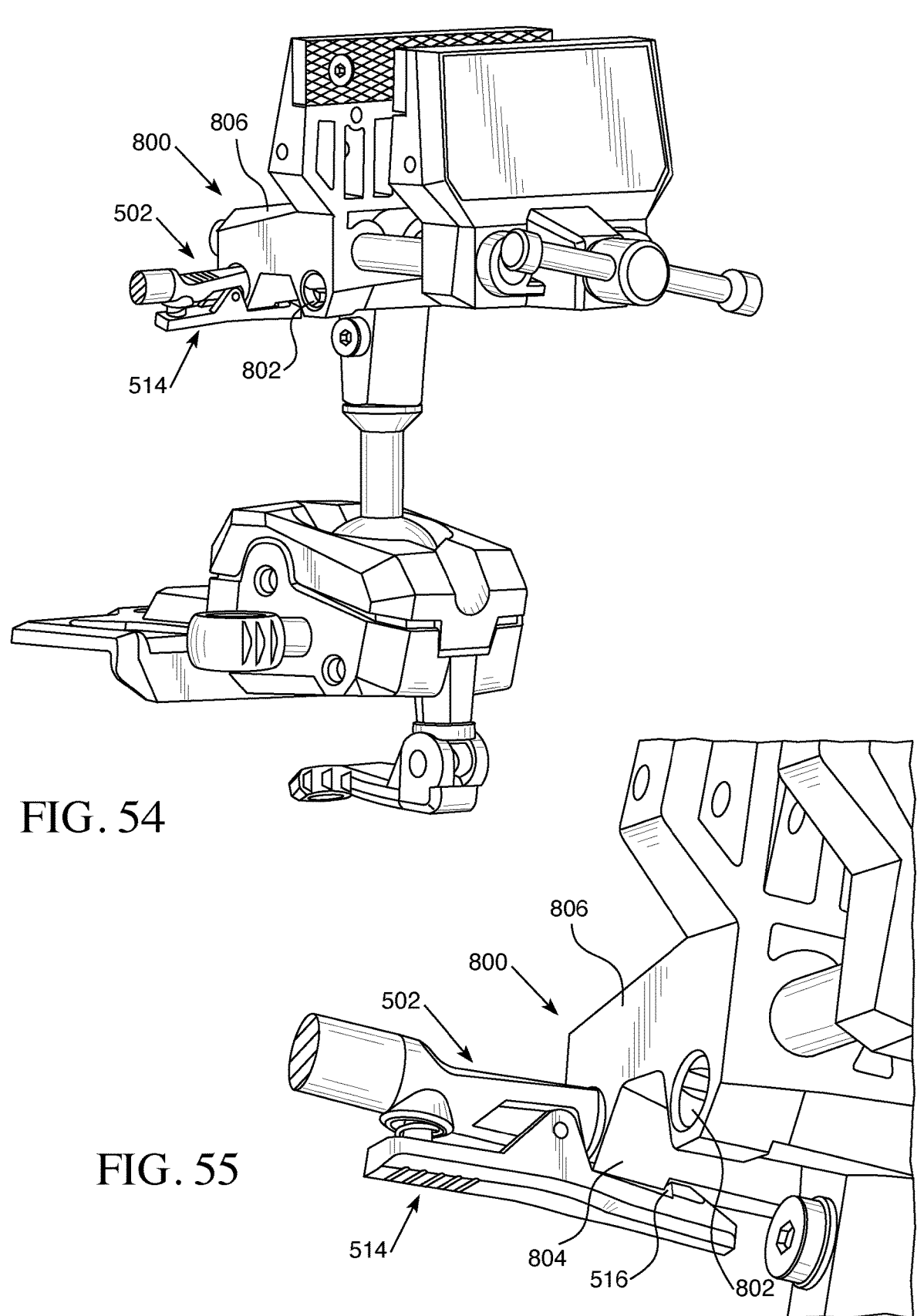
FIG. 54 is a side perspective view of a vise tool with the accessory attachment portion of FIG. 30 connected directly thereto.
FIG. 55 is a side perspective partial view of the vise tool of FIG. 54 with the accessory attachment portion of FIG. 30 connected directly thereto.
Figure 56:
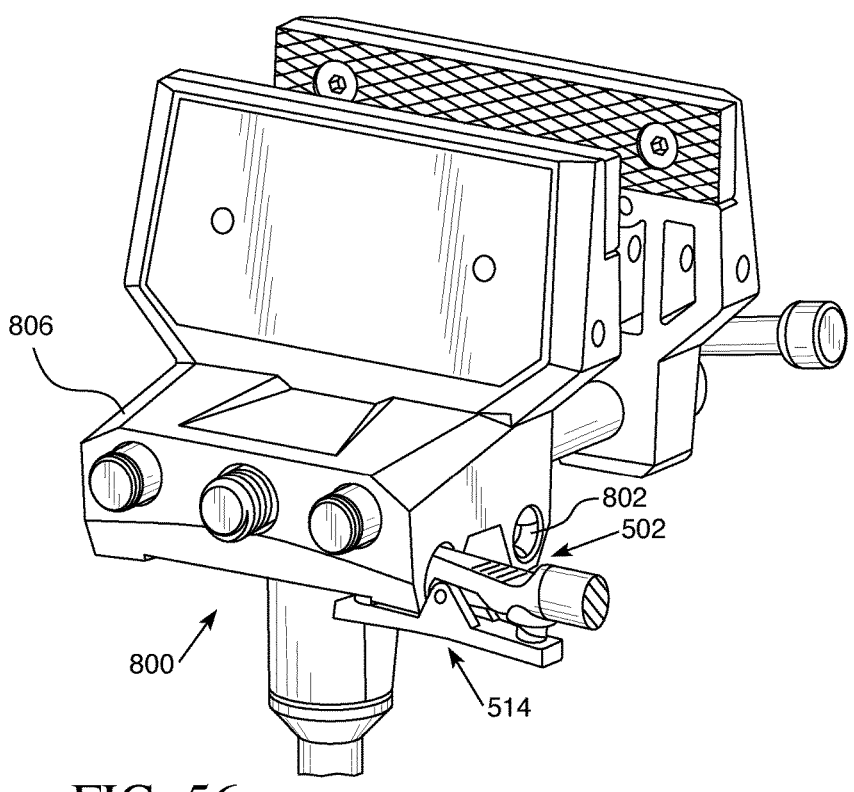
FIG. 56 is a top perspective partial view of the vise tool of FIG. 54 with the accessory attachment portion of FIG. 30 connected directly thereto.
Figure 57:
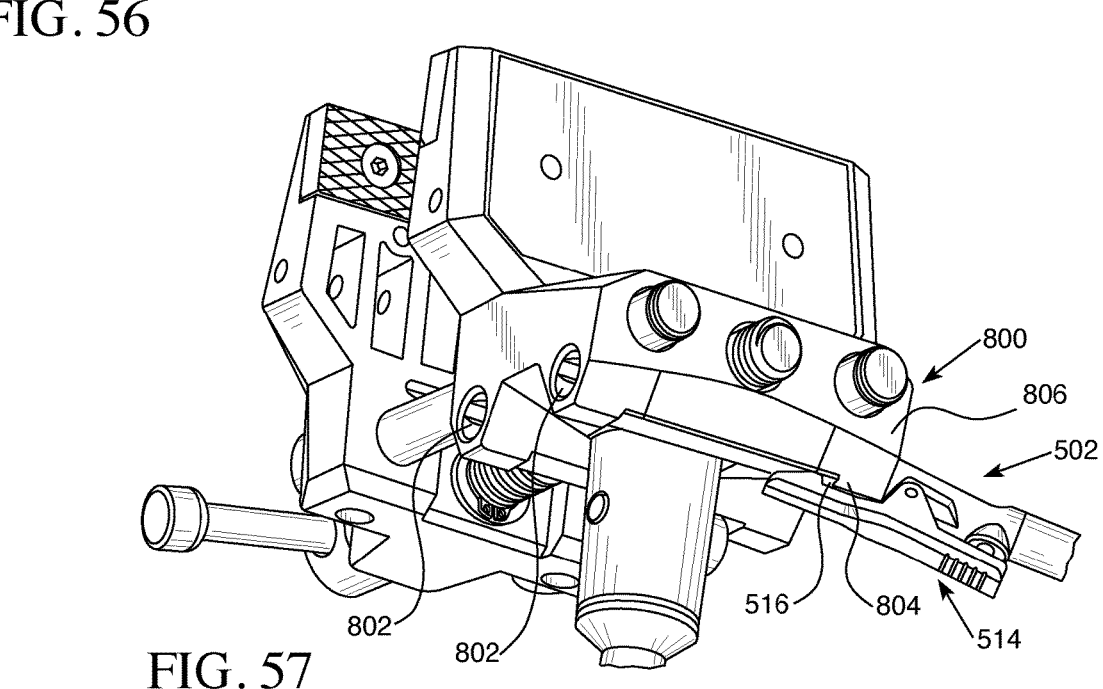
FIG. 57 is a bottom perspective partial view of the vise tool of FIG. 54 with the accessory attachment portion of FIG. 30 connected directly thereto.
Figure 58:
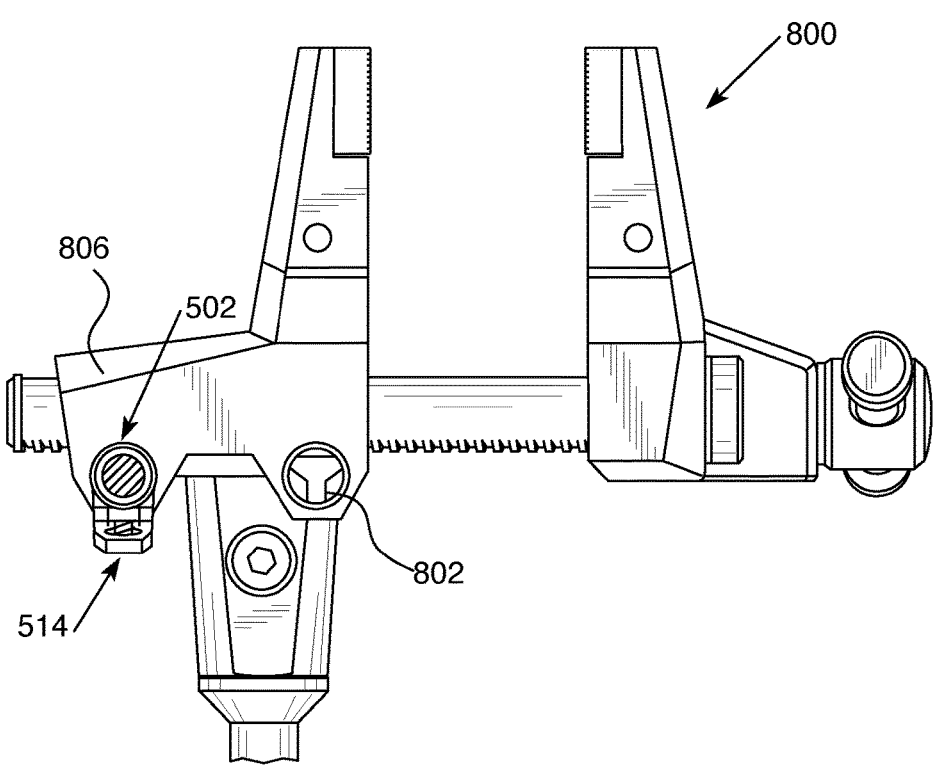
FIG. 58 is a rear view of the vise tool of FIG. 54 with the accessory attachment portion of FIG. 30 connected directly thereto.
Figure 59:
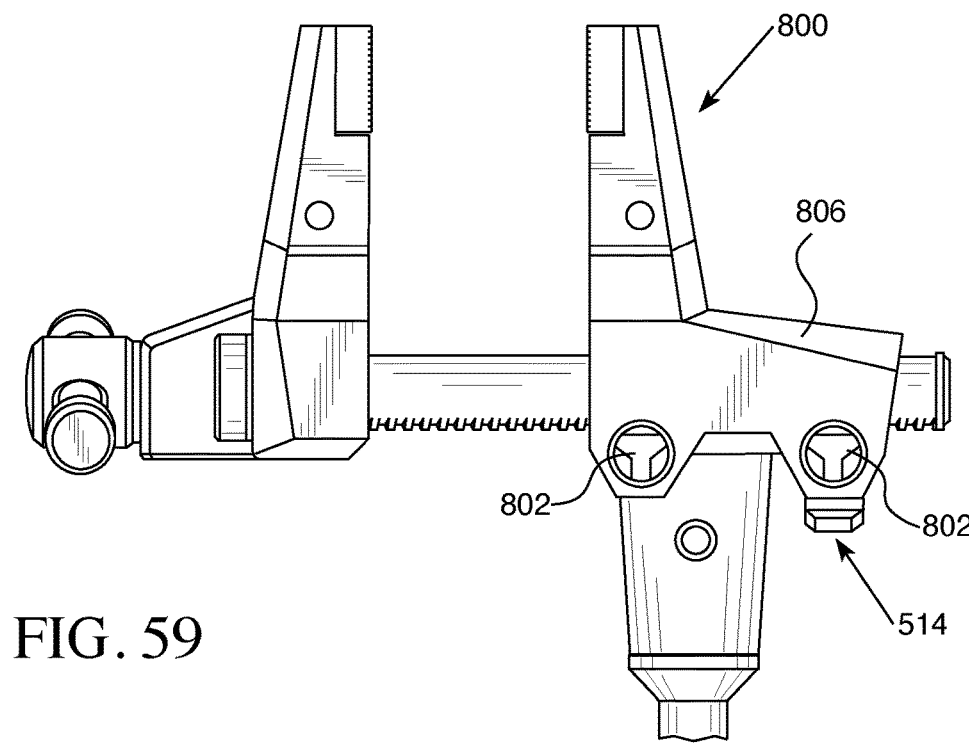
FIG. 59 is a front view of the vise tool of FIG. 54 with the accessory attachment portion of FIG. 30 connected directly thereto.
Figure 60:
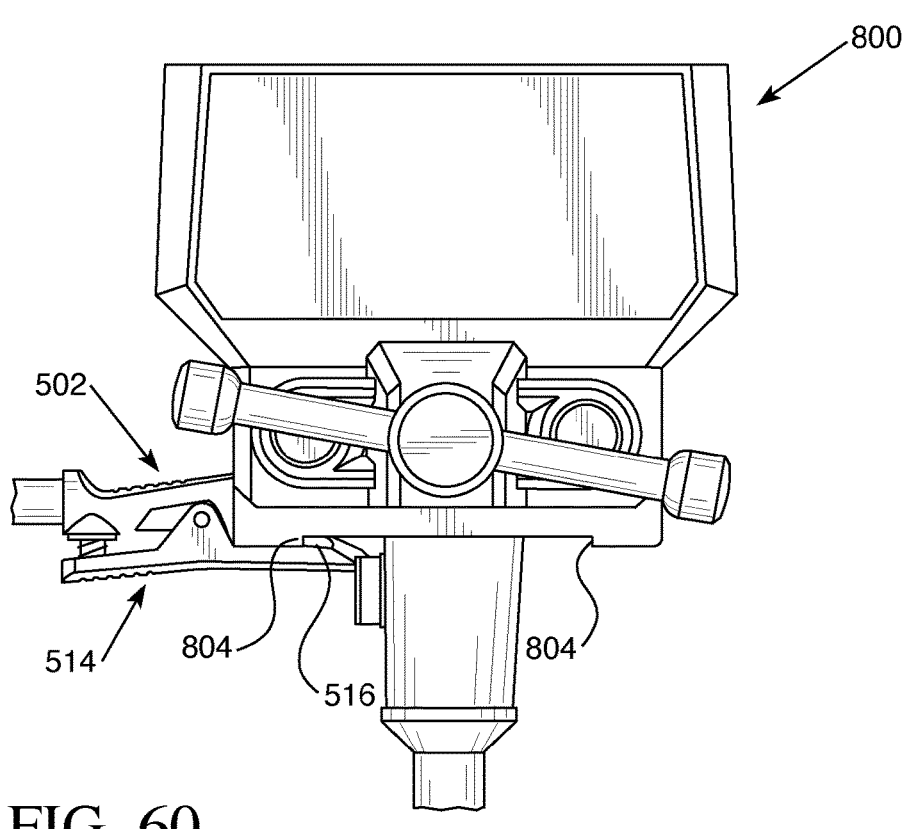
FIG. 60 is a right side view of the vise tool of FIG. 54 with the accessory attachment portion of FIG. 30 connected directly thereto.
Figure 61:
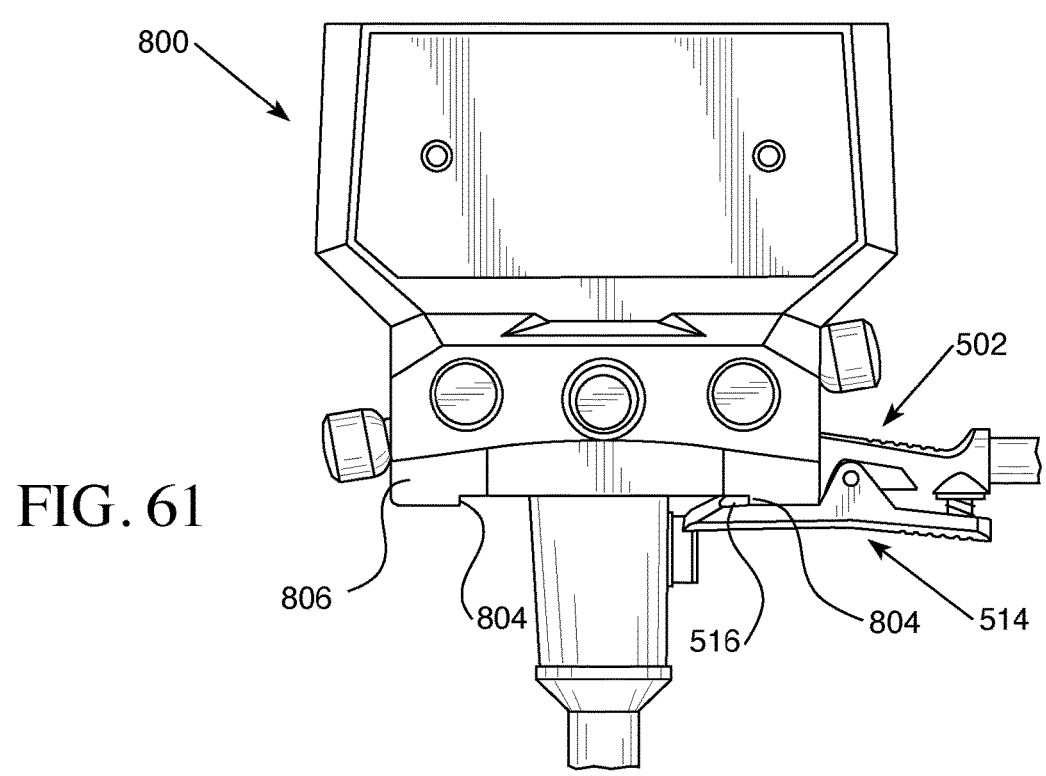
FIG. 61 is a left side view of the vise tool of FIG. 54 with the accessory attachment portion of FIG. 30 connected directly thereto.
Figure 62:
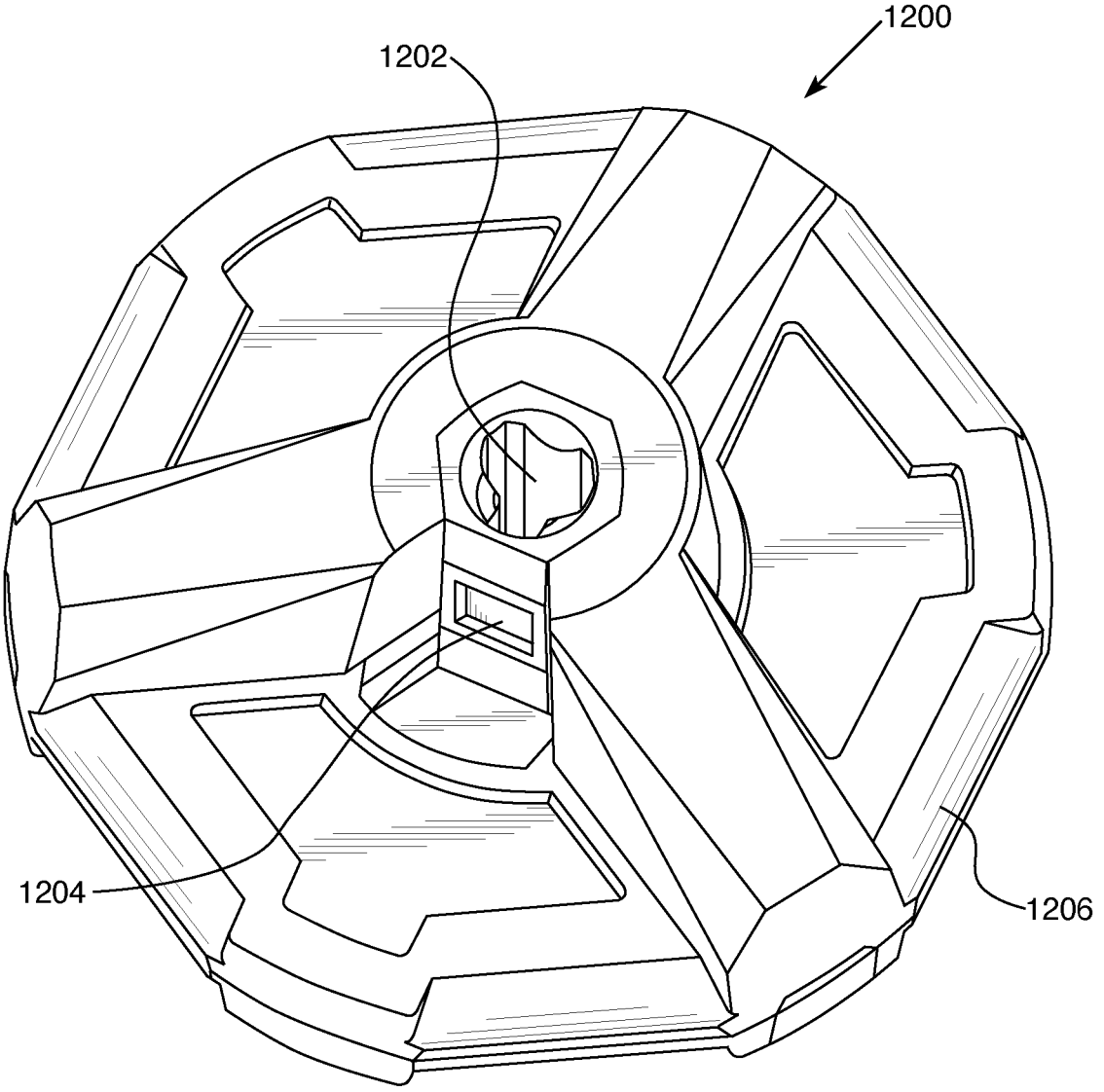
FIG. 62 is a top perspective view of a base that is compatible with the accessory of FIG. 30.
Figure 63:
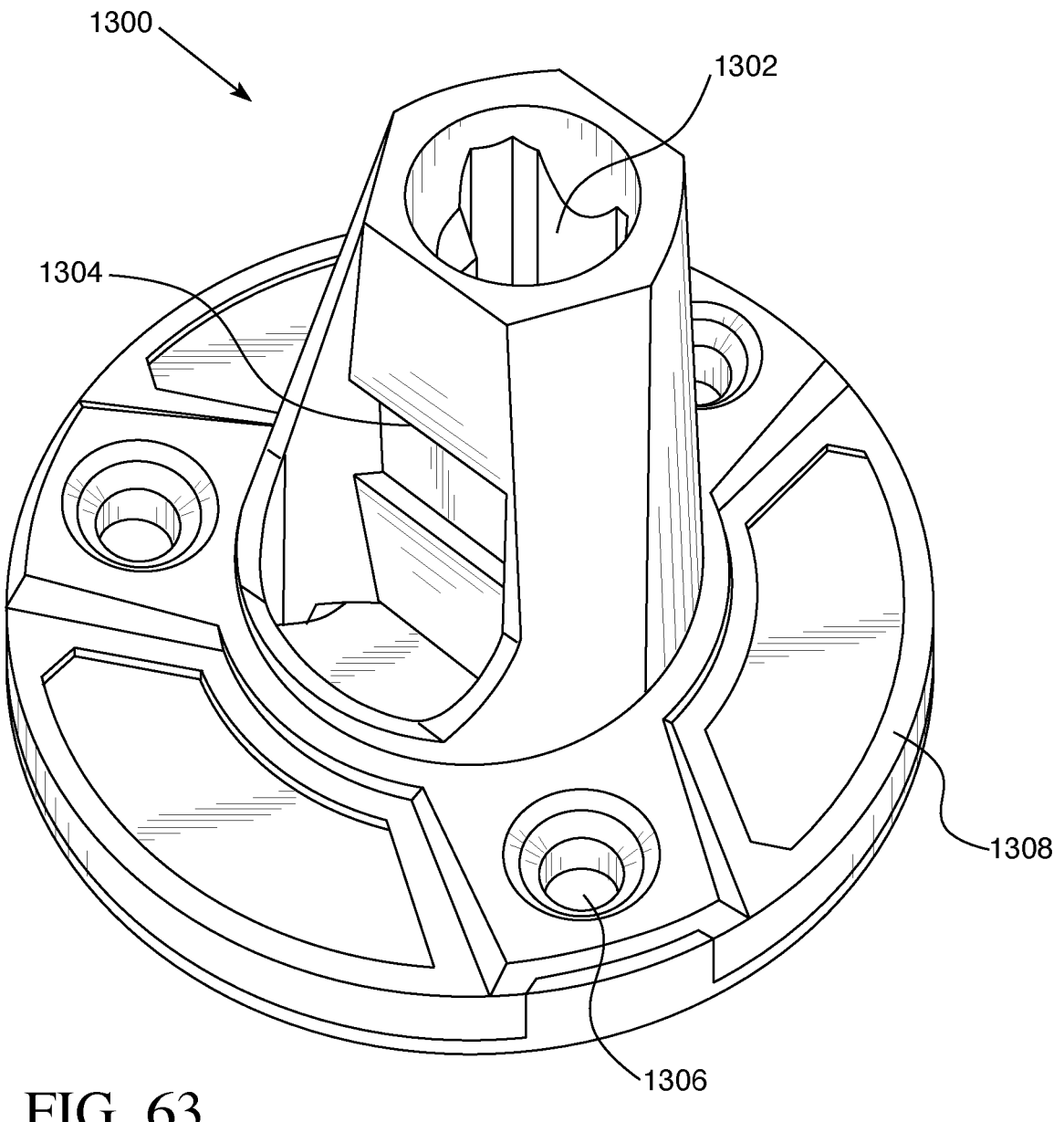
FIG. 63 is a top perspective view of a base that is compatible with the accessory of FIG. 30.
Figure 64:
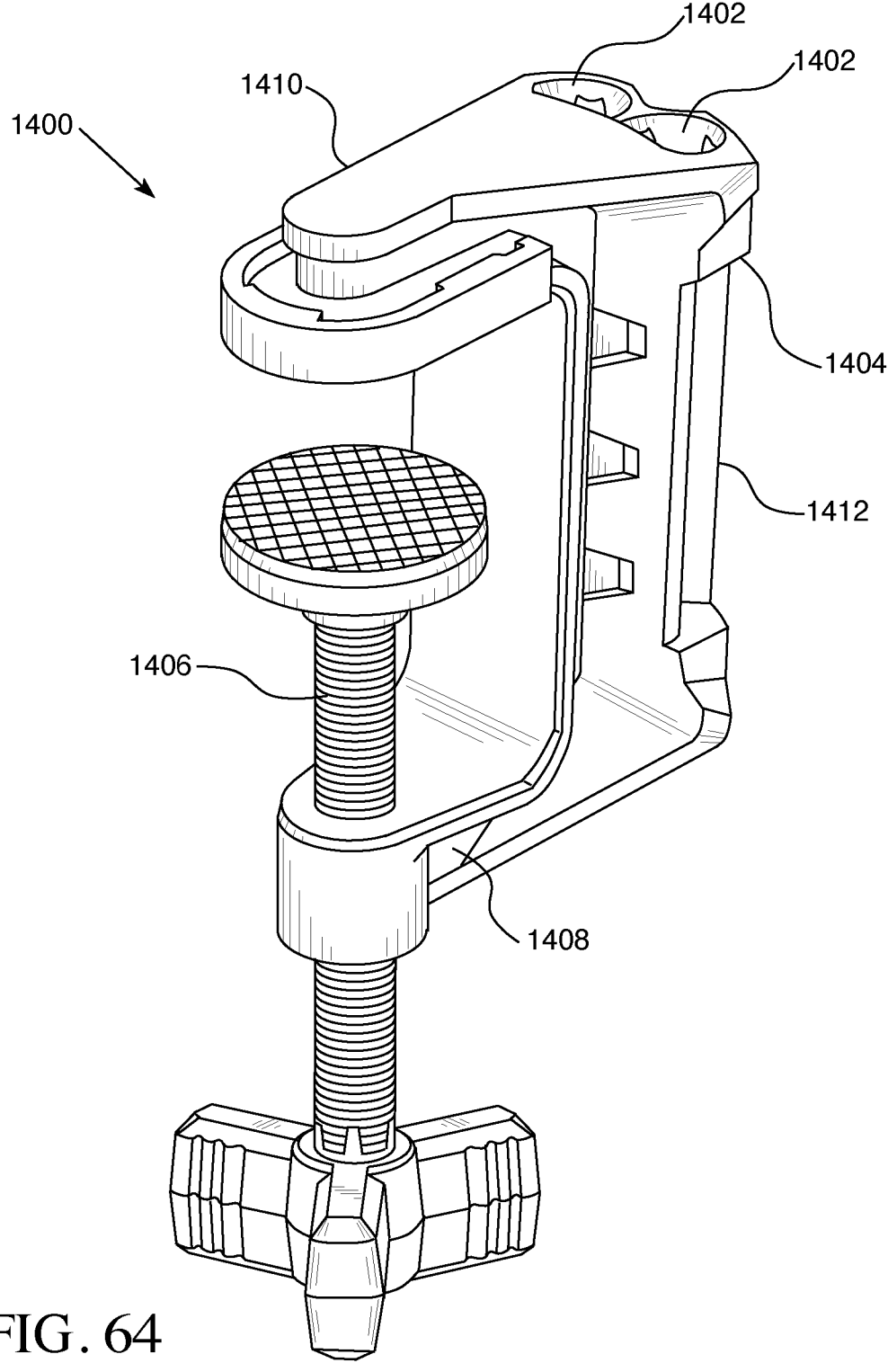
FIG. 64 is a top perspective view of a clamp that is compatible with the accessory of FIG. 30.

As mentioned above, one example of a working device can be a support device or a vise tool. Therefore, in some embodiments, the accessory can connect to a support device or a vise tool. FIG. 22 is a perspective view of an adjustable support stand connected to the receiving adapter of FIG. 45. FIG. 53 is a perspective view of the receiving adapter of FIG. 49 connected to the vise of FIG. 3. FIG. 54 is a side perspective view of a vise tool with the accessory attachment portion of FIG. 30 connected directly thereto. FIG. 55 is a side perspective partial view of the vise tool of FIG. 54 with the accessory attachment portion of FIG. 30 connected directly thereto. FIG. 56 is a top perspective partial view of the vise tool of FIG. 54 with the accessory attachment portion of FIG. 30 connected directly thereto. FIG. 57 is a bottom perspective partial view of the vise tool of FIG. 54 with the accessory attachment portion of FIG. 30 connected directly thereto. FIG. 58 is a rear view of the vise tool of FIG. 54 with the accessory attachment portion of FIG. 30 connected directly thereto. FIG. 59 is a front view of the vise tool of FIG. 54 with the accessory attachment portion of FIG. 30 connected directly thereto. FIG. 60 is a right side view of the vise tool of FIG. 54 with the accessory attachment portion of FIG. 30 connected directly thereto. FIG. 61 is a left side view of the vise tool of FIG. 54 with the accessory attachment portion of FIG. 30 connected directly thereto. FIG. 62 is a top perspective view of a base that is compatible with the accessory of FIG. 30. FIG. 63 is a top perspective view of a base that is compatible with the accessory of FIG. 30. FIG. 64 is a top perspective view of a clamp that is compatible with the accessory of FIG. 30.

Accessory

In some embodiments, the accessory can be an elongate object such that its length is several times longer than its width (for example, its width to length ratio may range from 1:10 to 1:100). This long length, as well as the flexibility inherent to the extension portion, enables a user to adjust and move the accessory to many desired positions relative to the working device. Further, a majority of the accessory (for example, the extension portion and at least a portion of the plug body) can have a generally cylindrical shape, as illustrated in FIGS. 39-44.

As mentioned above and shown in FIGS. 30-44, one embodiment of accessory 500 may include a plug body 502 having a first axis X, a spring-loaded locking mechanism 514 positioned above the plug body and parallel to the plug body's axis, and an extension portion 520, which can extend out from, and along the same axis as, the plug body. The plug body 502 can insert into a plug receptacle of a working device or a receiving adapter, the spring-loaded locking mechanism 514 can transiently lock the plug therein, and the extension portion 520 can, firstly, connect on its distal end to a tool and, secondly, be structured and configured such that a user can bend the extension portion into a position that it then retains (for example, it can be comprised of a flexible gooseneck tube). Each of these components, as well as certain of the potential receiving objects such as a receiving adapter, are described further below.

The plug body 502 can be comprised of a keyed connection piece 504 (the portion that plugs into a plug receptacle, shown herein as a multi-lobed connection piece) connected to a mount 512, a pivot joint 508, and a compression spring 506 retained, at least in part, within a receiving hole 510 in the plug body. The keyed connection piece 504 can be located on a distal end of the plug body 502 while the mount 512 can be located on a proximal end. The keyed connection piece 504 and the mount 512 can be approximately the same length and can each have an end that is connected to the other (i.e., one end of the connection piece may be connected to one end of the mount). The keyed connection piece 504 and the mount 512 can be positioned along axis X. The pivot joint 508, which can include a pivot pin 528 (for example, a roll pin or dowel pin), can be located approximately centrally along the length of the plug body 502. For example, it may be located on a proximal end of the mount 512 where the mount meets the keyed connection piece 504. The receiving hole 510, and thereby the compression spring 506, can be located on a distal end of the plug body 502, such as a distal end of the mount 512. As described in more detail below, this positioning enables the spring-loaded locking mechanism 514, which can connect to the plug body 502 via the pivot joint 508, to transiently lock the accessory 500 to a working device or receiving adapter.

In some embodiments, the entire plug body 502 can be comprised of a rigid material such as metal (for example, aluminum or steel), plastic (for example, HDPE, PVC, or polypropylene), or a high durometer rubber (for example, a rubber on the Shore D hardness scale between 30D and 100D). In other embodiments, portions of the plug body 502 may be comprised of a combination of rigid materials. For example, the keyed connection piece 504 and the mount 512 may be comprised of a first rigid material, such as aluminum, whereas the spring 506 may be comprised of a second rigid material, such as steel having a spring tension of 10-15 lb/in, and the pivot pin 528 may be comprised of a third rigid material, such as a plastic roll pin.

As mentioned above, the keyed connection piece 504 can be located at the proximal-most end of the plug body 502 and, more generally, the accessory 500 itself. The connection piece 504 can have a plurality of lobes that extend the length of the connection piece. As illustrated in FIGS. 32-33, for example, the connection piece 504 can have three lobes. The cross-section of the connection piece 504 can resembles a y-shape, such that the lobes are equidistant, or nearly equidistantly, apart. Alternatively, as illustrated, the cross-section can resemble a t-shape, such that two of the lobes in the cross-section are approximately in line with one another and the third lobe extends approximately perpendicularly from a center portion. The lobes in the connection piece 504 are structured to prevent the accessory 500 from rotating once it is inserted into a plug receptacle. Therefore, while three lobes are illustrated herein, it is anticipated that any number of lobes can be used ranging from two upward as long as they prevent the accessory 500 from rotating once connected. Further, while the lobes herein are shown as extending the full length of the extension piece 504, it is envisioned that an extension piece may be only partially lobed, with the remainder of the non-lobed length taking on a more uniform or consolidated shape, similar to the mount 512.

In some embodiments, the mount 512 may be generally cylindrical, but a bottom portion can angle upward from the proximal end to the distal end such that it creates a ledge near the distal end, as illustrated in FIGS. 30 and 34, and negates the mount from being perfectly cylindrical. This ledge can assist a user with grasping and pulling against the distal edge of the mount 512 when pulling the plug body 502 out from a plug receptacle. More specifically, as illustrated in FIGS. 45, 49, and 55, while the connection piece 504 may insert entirely into a plug receptacle 602, 702, 802, the mount 512 can remain exterior to the receiving adapter 600, 700 or the working device 800. Therefore, the mount 512 provides a ledge upon which a user can apply pressure when pulling the accessory 500 out of a plug receptacle.

In addition to connecting in line to the keyed connection piece 504, the mount 512 can define the receiving hole 510. More specifically, an upper surface of the distal end of the mount 512 (which can also be the distal end of the plug body 502) can have an opening leading into a cavity, as illustrated in FIGS. 31 and 49, in which a first end of the compression spring 506 can be secured. The cavity can be approximately the same diameter as that of the compression spring 506 so that the spring can coil up inside the cavity. As described in further detail below, the compression spring 506 can connect on a second end to the clip 524 of the spring-loaded mechanism 514 or, more specifically, to the spring-connection pin 518 that is positioned underneath the clip.

In addition to the receiving hole 510, the mount 512 can include the pivot joint 508. The pivot joint 508 can be located near a proximal end of the mount 512 (which can also be near a central portion of the plug body 502) and can be comprised of a roll pin or dowel pin (hereinafter referred to a pivot pin 528) positioned in a through hole of the mount. The pivot pin 528 can, as illustrated in FIGS. 30 and 33-34, penetrate entirely through the width of the mount 512 such that each end protrudes out a side of the mount. These protruding ends of the pivot pin 528 can be the portion of the plug body 502 upon which the spring-loaded locking mechanism 514 attaches.

More specifically, the spring-loaded locking mechanism 514 can include a clip 524 having at least a portion that is approximately the same width as the plug body 502, as illustrated in FIG. 37. The clip 524 can be slightly shorter in length than the plug body 502 such that a distal end aligns near the distal end of the plug body, but the proximal end of the clip terminates more distally than the proximal end of the plug body. Therefore, as illustrated in FIGS. 30, 34, and 37, while the clip 524 may cover a majority of the top surface of the plug body 502, the top surface of the proximal end of the plug body (for example, the end of the keyed connection piece 504) can remain exposed. This configuration enables the plug body 502 to be more easily guided into a plug receptacle.

To attach to the plug body 502, the spring-loaded locking mechanism 514 can connect via the pivot joint 508. More specifically, the spring-loaded locking mechanism 514 can include arms 526 that protrude downward from each side of the clip 524, as illustrated in FIGS. 31-32 and 35, wherein the arms can include a through hole for receiving the pivot pin 528. The arms 526 may be separate pieces that connect to the clip 524 or they may be continuations of the same material that defines the clip. The arms 526 can take any shape but are shown herein as approximately triangular (see FIGS. 30 and 34). In some embodiments, the outside face of the arm 526 can be approximately flush with the outer circumference of the mount 512, as illustrated in FIGS. 33 and 36. To accomplish this, the mount 512 may include a depression where the arms 526 connect to the plug body 502. The depression may be approximately as deep as the thickness of the arms 526. As illustrated herein, the pivot pin 528 may be located on the same portion of the mount 512 as the depression and, as mentioned above, may have the same length as the maximum width of the mount 512. Therefore, the pivot pin 528 of the spring-loaded locking mechanism 514 may protrude out from the depressed area of the mount 512 so that the arms 526 can mount thereon via the through hole, and the pivot pin and arms may be relatively flush with the outer circumference of the mount and, therefore, the plug body 502.

The placement of the pivot pin 528 at the approximate center of the spring-loaded locking mechanism 514 and the positioning of the locking mechanism above the plug body 502, enables the ends of the locking mechanism to see saw. Therefore, when the accessory 500 is inserted into a plug receptacle, a proximal end of the spring-loaded locking mechanism 514 may be pushed upward and a distal end may pivot downward. Once the accessory 500 is completely inserted, a front hook 516 positioned on an underside of the proximal end of the clip 524 may be positioned past a catch point on a hook receptacle such that the front hook may pivot downward due to force applied on the distal end of the clip by the compression spring 506. The distal end of the spring-loaded mechanism 514 may then pivot upward due to the same force from the compression spring 506.

As with the arms 526, the front hook 516 may be a separate piece that connects to the clip 524 or it may be an extension of the same material that defines the clip. The hook 516 may slope downward from a proximal point to a distal point, wherein it can then comprise an approximately flat, vertical face. Its proximal point can be located near the proximal end of the clip 524, and its distal point can be positioned about halfway to the midpoint of the clip as well as near a central region of the keyed connection piece 504, as illustrated in FIGS. 30-32. The vertical face of the front hook 516 can enable the spring-loaded locking mechanism 514 to catch on a hook receptacle such that simply applying sheer force on the accessory 500 to attempt to pull it out of a plug receptacle will not result in separation of the accessory from the plug receptacle of the working device or receiving adapter. To remove the accessory 500, the distal end of the clip 524 can be pushed downward toward the plug body 502, thereby causing the clip 524 to pivot at the pivot joint 508 and the proximal end of the clip to rotate upward until the front hook 516 is clear of the hook receptacle 604. Once the accessory 500 is then removed from the plug receptacle, the user can release the clip 524 and the compression spring 506 can force the distal end of the clip upward as well as the proximal end of the clip and the front hook 516 back downward toward the plug body 502.

To ensure the compression spring 506 remains positioned appropriately in the accessory 500, the spring-loaded locking mechanism 514 can also include a spring connection pin 518 around which the spring can be wrapped. The pin 518 can, as with the arms 526 and front hook 516, be a separate piece that connects to the clip 524 or it may be an extension of the same material that defines the clip. As illustrated in FIGS. 30-32 and 34-35, the pin 518 can be approximately cylindrical, although this specific shape is not required, and may be located on an underside of the clip 524 such that it can insert, at least partially, into the receiving hole 510 of the plug body 502. In some embodiments, the pin 518 may permanently reside at least partially within the receiving hole 510 and may then extend further into the hole when the distal end of the locking mechanism 514 is forced toward the plug body 502. In other embodiments, the pin 518 may only be positioned in the receiving hole 510 when the distal end of the locking mechanism 514 is forced toward the plug body 502. In yet other embodiments, if a receiving hole is not present, the pin 518 may simply come to a stop at the surface of the plug body 502 when the distal end of the locking mechanism 514 is forced toward the plug body.

As mentioned above, the accessory 500 is comprised of an extension portion 520 in addition to the plug body 502 and spring-loaded locking mechanism 514. More specifically, a distal end of the plug body 502 can connect to a proximal end of the extension portion 520, and a distal end of the extension portion can connect to a tool such as, but not limited to, a flashlight (FIGS. 39-40), magnifying glass (FIGS. 41-42), or mobile device holder (FIGS. 43-44). In some embodiments, at least the connected (i.e., proximal) end of the extension portion 520 can be positioned along axis X along with the keyed connection piece 504 and the mount 512. However, since the extension portion 520 may be flexible, at least portions of the extension portion may flex away from axis X.

More specifically, to enable a user to manipulate the accessory 500 and position the tool in any number of locations, the extension portion 520 can be a flexible gooseneck tube. The gooseneck tube can be bent and manipulated into several positions and once positioned, it can then retain its position indefinitely. In some embodiments, the extension portion 520 can be several times longer than the plug body 502. As illustrated herein, the extension portion 520 can be approximately six times longer than the plug body 502.

However, the extension portion 520 may be anywhere from four to ten times longer than the plug body 502. In some embodiments, the extension portion 520 can be between 350 mm and 450 mm (for example, approximately 400 mm) long.

As mentioned above, the proximal end of the extension portion 520 may connect directly to the plug body 502. To facilitate this, the extension portion 520 may include a connector, such as a plug connector 522, that can connect the plug body 502 to the extension portion. For example, the plug connector 522 may include a female connection end that has a threaded connection with a male connector (not shown) on the plug body 502. In embodiments where the extension portion 520 connects to the plug body 502 via a plug connector 522, the plug connector can be positioned along axis X along with the keyed connection piece 504, the mount 512, and at least the connected (i.e., proximal) end of the extension portion. In some embodiments, to prevent the extension portion 520 from loosening, the plug connector 522 or the male connector on the plug body 502 may include a thread locker. Similarly, the distal end of the extension portion 520 may be permanently or removably connected to a tool. For example, the tool may be threadedly connected to the distal end of the extension portion 520 or the tool may be permanently constructed onto the distal end of the extension portion.

As mentioned above, the accessory 500 can connect to a working device. More specifically, a portion of the plug body 502 of the accessory 500 (such as the keyed connection piece 504) can plug into a plug receptacle of a working device. In some cases, the plug body 502 can plug directly into a compatible working device. In other cases, a receiving adapter may be provided that can be configured to attach to the working device and that can receive the plug body of the accessory. Such an embodiment enables otherwise non-compatible working devices (i.e., those without a compatible plug receptacle) to connect to the accessory, as illustrated in FIGS. 22 and 53. And in other embodiments, a receiving adapter may be provided that functions on its own as a base or a worktable clamp, as illustrated in FIGS. 62-64.

Receiving Adapters

One example of a working device that can pair to the accessory 500 via a receiving adapter is an adjustable support stand 400, as illustrated in FIGS. 21-22 and described in detail above. In this embodiment, the adjustable support stand 400 can include a set of rails 406 to which a receiving adapter can attach. The receiving adapter can also include a plurality of compatible receiving portions for a plurality of accessories 500. For example, as illustrated in FIGS. 22 and 45-48, the receiving adapter 600 can include four plug receptacles 602, two on each end of the receiving adapter (for example, two on either side of device connections 606), as well as two sets of device connections 606 that are compatible with rails 406.

The plug receptacles 602 of receiving adapter 600 can be located near each of four corners of the receiving adapter. To be compatible with the accessory 500, the plug receptacles 602 can have a complimentary shape to the keyed connection piece 504. For example, in embodiments where the keyed connection piece 504 is a multi-lobed connection piece, the plug receptacles 602 can have multi-lobed channels that are approximately as long as the multi-lobed connection piece. This enables the entirety of the keyed connection piece 504 to be inserted into a plug receptacle 602 and the majority, if not all, of the mount 512 to remain external to the plug receptacle. As such, the pivot joint 508, compression spring 506, spring-loaded locking mechanism 514, and extension portion 520 can also remain external to the plug receptacle 602.

The placement of the spring-loaded locking mechanism 514 external to the receiving adapter 600 once the keyed connection piece 504 is initially inserted into a plug receptacle 602, enables the clip 524 to pivot at the pivot joint 508 such that the front hook 516 can slide over the top of the receiving adapter and hook over a hook receptacle 604 on the receiving adapter, as illustrated in FIGS. 45 and 47-48. Once the front hook 516 is hooked onto the hook receptacle 604, the accessory 500 is securely affixed to the receiving adapter 600 and any tool at the end of the extension portion 520 can be moved around relative to the receiving adapter.

As mentioned above, the receiving adapter 600 can have one or more device connection 606 that enable the receiving adapter to connect to the rails 406 of the adjustable support stand 400. More specifically, the device connections 606 can be cylindrical channels that continue from one side of the receiving adapter 600 completely through to the other side, as illustrated in FIG. 47. As illustrated in FIG. 22, the receiving adapter 600 can have two of these device connections 606 (and, therefore, four openings in the receiving adapter) that are spaced similarly to the spacing of the rails 406 on the adjustable support stand 400. By having channels that persist completely through the receiving adapter 600, the receiving adapter can be positioned anywhere along the rails 406 of the adjustable support stand 400.

In some embodiments, the receiving adapter 600 can slide along the rails 406 even while the device connections 606 encircle the rails. In other embodiments, the receiving adapter 600 may be fixed in place once the device connections 606 encircle the rails 406. In either embodiment, to attach the receiving adapter 600 to the rails 406 and, in some cases, to allow the user to adjust the placement of the receiving adapter along the rails, the receiving adapter may include a hinge 608 on a side perpendicular to the side on which the device connections 606 are located, as illustrated in FIG. 47. Opposite the hinge 608, the receiving adapter 600 can include a lock 610. The lock may be a latch on a living hinge, as illustrated in FIGS. 47-48, that can retain the top half of the receiving adapter 600 to the bottom half of the receiving adapter. In this configuration, the channels of the device connections 606 can also be positioned such that a portion of the channel is positioned on the top half of the receiving adapter 600, and the remaining portion of the channel is positioned on the bottom half of the receiving adapter. The portions may be evenly distributed or, alternatively, a smaller portion may be located on the top or bottom half of the receiving adapter 600 while the remaining, larger portion is positioned on the other of the top or bottom half of the receiving adapter.

As illustrated herein, receiving adapter 600 can include four plug receptacles 602 and, therefore, four hook receptacles 604 such that four accessories 500 may be attached to the receiving adapter at the same time. The plug receptacles 602 can be positioned such that they are on the same sides of the receiving adapter 600 as the hinge 608 and lock 610 (for example, plug receptacles on the hinge side and two receptacles on the lock side). The hook receptacles 604 can be located on a top of the receiving adapter 600 and can be positioned approximately above the openings to the device connections 606, as illustrated in FIG. 47. Therefore, when the receiving adapter 600 is mounted to a working device, such as adjustable support stand 400, and when one or more accessories 500 are inserted into the plug receptacles 602 with their front hook 516 latched onto the hook receptacles 604, the one or more accessories can extend perpendicular to the rails 406 and away from the working device, as illustrated in FIG. 22.

While receiving adapter 600 has been described herein as having four plug receptacles 602, it is possible for the receiving adapter to have fewer or more than four plug receptacles. For example, the receiving adapter 600 may have one plug receptacle 602 on each of the hinge and lock sides, thereby having two total, or it may have three on each side, thereby having six total. Further, in some cases, the plug receptacles 602 may not be located in corners but may be more centrally positioned along the side of the receiving adapter 600. For example, if a larger receiving adapter is designed, it may support three plug receptacles 602 on each side such that there is a plug receptacle on each corner and a plug receptacle between each of the sets of corner plug receptacles. Other configurations are envisioned as well.

Similar to FIG. 22, FIG. 53 illustrates an example of a working device having a complimentary receiving adapter that enables the accessory 500 to be indirectly connected to the working device. More specifically, another example of a working device that can pair to the accessory 500 via a receiving adapter is a vise 200, as illustrated in FIGS. 1-3 and 53 and described in detail above. In this embodiment, the vise 200 can include a threaded rod 206 and a set of guide bars 218 to which a receiving adapter 700 can attach. As with the receiving adapter 600, the receiving adapter 700 can include a plurality of compatible receiving portions for a plurality of accessories 500. For example, as illustrated in FIGS. 51-53, the receiving adapter 700 can include four plug receptacles 702, two on each end of the receiving adapter (for example, two on either side of device connections 706), as well as three sets of device connections 706 that are compatible with the threaded rod 206 and guide bars 218.

Due to the placement of the connection mechanism of the receiving adapter 700 to the vise 200, as described in more detail below, the plug receptacles 702 of the receiving adapter may be located on the bottom half of the adapter on opposing sides, as illustrated in FIG. 50. As above, the plug receptacles 702 can be structured and configured to have a complimentary shape to the keyed connection piece 504 such that they are then compatible with the accessory 500. More specifically, in embodiments where the keyed connection piece 504 is a multi-lobed connection piece, the plug receptacles 702 can have multi-lobed channels that are approximately as long as the multi-lobed connection piece, which enables the entirety of the keyed connection piece 504 to be inserted into a plug receptacle 702 and the majority, if not all, of the mount 512, as well as the pivot joint 508, compression spring 506, spring-loaded locking mechanism 514, and extension portion 520, to remain external to the plug receptacle.

The positioning of the various components of the accessory 500 relative to the receiving adapter 700 once the two elements initiate their attachment (i.e., the keyed connection piece 504 partially inside the plug receptacle 702 and all other components of the accessory external thereto), enables the clip 524 to pivot at the pivot joint 508 such that the front hook 516 can slide over the top of the receiving adapter and hook over a hook receptacle 704 on the receiving adapter, as illustrated in FIG. 49. As with receiving adapter 600, once the front hook 516 is hooked onto the hook receptacle 704, the accessory 500 is securely affixed to the receiving adapter 700 and any tool at the end of the extension portion 520 can be moved around relative to the receiving adapter.

As mentioned above, the receiving adapter 700 can have a plurality of device connections 706 that enable the receiving adapter to connect to the threaded rod 206 and guide bars 218 of the vise 200. More specifically, the device connections 706 can be cylindrical channels that continue from a top face of the receiving adapter 700 completely through to the bottom face, as illustrated in FIG. 50, which is a slight modification on the device connections 606 which continue from one side through to an opposite side. As illustrated in FIGS. 49-52, the receiving adapter 700 can have three of these device connections 706 (and, therefore, six openings in the receiving adapter): two device connections 706a that pair to guide bars 218 and a third device connection 706b that pairs to the threaded rod 206 and is positioned between the two guide bar device connections. The device connections 706 can be spaced from each other such that they correspond to the spacing of the threaded rod 206 and guide bars 218 of the vise 200. As with receiving adapter 600, the through-hole nature of the device connections enables the receiving adapter 700 to be positioned anywhere along the threaded rod and guide bars of the vise 200.

In some embodiments, the receiving adapter 700 can slide along the threaded rod 206 and guide bars 218 even while the device connections 706a/b encircle the rod/bars. In other embodiments, the receiving adapter 700 may be fixed in place once the device connections 706a/b encircle the rod 206 and bars 218. One method of attaching the receiving adapter 700 to the vise 200 may include the steps of separating the vise jaws 202 from each other such that the threaded rod 206 and guide bars 218 are completely removed from one of the vise jaws. The receiving adapter 700 can then be slid onto the threaded rod 206 and guide bars 218 and the rod/bars can be reinserted into the separated vise jaw such that the receiving adapter is then positioned between the two vise jaws 202, as illustrated in FIG. 53.

Other features of the receiving adapter 700 that enable it to be compatible with the vise 200 are a rectangular, deformable pad 708 (for example, a foam pad) on the side of the receiving adapter that is positioned within the space between inner vise faces 210 and a set of arms 710 on the side of the receiving adapter that is opposite the deformable pad, wherein the arms that are structured and configured to wrap around the stem 248 of the vise and enable the receiving adapter to be positioned adjacent the vise jaw 202 that attaches to the stem. More specifically, the arms 710 may protrude out from the bottom face of the receiving adapter 700 and may have an interior curvature such that the set of arms creates a semi-circle void that corresponds to the cylindrical stem 248.

As illustrated herein, receiving adapter 700 can include four plug receptacles 702 and, therefore, four hook receptacles 704 such that four accessories 500 may be attached to the receiving adapter at the same time. The plug receptacles 702 can be positioned such that they are on the opposite sides of the receiving adapter 700 as the deformable pad 708 and arms 710 (for example, two plug receptacles on the each of the sides between the pad and arms). As mentioned above, the plug receptacles 702 may also be located the same end of the receiving adapter 700 such that all plug receptacles are lower than the vise jaws 202, as illustrated in FIG. 53. Therefore, when the receiving adapter 700 is mounted to a working device, such as vise 200, and when one or more accessories 500 are inserted into the plug receptacles 702 with their front hook 516 latched onto the hook receptacles 704, the one or more accessories can extend parallel to the inner face 210 of the vise jaws 202 and away from the working device, as illustrated in FIG. 53.

While receiving adapter 700 has been described herein as having four plug receptacles 702, it is possible for the receiving adapter to have fewer or more than four plug receptacles. For example, the receiving adapter 700 may have one plug receptacle 702 on each of the sides between the deformable pad 708 and arms 710, thereby having two total, or it may have three on each side, thereby having six total. Further, in some cases, the plug receptacles 702 may not be located on one half but may be more spread out along the side of the receiving adapter 700. For example, if a larger receiving adapter is designed, it may support three plug receptacles 702 on each side, wherein at least one of the plug receptacles is on an opposite end compared to the other two plug receptacles. Other configurations are envisioned as well.

Working Device

Another example of a working device that can pair to the accessory is the working device 800 illustrated in FIGS. 54-61. In this embodiment, the plug receptacles 802 may be incorporated directly into the base of the vise jaw 806. The plug receptacles 802 of the working device 800 are structured and configured similarly to the plug receptacles 602, 702 of receiving adapters 600, 700. Namely, the plug receptacles 802 include a similarly shaped channel as plug receptacles 602, 702, wherein the channel has a shape (for example, a multi-lobed shape) that corresponds to the keyed connection piece 504 (for example, when the keyed connection piece is a multi-lobed connection piece).

Additionally, the structure and spacing of the hook receptacle 804 relative to plug receptacle 802 mirrors that of hook receptacles 604, 704 to plug receptacles 604, 704. Specifically, the positioning of the various components of the accessory 500 relative to the working device 800 once the two elements initiate their attachment (i.e., the keyed connection piece 504 partially inside the plug receptacle 802 and all other components of the accessory external thereto), enables the clip 524 to pivot at the pivot joint 508 such that the front hook 516 can slide over the bottom of the base of vise jaw 806 and hook over a hook receptacle 804 on the working device 800, as illustrated in FIG. 57. As with receiving adapters 600 and 700, once the front hook 516 is hooked onto the hook receptacle 804, the accessory 500 is securely affixed to the working device 800 and any tool at the end of the extension portion 520 can be moved around relative to the working device.

Unlike receiving adapters 600, 700, working device 800 has the plug receptacles 802 built into the structure of the device. As such, the plug receptacles are a permanent feature of the working device 800 and are not removable. In some embodiments, they may be positioned similarly to the plug receptacles 602 of receiving adapter 600. More specifically, there may be four plug receptacles 802, and each plug receptacle may be located near a bottom corner of the vise jaw 806. In other ways, the plug receptacles 802 may mirror plug receptacles 702 of receiving adapter 700. For example, the plug receptacles 802 may run parallel to the interior faces of the vise jaws such that when the accessory 500 is inserted into the plug receptacles 802 with their front hook 516 latched onto the hook receptacles 804, the one or more accessories can extend parallel to the inner face of the vise jaws and away from the working device 800, as illustrated in FIGS. 54 and 60-61.

While working device 800 has been described herein as having four plug receptacles 802, it is possible for the working device to have fewer or more than four plug receptacles. For example, the working device 800 may have one plug receptacle 802 on each of the sides between the inner and outer faces of the vise jaw 806, thereby having two total, or it may have three on each side, thereby having six total. Further, in some cases, the plug receptacles 802 may not be located in corners but may be more centrally positioned along the side of the vise jaw 806 of working device 800. For example, if a larger vise jaw is designed, it may support three plug receptacles 802 on each side such that there is a plug receptacle on each corner and a plug receptacle between each of the sets of corner plug receptacles. Other configurations are envisioned as well.

Limited Use Working Devices

As mentioned above, while some embodiments of complimentary mounts for the accessory 500 may be working devices or receiving adapters that are structured and configured to pair to a working device, other embodiments, such as those illustrated in FIGS. 62-64, may be structured and configured to function independently as a limited use working device, such as a base or clamp.

More specifically, one example of a limited use working device may be a device such as base 1200, illustrated in FIG. 62, that stands on its own foundation 1206 and can be freely re-positioned as a user desires. As with the receiving adapters and working device described above, the base 1200 can include a plug receptacle 1202 and a hook receptacle 1204 that have similar spacing and configurations to those described above. Therefore, accessory 500 can be fully compatible with the base 1200 and can interact with base in the same manner as described above. The base 1200 can have an approximately disc-like foundation 1206 in the center of which is located the plug receptacle 1202, which can protrude upward.

Another example of a limited use working device may be a device such as base 1300, illustrated in FIG. 63, that, in addition to standing on its own, can be mechanically fastened to a surface or another device. As with base 1200, base 1300 can include a plug receptacle 1302 and a hook receptacle 1304 that has similar spacing and configurations to the plug receptacles and hook receptacles of receiving adapters 600, 700 and working device 800. To affix base 1300 to a surface or possibly another device, mounting holes 1306 can be included on the flat, disc-shaped foundation 1308 of the base. The mounting holes 1306 can be through holes that penetrate from the top face through the bottom face of the foundation 1308. As with base 1200, the plug receptacle 1302 of the base 1300 can be located in the center of the disc-like foundation 1308 and can protrude upward.

A third example of a limited use working device may be a device such as clamp 1400, illustrated in FIG. 64, that can clamp to a working surface or to, possibly, another device through the use of a threaded clamping bar 1406. More specifically, a threaded clamping bar 1406 can be mounted on a lower arm 1408 that protrudes out from a spine 1412, and the clamping bar can move toward and away (for example, upward and downward) from a fixed, upper arm 1410, which also protrudes out from the spine in a way that mirrors the lower arm. As with bases 1200, 1300, clamp 1400 can include one or more plug receptacles 1402. For example, as illustrated in FIG. 64, clamp 1400 may include two plug receptacles 1402 on the spine 1412 with openings to the receptacles being located a top surface of the spine opposite an outer end of the upper arm 1410. Hook receptacles 1404 can be positioned on a back of the spine 1412, and the plug receptacles 1402 and hook receptacles can have similar spacing and configurations to the plug receptacles and hook receptacles of receiving adapters 600, 700, working device 800, and bases 1200, 1300.

Generally, while the receiving adapters and working devices discussed above all include four plug receptacles, in some embodiments a receiving adapter or working device may have fewer, or more, than four plug receptacles. For example, the receiving adapters 1200, 1300 illustrated in FIGS. 62 and 63 each have a single plug receptacle, and the receiving adapter 1400 illustrated in FIG. 64 has two plug receptacles. As with receiving adapters 600, 700 and working device 800, receiving adapters 1200, 1300, 1400 have plug receptacles 1202, 1302, 1402 that are structured and configured to receive the plug body 502 (for example, the keyed connection piece 504) of the accessory 500. Other receiving adapters or working devices may have different numbers of plug receptacles such as, but not limited to, three or five or more.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. An accessory for a working device comprising:
a plug body having a length along a first axis and being comprised of
a keyed connection piece on a first end, wherein the keyed connection piece is immovable relative to a remainder of the plug body,
a coiled compression spring positioned near a second end of the plug body, and
a pivot joint positioned between the first end and the second end of the plug body, wherein the pivot joint includes a pivot pin for connection to a spring-loaded locking mechanism at the singular pivot point, enabling the locking mechanism to pivot relative to the plug body at the singular pivot point,
an extension portion connected on one end to the second end of the plug body and connectable on an opposite end to a tool, and
the spring-loaded locking mechanism that is structured and configured to transiently lock the plug body to a receiving adapter or a working device, the spring-loaded locking mechanism being comprised of
a clip having a first end and a second end that is opposite the first end,
a front hook on the first end, and
a spring connection pin on an underside of the second end of the clip,
wherein at least the keyed connection piece of the plug body is insertable into a plug receptacle on a receiving adapter or a working device,
wherein the entire spring-loaded locking mechanism pivots relative to the plug body at the singular pivot point,
wherein the spring connection pin has a length that is greater than a width or a depth,
wherein the length of the spring connection pin is perpendicular to the plug body, and
wherein the plug body defines a corresponding receiving hole into which the spring connection pin is transiently insertable.

2. The accessory of claim 1, wherein the keyed connection piece is multi-lobed, each lobe is immovable relative to each other lobe, and the plug receptacle is hollow.

3. The accessory of claim 1, wherein the spring-loaded locking mechanism is positioned along a second axis that is parallel to the first axis.

4. The accessory of claim 1, wherein the coiled compression spring is coiled around the spring connection pin a plurality of times, and the coiled compression spring compresses along a third axis that is perpendicular to the first axis.

5. The accessory of claim 1, wherein the pivot joint is positioned between the front hook and the spring connection pin.

6. The accessory of claim 1, wherein the spring-loaded locking mechanism pivots around the pivot pin.

7. The accessory of claim 6, wherein the pivot pin penetrates entirely through the width of the plug body such that a first end and a second end of the pivot pin protrude out from the plug body, and wherein the spring-loaded locking mechanism connects to the protruding ends of the pivot pin at a central portion of the spring-loaded locking mechanism.

8. An accessory for a working device comprising:
a plug body having a length along a first axis and being comprised of
a keyed connection piece on a first end, wherein the keyed connection piece is immovable relative to a remainder of the plug body,
a coiled compression spring positioned near a second end of the plug body, and
a pivot joint positioned between the first end and the second end of the plug body, wherein the pivot joint includes a pivot pin for connection to a spring-loaded locking mechanism at the singular pivot point, enabling the locking mechanism to pivot relative to the plug body at the singular pivot point,
an extension portion connected on one end to the second end of the plug body and connectable on an opposite end to a tool, and
the spring-loaded locking mechanism that is structured and configured to transiently lock the plug body to a receiving adapter or a working device, the spring-loaded locking mechanism being comprised of
a clip having a first end and a second end that is opposite the first end,
a front hook on the first end, and
a spring connection pin on an underside of the second end of the clip, wherein at least the keyed connection piece of the plug body is insertable into a plug receptacle on a receiving adapter or a working device, wherein the entire spring-loaded locking mechanism pivots relative to the plug body at a singular pivot point, wherein the spring connection pin has a length that is greater than a width or a depth, wherein the length of the spring connection pin is perpendicular to the plug body, wherein the keyed connection piece is multi-lobed, and wherein the front hook is positioned over at least a portion of the multi-lobed connection piece.

9. The accessory of claim 8, wherein each lobe is immovable relative to each other lobe, and the plug receptacle is hollow.

10. The accessory of claim 8, wherein the spring-loaded locking mechanism is positioned along a second axis that is parallel to the first axis.

11. The accessory of claim 8, wherein the coiled compression spring is coiled around the spring connection pin a plurality of times, and the coiled compression spring compresses along a third axis that is perpendicular to the first axis.

12. The accessory of claim 8, wherein the pivot joint is positioned between the front hook and the spring connection pin.

13. The accessory of claim 8, wherein the spring-loaded locking mechanism pivots around the pivot pin.

14. The accessory of claim 13, wherein the pivot pin penetrates entirely through the width of the plug body such that a first end and a second end of the pivot pin protrude out from the plug body, and the spring-loaded locking mechanism connects to the protruding ends of the pivot pin at a central portion of the spring-loaded locking mechanism.

15. An accessory for a working device comprising:

a plug body having a length along a first axis and being comprised of a keyed connection piece on a first end, wherein the keyed connection piece is immovable relative to a remainder of the plug body, and an extension portion connected on one end to a second end of the plug body and connectable on an opposite end to a tool, wherein at least the keyed connection piece of the plug body is insertable into a plug receptacle on a receiving adapter or a working device the plug body is further comprised of a mount and a pivot joint positioned on the mount, the pivot joint connects to a clip of a spring-loaded locking mechanism, the clip is located along a single side of the plug body, the spring-loaded locking mechanism pivots only at the connection point of the clip to the pivot joint, the mount is positioned entirely in between the keyed connection piece and the extension portion, the pivot joint is positioned near a first end of the mount, the spring-loaded locking mechanism includes a spring connection pin that is located on an underside of the clip and has a length that is perpendicular to the mount, and the mount defines a corresponding hole on a second, opposite end of the mount into which the spring connection pin is transiently insertable.

16. The accessory of claim 15, wherein the keyed connection piece is multi-lobed, each lobe is immovable relative to each other lobe, and the plug receptacle is hollow.

17. An accessory in combination with a working device or a receiving adapter, the accessory comprising:

a plug body having a length along a first axis and being comprised of a keyed connection piece on a first end, wherein the keyed connection piece is immovable relative to a remainder of the plug body, and an extension portion connected on one end to a second end of the plug body and connectable on an opposite end to a tool, wherein at least the keyed connection piece of the plug body is insertable into a plug receptacle on the working device or the receiving adapter, the accessory is further comprised of a spring-loaded locking mechanism having a front hook on a first end, the front hook is a separate component from the keyed connection piece, and the front hook fits into a complimentary receptacle on the working device or the receiving adapter.

18. The accessory and working device or receiving adapter of claim 17, wherein the front hook fits into the complimentary receptacle on the receiving adapter, and the receiving adapter mechanically connects to the working device.

19. The accessory of claim 17, wherein the keyed connection piece is multi-lobed, each lobe is immovable relative to each other lobe, and the plug receptacle is hollow.

20. A method of using an accessory, the method comprising inserting a plug body into a plug receptacle on a receiving adapter or working device, wherein the plug body has a keyed connection piece that is immovable relative to a remainder of the plug body;

compressing a first end of a spring-loaded locking mechanism toward the plug body;

securing a front hook of the spring-loaded locking mechanism over a hook receptacle on the receiving adapter or working device, wherein the front hook is positioned over at least a portion of the keyed connection piece; and releasing the first end of the spring-loaded locking mechanism, wherein a compression spring pushes the spring-loaded locking mechanism away from the plug body.

21. The method of claim 20, further comprising compressing the first end of the spring-loaded locking mechanism toward the plug body;

pulling the plug body out from the plug receptacle; and releasing the first end of the spring-loaded locking mechanism, wherein the compression spring pushes the spring-loaded locking mechanism away from the plug body.

* * * * *